United States Patent [19]
Allen et al.

[11] Patent Number: 5,495,522
[45] Date of Patent: Feb. 27, 1996

[54] METHOD AND APPARATUS FOR AUDIO TELECONFERENCING A PLURALITY OF PHONE CHANNELS

[75] Inventors: Bruce S. Allen, East Kingston; Marshall B. Garrison, Derry, both of N.H.; Philip S. Brodsky, Methuen, Mass.; Richard LeBlanc, Plaistow, N.H.; Philip J. Baun, Jr., Andover, Mass.; Gary R. McCarthy, Manchester; Arthur P. Leondires, Mont Vernon, both of N.H.

[73] Assignee: MultiLink, Inc., Andover, Mass.

[21] Appl. No.: 335,270

[22] Filed: Nov. 7, 1994

Related U.S. Application Data

[63] Continuation of Ser. No. 12,028, Feb. 1, 1993, abandoned.

[51] Int. Cl.$^6$ .................................................. H04M 3/56
[52] U.S. Cl. ............................. 379/202; 379/201; 370/62
[58] Field of Search .................................... 379/201, 202, 379/203, 204, 205, 206; 370/62

[56] References Cited

U.S. PATENT DOCUMENTS

| | | |
|---|---|---|
| 4,295,008 | 10/1981 | Johnson et al. |
| 4,303,804 | 12/1981 | Johnson et al. |
| 4,305,149 | 12/1981 | Harrison ................................... 370/62 |
| 4,317,007 | 2/1982 | Harrison. |
| 4,317,960 | 3/1982 | Johnson et al. |
| 4,317,961 | 3/1982 | Johnson. |
| 4,475,190 | 10/1984 | Marouf et al. ........................... 370/62 |
| 4,796,293 | 1/1989 | Blinken et al. .......................... 379/202 |
| 4,862,452 | 8/1989 | Milton et al. ............................ 370/62 |
| 4,942,570 | 7/1990 | Kotzin et al. ............................ 370/80 |
| 5,020,098 | 5/1991 | Celli ......................................... 379/202 |
| 5,221,250 | 6/1993 | Cheng ........................................ 494/7 |
| 5,276,678 | 1/1994 | Hendrickson et al. .................... 370/62 |

OTHER PUBLICATIONS

European Search Report issued on Apr. 25, 1994 in connection with related foreign application filed on Jan. 31, 1994, International Application No. PCT/US94/01155.

*Primary Examiner*—Ahmad F. Matar
*Assistant Examiner*—Daniel S. Hunter
*Attorney, Agent, or Firm*—Lahive & Cockfield

[57] ABSTRACT

An improved system for connecting and processing a plurality of phone user in a teleconference on a common digital bus. The apparatus includes a plurality of digital processing units (DSPs) associated with selective phone lines and in communication with each other. Each DSP determines an activity status for each associated phone line and transmits that status to the other DSPs, The DSPs create and update respective identical "talk-lists" which reflect the active conferees whose voice data is currently being output on the phone channels. The system thus provides scaleable teleconferencing in a real-time configuration without switching between the various signals on the common bus such that each incoming caller or even a plurality of conferences has equal priority.

12 Claims, 1 Drawing Sheet

METHOD AND APPARATUS FOR AUDIO TELECONFERENCING A PLURALITY OF PHONE CHANNELS

This application is a continuation of U.S. patent application Ser. No. 08/012,028, filed Feb. 1, 1993, now abandoned. The teachings of those applications are incorporated herein by reference.

RESERVATION OF COPYRIGHT

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to improvements in teleconferencing, and in particular, teleconferencing methods and apparatus which improve the resiliency and processing of a multitude of phone signals.

Teleconferencing apparatus and methods are generally known. Telephone operating companies and other private industries have entered this field to address the teleconferencing needs of particular groups or individuals and to improve the management and control of the teleconference meeting.

A typical conference might include a plurality of individuals who are telephonically connected into a discussion by a single operator at a central locality. The teleconference can be managed or unmanaged and can include a record/playback system to record the discussion and make it available over the phone lines for further consideration by the participants.

Typically teleconferencing systems include that described in U.S. Pat. No. 4,303,804, which collects, processes and redistributes information between a plurality incoming telephone lines. Callers connected to these lines can be grouped into selected conferences, or pooled together as subconferences, and are processed to associate members according to voice energy levels.

Difficulties persist with many prior art audio teleconferencing systems. Most particularly, the available systems typically pass data signals in and out of the phone lines via control and switching circuitry whereby a voice is clipped by the network. As more and more users access the teleconferencing system, the switching time increases and listeners can notice missing initial portions of speech. The switching also takes away valuable processing time which is required to significantly improve the quality of the composite signals outgoing to the various persons in the conference.

Accordingly, it is an object of the invention to provide an audio teleconferencing system which provides for virtual processing of every incoming caller, thereby removing any switching required to access or transmit data to the various callers.

It is another object to provide for improved processing of a plurality of audio phone signals data along a bus, wherein every incoming phone channel is treated with equal priority and the number of users is operationally scaleable (,i.e., without increasing processing overload).

It is also an object of the invention to provide improvements in digital signal processing, the delivery and management of information on a plurality of teleconferencing channels.

These and other objects will become apparent in the description within.

SUMMARY OF THE INVENTION

The invention thus relates to an audio telephone conferencing apparatus and method which features a plurality of digital signal processing units (DSPs) and a common bus for carrying voice digital data along a plurality of phone channels. Each DSP is coupled to the common bus and associated with particular phone channels therein. The DSPs respond to the data on each associated incoming phone channels and generate a status signal representing the particular status of that phone channel. These status signals are transferred along the common bus For access by other DSPs.

In turn, each DSP responds to status signals received from the others to generate an output teleconference signal as a function of all or some of the incoming phone channels. This output signal can represent, for example, a digital mix of the current "talkers" on the incoming phone channels the output signal is transmitted by each DSP along the common bus to the associated listening phone.

In another aspect, the DSPs include an energy detection element for generating the aforementioned status signal to indicate whether there is a selected activity level, e,g., talking, on the associated incoming phone channel. This status signal can be determined, in another aspect, by quantifying the energy level of the data associated in each incoming phone channel. This energy level can also be determined, in yet another aspect, by quantifying a value representative of the difference between the incoming channel data energy level and the average energy level in the output data signal, wherein this difference is greater than a threshold energy value.

In another aspect, the DSP includes a talk-list element which responds to status signals on the bus. The talk-list means, in another aspect, can generate and store a list representing active phone channels whose incoming voice data is selected for output to the conferences. The DSPs are arranged to generate their respective talk-lists identical and substantially simultaneously to one another.

In yet another aspect, the DSP talk-list element selects for representation in the "talk-list" phone channels which have a selected energy level (i.e., an energy level which exceeds the average energy level in the output data signals).

In still another aspect, the DSPs respond the control parameters for at least initializing a teleconference among a plurality of phone channels. A host processor is coupled to the DSPs to generate and store for access those control parameters. By this mechanism, the DSPs can maintain the teleconferencing functionally between at least selected phone channels in the event of a selected fault by the host processor (i.e., the host processor goes "down").

BRIEF DESCRIPTION OF THE DRAWINGS

A more complete understanding of the invention may be obtained by reference to the drawings in which.

DETAILED DESCRIPTION OF THE ILLUSTRATED EMBODIMENT

Figure 1:
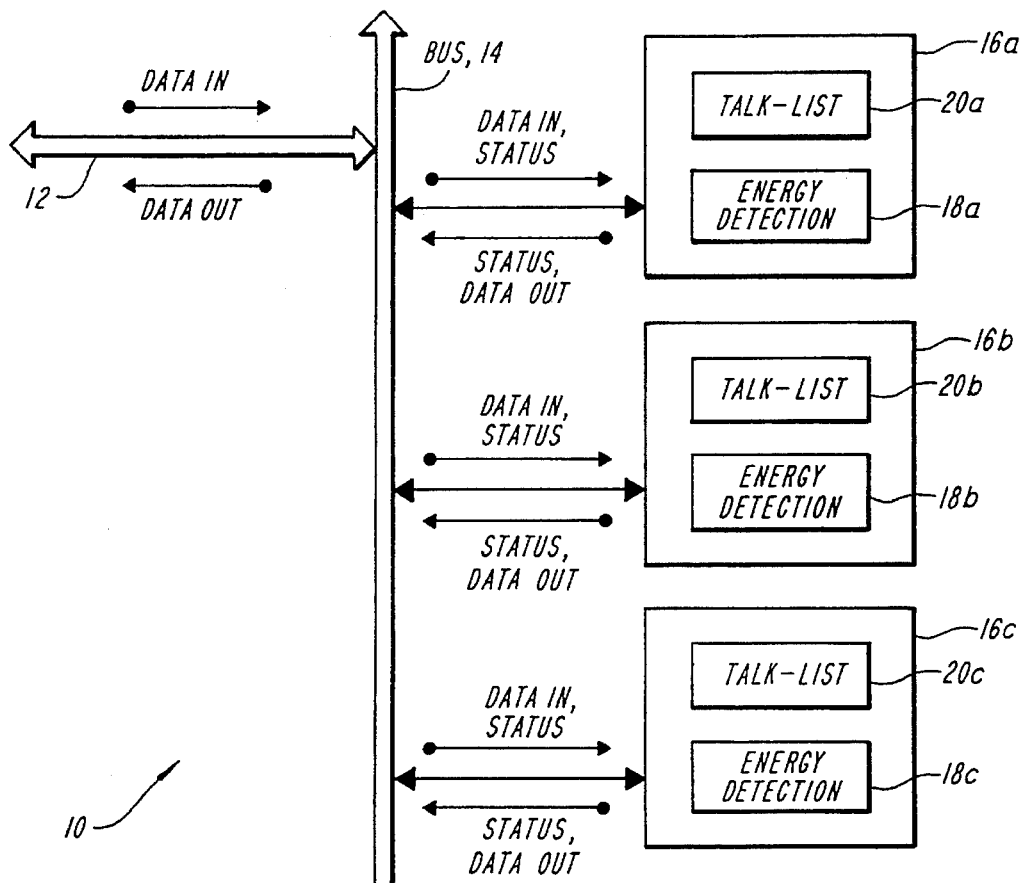
FIG. 1 depicts a teleconferencing apparatus according to the invention.

FIG. 1 depicts a signal processing apparatus 10 for use in a system for teleconferencing a plurality of phone channels (e.g.. T1 line 12), where that system includes a common bus 14 for carrying digital signals representing data incoming from and outgoing to those of phone channels. A further appreciation of these structures, their interaction and operation may be attained by reference to sections 1–3 of Appendix A, and Appendix B, filed herewith.

The apparatus 10 includes a plurality of digital signal processing (DSP) elements 16a–16c, each coupled to the common bus 14 and associated with at least one phone channel, for (i) responding to incoming data on each associated phone channel to generate a signal representative or a status of that phone channel, and (ii) transferring the status signal to the common bus. Each of the DSP's 16a–16c further includes functionality for (i) responding to the status signals associated with the plural phone channels to generate for each phone channel associated with each DSP an output data signal as a function of at least selected ones of the incoming data signals, and (ii) transferring the output data signal on the common bus to the associated phone channel. A further appreciation of these structures, their interaction and operation may be attained by reference to Appendices B–D, filed herewith.

Each DSP 16a–16c includes energy detection functionality 18a–18c for generating the status signal to be indicative of a selected activity level on the associated incoming phone channel. That energy detection functionality generates the status signal as a function of an energy level represented by data in the associated incoming phone channel and, more particularly, as indicative of a value representative of the difference between the incoming data energy level and the average energy in the output data signal being greater than a threshold energy value. A further appreciation of these structures, their interaction and operation may be attained by reference to sections 9–16 of Appendix B, filed herewith.

The DSP's 16a–16c include "talk-list" functionality 20a–20c responsive to the status signals to generate the their respective output data signals as a function of incoming data on a selected number of the phone channels at the selected activity level. The talk-list functionality 20a–20c generates and stores a talk-list representing the phone channels that have the selected activity level, e.g., phone channels that have an energy difference between the incoming data energy level and the average energy in the output data signal that exceeds a designated value, or phone channels having an incoming data energy level that exceeds an average incoming data energy level of the channels represented by current talk list. These talk-lists generated by each DSP are generated identically and substantially simultaneously with each other. A further appreciation of these structures, their interaction and operation may be attained by reference to section 9 of Appendix B, filed herewith.

The DSP's are responsive to control parameters for at least initializing teleconferencing between the plurality of phone channels. A host processor, that is coupled to the DSP's, generates and stores such the control parameters for access by the DSP's, which are capable of maintaining teleconferencing between at least selected ones of the channels in the event of fault by the host processor. A further appreciation of these structures, their interaction and operation may be attained by reference to section 4.10 of Appendix A, Appendices B–C, section 3 of Appendix F, and Appendix I, filed herewith.

Figure 2:
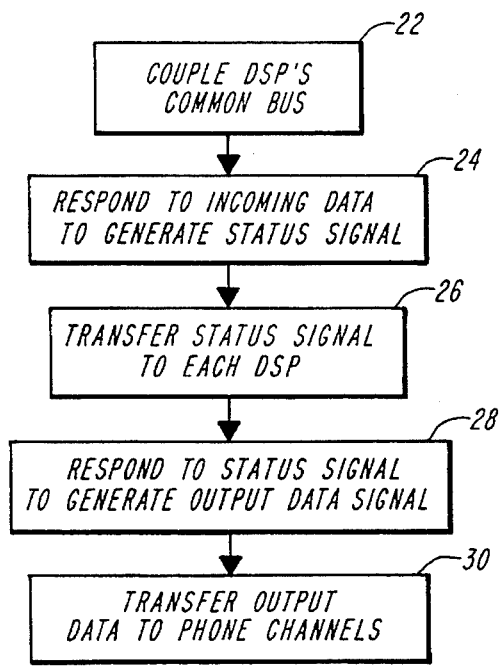
FIG. 2 depicts a teleconferencing method according to the invention.

A method for teleconferencing a plurality of phone channels according to the invention is shown in FIG. 2. The method includes the steps of (i) coupling a plurality of digital signal processing elements (DSP's) to a common bus (step 22), such that each of the DSP's is associated with at least one phone channel, and every DSP receives data from all incoming phone channels; (ii) responding to incoming data on each associated phone channel to generate a signal representative of a status of that phone channel (step 24); (iii) transferring that status signal to each DSP (step 26); (iv) responding to the status signals associated with the plural channels to generate, for each channel, an output data signal as a function of at least selected ones of the incoming data signals (step 28), and (v) transferring those output data signals on the common bus to the associated phone channels (step 30). A further appreciation of these structures, their interaction and operation may be attained by reference to Appendices B–D, filed herewith.

Described above is a preferred system for use in a teleconferencing system meeting the objects hereof. Those skilled in the art will appreciate that other systems, incorporations, modifications, deletions or additions hereto may fall within the scope of the invention, in which we claim:

APPPENDIX A

1. Objective

The objective of this Product Specification is to define the external functions, features, interfaces, and displays that the customer sees in the completed first version of the Digital Conferencing Bridge (DCB) product.

2. General Product Goals

The first DCB product release is a replacement of the System 60 (a "digital MOPS"). The MOPS operator interface is very similar to the current System 60 with changes where necessary to accommodate DCB features such as more lines and more conferences. Some of the older, less used features of the current bridge are dropped in the DCB.

The DCB has a flexible digital hardware and software base to allow future development of enhancements such as an unattended conferencing bridge with remote moderator features, advanced reservation capability, voice and data bridging for groupware teleconferencing, video and ISDN.

3. Hardware

The hardware architecture is based on a PC/AT. The DCB supports a maximum of 96 conferencing channels, 8 operator channels, 3 record/playback, 1 music, 2 Link Lines, and 8 annunciators (7 incoming messages, 1 outgoing). The cards needed to conduct a 96 port conference include: 2 Dual T1 Interface Boards or 4 Single T1 Interface Boards, 4 DSP Conferencing Boards, 1 Analog Interface Board, and 1 Multiple Serial Port Board. Future systems may support tape backup, lan interface, EGAVGA video, etc. The DCB can be configured as a 24, 48, 72, or 96 channel conferencing bridge. Each configuration is fully contained in a rack mountable PC chassis or optional tabletop chassis. System maintenance and diagnostics are done via an ASCII terminal. An optional Hewlett Packard DeskJet printer is available for operator or system printing.

3.1 External Interfaces

The external DCB interfaces include T1 interfaces, printer ports, remote maintenance port, analog interface, serial I/O, and alarms. Each of these interfaces is described below.

3.1.1. T1 Interface

All user voice and data enters the system via the T1 channels. The T1 connector is located on the back of the PC and consists of an RJ45 connector for each T1 interface (up to 4). The standard interface is DSX-1. Up to 24 voice channels can be carried on one T1 circuit. The system is designed to allow enhancement to European E1 lines in the future (up to 3 E1 circuits, 30 voice channels each).

Analog Conferencing—The DCB can be used to conference analog lines however external channel banks, not available from MultiLink, are required for this application.

3.1.2. Printer Ports

A Centronics parallel primer port is located on the back of the chassis for use in general system printing of CDRs, Dialing Lists, Logs, Configurations, Network Statistics, Operator Printouts, and Alarm statistics. Operator initiated printouts, such as polling results, may be redirected to this printer.

3.1.3. Remote Maintenance port

An internal modem is provided for remote maintenance access. The modem supports 9600 mnp5 bps async communication. This port can be used for maintenance or remote administrator concurrently with the local console.

3.1.4. Additional Administrator Terminal

An additional ASCII terminal may be connected to the com0 port located on the back of the system. This port can be used for administrator and maintenance use. Operator screens can be displayed from this terminal however no audio commands (Select Conference, Access, etc.) can be performed.

3.1.5. Analog Interface

The DCB utilizes a 24 channel 2 wire analog interface board, contained in the PC chassis, to interface the various analog I/O, such as operators, music, record/playback, and link lines, into the system. The analog board interface is on the back of the chassis and each channel can be separately broken out from the cable harness. The 8 local operators are supported with 16 analog channels (2 per operator). The music input requires 1 analog channel, record/playback requires 3 analog channels and 2 analog channels are used for the 2 Link Lines supported by the DCB.

3.1.6. Serial I/O

Serial I/O to local and remote operator displays is implemented via an 8 port serial I/O card contained in the DCB. ASCII terminals interface via RS232 signaling on RS232 connectors.

3.1.7. Local Operators

There are a maximum of 8 local operator displays supported in the DCB. Local operator displays are connected to ASCII terminals via the 8 port serial I/O card. Each operator ASCII terminal may have an optional serial printer, connected to the printer port on the rear of the terminal, for operator initiated printing of dialing lists and polling results.

The operator audio interface to the DCB is accomplished through the 24 channel 2 wire analog card which is contained in the DCB. RJ11 connectors are used to connect operator audio to the DCB. Headsets, with volume controls, are supplied at the operator stations.

3.1.8. Remote Operators—Leased Line Operation

Leased line operation requires 14-wire leased line for the data connection. The operator audio path is established by calling into the one of the 96 user channel. Operators must be configured as remote and a user channel must be specified as a remote operator channel. The data connection requires 2 leased line external modems (9600 bps. mnp5), 1 local and 1 remote. The local modem is connected to the serial I/O card and leased line at the DCB and the remote modem connects to the operator terminal and leased line at the remote site. Any or all operators stations may be configured for remote leased line operation. Upon configuring an operator as remote, the local operator audio path becomes inactive. No audio commands (Select Conference, Access, etc.) can be performed until the remote audio path has been established. No headset is supplied for remote configurations.

3.1.9. Remote Operators—Dial Up Operation

Remote dial up operation requires 2 external dial up modems (9600 bps. mnp5) for each remote operator dial up station. The selected operator terminal(s) are substituted with modems at the DCB and each remote operator terminal is connected to a modem. The remote operator audio is established by calling into one of the 96 ports on the DCB which is configured as a remote operator audio path. Any or all of the 8 local operators may be configured as remote dial up operators. Upon configuring an operator as remote, the local operator audio path becomes inactive. No audio, commands (Select Conference, Access, etc.) can be performed until the remote audio path has been established. No headset is supplied for remote configurations.

3.1.10. Music Input

The DCB inputs using 1 of the 24 channels of the analog board. An RJ11 connector is used to connect the music into the DCB.

3.1.1.1. Record/Playback

Conference recording/playback is done via the 24 channel analog board. There are 3 record/playback channels available. RJ11 connectors are used to connect the external recorders to the DCB.

3.1.12. Link Lines

The Linking together of DCBs is supported via the 24 channel analog board. The DCB supports 2 4-wire Link Lines. Each Link Line uses 2 channels of the analog board, one pair for transmit and the other pair for receive, for linking. RJ11 connectors are used as the linking interface from DCB to DCB or DCB to analog bridge.

3.1.13. External Alarms

A DB15 connector is used as the external alarm interface from the DCB. It provides 4 contact closures in the event of an alarm condition—major audible, major visual, minor audible, minor visual. The closure or opening of contacts can be monitored by an external device to signal network personnel of major/minor alarms. Alarm conditions include: Software Errors, T1 failures, Dead-man timer, loss of power. The contact ratings for the alarms are 100 v, 1 A. An alarm cutoff switch is available which opens the major and/or minor audible alarms on request. This switch is located on the front of the unit. The CPU may be reset remotely.

3.2 Power 90-230 VAC external switch, user selectable, 47–63 hz power supply or a 48 VDC power supply. Suitable for use in central offices, Europe and Japan.

3.3 Environmental Specifications

The DCB is designed for office or equipment room use. It is not designed to be installed in Central Office locations requiring Bellcore CO certification.

Temperature: 0–40 degree C.

Relative Humidity: 10%–90% non condensing

3.4. Controls

3.4.1. Main Unit

Power on/off—located on front of the unit. Key Required.

Reset—located on front of the unit. Key Required.

Audible Alarm Cutoff—located on front of the unit. Key Required.

3.4.2. Operator Station

Wyse 60 (or similar) controls and setup menus.

A volume control on the headset.

3.5. Displays 3.5.1. Main Unit

Power Supply Status—+5 v, −5 v, +12 v, −12 v green LED for each.

Hard Disk activity—Green LED.

CPU Status—Green LED.

Major Alarm—Yellow LED.

Minor Alarm—Yellow LED.

3.5.2. Operator Station

Wyse 60 display. For the function, refer to MMI under the software description.

3.6. Packaging

The packaging for the DCB main unit is a 19" rack mountable PC chassis. An optional cabinet is available for stand alone systems. Wyse 60 terminals, headsets, and optional HP Deskjet printer are also part of the system. MultiLink logos are used on the terminals, PC chassis, optional cabinet, printers, and headsets.

3.7. Internal Specification Highlights 3.8. Options

Port capacity—up to 96 total conferencing channels configurable in 24 port increments.

Operator stations—2 per 24 ports installed, up to a maximum of 8 total operator stations with each separately configurable as local, remote leased line, or remote dial up.

Administrator Terminal—1 terminal in addition to the 8 operator terminals may be connected to the com0 port located on the back of the system for administrator and maintenance use.

Link lines—1 per 24 ports installed, up to a maximum of 2 link lines are available.

RecordPlayback—1 per 24 ports installed, up to a maximum of 3 record/playback lines are available.

Annunciators—2 per 24 ports installed, up to a maximum of 8 annunciators are available.

4. Software

The multi-user bridge operating system and digital signal processing software crone with the basic system. A relational database is not needed in the basic system because the functionality is basic System 60. All local and remote CRTs are simple async/ASCII terminals or user supplied PCs with ASCII terminal emulation. No windows or mice are used. The Man-Machine Interface software is designed to allow it to operate in the future with X windows and a mouse. It is a goal to maintain as much of the look and feel of System 60 to minimize the learning time of a person familiar with the System 60. The software supports 96 conferencing channels, 8 operator channels (local or remote), 1 music input, which can be placed into any and all conferences simultaneously, 3 record/playback channels, and 2 link lines. Up to 48 simultaneous interactive conferences can be held on the bridge. System configurations, and dialing lists are stored on the hard disk.

4.1. System Features

Digitized Audio Messages

Programmable Operator terminal bit Rate

Port count/2 Simultaneous Conferences

Programmable conference Tones on Entry/Exit

DTMF Dialing-direct, speed dial and blastup

Touch Tone into conference minimized

Call closed transaction log files (CDRs)

Hot reboot—O/S reboot without losing conference

Linking multiple systems ("link lines")

4.1.2 Terminal Accessible Features

There are five types of users:

1. The ordinary conferee (user) using a telephone with touch tone keypad.
2. A moderator using a touch-tone telephone. He has the capabilities of an ordinary user plus some special privileges.
3. An operator using a CRT locally or remotely to run a conference.
4. A system administrator at a local or remote CRT.
5. Maintenance personnel at a local or remote CRT or computer.

4.2. Man-Machine Interfaces

There are two man-machine interfaces:

1) A normal telephone handset with DTMF keyboard is used by the conferee and the moderator. The user responds by typing numbers on his telephone keypad.
2) An ASCII terminal or a PC with ASCII terminal emulation is used by the Operator, the System Administrator and Maintenance personnel.

4.2.1. Conferee MMI

When the bridge answers an incoming call a message is played to the caller. Incoming calls may be set to not hear a message when the bridge answers the call. When the call enters the DCB and has passed through the annunciator state the caller is then placed into the ENTER conference, where music is played, and remains there until an operator accesses the caller.

Each of the 48 conferences may be configured to generate a tone to other conferees when a new caller is added to the conference (Entry Tone). This tone is heard, if enabled, by all channels in the conference.

Each of the 48 conferences may also be configured to generate a tone when a caller disconnects from a conference (Exit Tone). This tone is heard by all remaining conferees.

The system can be configured to generate a 2 beep DTMF acknowledge tone to each caller that enters a valid DTMF digit. Valid DTMF digits include: DTMF '0'—Help Request, DTMF '1'—Add to Q&A question queue, DTMF '#'—remove from Q&A question queue, and DTMF '1'—'9' while in polling.

4.2.2. Moderator-monitoring via telephone MMI

Conference moderator(s) obtain all the conferee MMI described above with some added features. When a conference is lectured only moderators can be heard by other conferees. If Conference Security is enabled the moderator may secure the conference (i.e. lock out the operators) by pressing a DTMF '7'. Upon securing a conference the moderator hears a 2 beep tone informing them the conference is secure. Conferences can be unsecured by pressing a DTMF '7' upon which a 3 beep tone is heard by the moderator and the operators can now move into the conference.

4.2.3. Sign-In MMI

Operator, Administrator, and Maintenance screens are all accessible from any terminal. All terminals have a Sign-In display and the proper sign-in name and password must be entered to gain access to the system. When entering the password '*'s are displayed in place of the characters entered to maintain security. Valid sign-ins can be entered from any terminal. Operator sign-ins have access to only the operator screen. Administrator sign-ins have access to the administrator and operator screens and maintenance sign-ins have access to maintenance, administrator, and operator screens. The default sign-ins are:

Operator Screen: Sign-In Name—oper Password—abc123

Administrator Screen: Sign-In Name—admin Password—abc123

Maintenance Screen: Sign-In Name—maint Password—abc123

The system can save hundreds of different sign-ins to the hard disk and these are created and deleted via the administrator menu. When a terminal is powered on the screen displays the sign-in screen, shown below. The window at the top of the screen displays messages from the system. The last 8 messages received are displayed.

Exiting from either the operator, administrator, or maintenance screens brings up the sign-in screen. If power is turned off when an operator, administrator, or maintenance screen is up, the system automatically exits the current screen and, when power is restored, the sign-in screen is displayed.

4.2.4. Operator MMI

The DCB Operator controls and displays are intended to perform the same functions in a familiar manner to the System 60. Some enhancements are necessary because the DCB has more lines and more conferences. The operator stations each consist of a dedicated terminal and audio path. Operator display #1 is dedicated to operator audio port #1 on the analog interface board and so on.

Logging into the system correctly and entering the proper password clears the screen and screen #6, summary screen, is displayed. When the session is finished the operator may log out of the system by executing the "Exit" command under the "Options" submenu. Powering down the terminal automatically executes the logout procedure as does a modem disconnection in the case of remote operators. Operators logging out of the system return the display to its initial state, i.e. any accessed lines are released, any command lines being built are aborted, and the Main menu is displayed.

4.2.4.1. Screen Displays

The DCB supports a total of 8 operator stations running independent conference screen displays. The screen displays vary the number of channels displayed, the number of lines per display, and whether or not the conferee name is displayed. Each screen display is divided into three sections; 1>. Line Status Area—This displays information about all lines in the bridge. 2>. Conference Status Area—This displays information about all the conferences on the bridge. 3>. Operator Status Area—This displays operator information.

4.2.4.1.1.Line Status

The Line Status area is the same for each screen (line detail, summary, etc.). The summary screen, however, does not display the line name. The display format for each line is:

"*01-C01 LS AG NAME"

*—Talk indicator, displays current talker.

01—Line number.

C01—Conference number.

LS—Line Status. Can be any of the following:
  DC—Disconnect. Any line that has disconnected from the DCB is displayed in reverse video with 'DC' in the line status field. The conference the line was in before it disconnected is also displayed as is the name of the conferee.
  MO—Moderator. Indicates if the line is the moderator of the conference. This is set from the 'Access' or 'Line' menu.
  MU—Mute. Indicates if the line is muted. This is set from the 'Access' or 'Line' menu.
  FL—Fault Line. Indicates if the line is faulted. Faulting a line is done from the 'Access' or 'Line' menu.
  OS—Out of Service. Indicates a line has been taken out of service by he system.
  AG—Automatic Gain. Indicates Automatic Gain Control is turned on for the specified line. Gain is set through the 'Access' or 'Line' menu.

NAME—Displays the name associated with the line. Up to twenty (20) characters.

4.2.4.1.2. Conference Status

The conference status area of the screen displays all pertinent conference information. This includes total participants, conference name, current speaker, etc. The top of the conference status area displays a header and under each header item is the conference information pertaining to that item. The following describes all the conference status information.

"C TP NAME SP MLRPSTL"

C—Conference Number (01–48).

TP—Total Participants in conference.

NAME—Operator assigned conference name. If Display Minutes per conference command is issued the 'NAME' header is changed to 'MINS' and the minutes are displayed. The minutes are cleared and the names displayed if a refresh command is issued. Up to 12 characters.

SP—Current speaker in conference.

M—Music. An 'M' is displayed if music is in the conference. Nothing is displayed if music is not in the conference.

L—Conference Lecture. An 'L' is displayed if the conference is lectured else nothing is displayed.

R—Record Conference. The record/playback channel in the conference is displayed (1–3) if the conference is being recorded. If there is no record channel in the conference nothing is displayed.

P—Playback Conference. The record/playback channel in the conference is displayed (1–3) if the conference is being played to. If there is no playback channel in the conference nothing is displayed.

S—Conference Security. If the operator turns on security an 'S' is displayed. If a moderator activates the security feature the 'S' is reverse video. If the security feature is turned off nothing is displayed.

T—Conference Tone. If the Entry tone is turned on for the conference an 'E' is displayed. If the exit tone is turned on an 'X' is displayed. If both entry and exit tones are turned on a 'B' is displayed. If neither entry or exit tones are turned on nothing is displayed.

L—Link Channel. Displays which link channel (1 or 2) is currently in the conference. If there is no link channel in the conference nothing is displayed.

4.2.4.1.3. Operator Status

The operator status area of the screen displays information concerning available lines, number of disconnects, etc. The definitions of all the operator status items are:

AVL—Number of unused lines available on the system. Not including disconnects.

DC—Number of disconnects on the system.

ENT—Number of lines in the 'ENTER' conference.

FLT—Number of lines faulted.

HLP—Number of lines or conferences requesting help.

Q&A—Number of callers in the Q&A queue. Only if running a Q&A session.

PLL—Number of callers that have responded to a poll. Only if running a polling session.

OPR—The conference the operator is currently in.

TLK—Tells the operator whether or not they can be heard by conferees. (on or off).

4.2.4.1.4. Operator Screens

Operators can select 1 of 7 different screen displays. Selecting screens is done by entering the appropriate screen number at any menu.

4.2.4.2. Command Menu

The operator interface software supports up to six simultaneous operators. Each operator has access to all commands. The DCB product supports a softkey operator interface based upon the current System 60 product. Commands may be accessed through the menu structure. The command options are displayed at the bottom of the operator screen. Upon the implementation of a command the Linx prompts the operator for the necessary information (i.e. line numbers, conference numbers, etc.). All commands may be run or submenus displayed by moving the cursor to the desired selection and pressing return or by entering the first letter, or capitalized letter, of the item. If a command (Italics) is selected the operator is prompted for the information necessary to perform the command, or the command is simply run if no information is required. If a submenu (Bold) is selected the options under that submenu are displayed. The 'ESC' key aborts any command in progress or moves the operator to the MAIN menu. A line editor is present and allows operators to insert and delete characters on the command line using the left and right arrow keys, the del key, and the backspace key.

SYSTEM 60 COMMAND MENU STRUCTURE

MAIN: Access Conference Display Enter Fastdial Help Line Options Purge Refresh Set Transfer
ACCESS: Dial Fault Gain Hangup Moderator mute Name Release Transfer
CONFERENCE: Clear_all Entry_tone Hangup Lecture Name Playback polling Q&A Record Security eXit_tone
POLLING: Clear Help mUte print_All print_Summary Release Tag_digit
Q&A: Clear Gain redraw Resume
DISPLAY: aNswer Calls Gain Line_connect_times Minutes_per_conference Operator_status Show_conferences Total_line_times
FASTDIAL: Blastup Create_list Dial dUplicate Modify Print Remove_list
MODIFY: Add Change Delete
LINE: Fault Gain Hangup Moderator MUte Name
OPTIONS: Annunciator Chat Exit Scan
ANNUNCIATOR: Playback Record
PURGE: Call_counts Disconnects Minutes_per_conference Total_times
SET: Nighttime Scan_time
TRANSFER: Conferees Link_lines There are default commands which are not displayed in the command menu. These commands are used to turn on operator talk, change operator displays, and select conferences. These commands consist of:

Operator Talk—spacebar or dash (-)

Conference Group Select—F13–F16
F13=Conference Group 01–12
F14=Conference Group 13–24
F15=Conference Group 25–36
F16=Conference Group 37–48

Conference Select 01–12—F1–F12
Conference Select 15–24—F1–F12
Conference Select 25–36—F1–F12
Conference Select 37–48–F1–F12

Screen Displays—0–6

The default commands work from any menu. The Operator Talk command allows the operator to speak to a conference. The Conference Group Select commands select which group of conferences the system displays and which conferences the operator can move to using function keys F1–F12. The Conference Select keys move the operator and the accessed line, if a line is accessed, to the specified conference. The Screen Displays are defined in the next section of this document.

4.2.4.3. Command Definitions 4.2.4.3.1 Main Menu Commands

Access

Access is a dual function command. If an operator is accessed to a line the ACCESS submenu is displayed. If an operator is not accessed to a line the system prompts:
ACCESS <line>

The operator may enter a line number (1–96) and be moved automatically to the access menu. If a remote operator is to be accessed entering a 01–08 accomplishes this. The operator cannot move into the ACCESS submenu without being accessed to a line. If a <return> is entered with no line number at the command prompt the Linx finds a free line, accesses that line to the operator and moves to the ACCESS submenu. If a line is active (i.e. in a conference) the Linx responds with:
Access Line xx Conference #yy
ARE YOU SURE (Y/N):

Entering a 'Y' accesses the line. An 'N' or 'ESC' aborts the command. Any other key has no effect. If a line accessed cannot be viewed by the operator because of the operator screen being displayed the system automatically switches to a similar display which supports the viewing of the line.

Conference

This item displays the CONFERENCE submenu.

Display

This item displays the DISPLAY submenu.

Enter

Enter is a command which automatically accesses the operator that initiated the command to the next line in the 'ENT' conference. A line is moved into the 'ENT' conference by calling into the bridge. Upon the operator being accessed to a line using the 'Enter' command the ACCESS submenu is displayed.

Fastdial

This item displays the FASTDIAL submenu.

Help

Help is a command which either:
a). Moves the operator to the conference that has requested help.
b). Accesses the line that requested help to the operator which initiated the help command and then displays the ACCESS submenu.

The two different modes of help may be set in the configuration menu. The help requests can either be by conference or by individual line. When conference help is requested the appropriate conference number in the conference status area of the display is reverse video. When individual help is requested the appropriate line number in the line status area of the display is reverse video. When conference help is selected and a muted line requests help, the line is placed into the help queue, not the conference.
Line
   This item displays the LINE submenu.
Music
   This command places music into a conference. Upon initiating this command the Linx prompts:
MUSIC <conf#>-
   The operator may then enter the desired conference. If Music is presently in the conference then it is removed. If music is not in the conference then it is added. Upon adding music to a conference the conference status window is updated displaying an 'M' in the location corresponding to the appropriate conference and all the lines in the conference are muted.
Options
   This item displays the OPTIONS submenu.
Purge
   This item displays the PURGE submenu.
Refresh
   This command clears the entire screen and rewrites it.
Set
   This item displays the SET submenu.
Transfer
   This item displays the TRANSFER submenu.
4.2.4.3.2 Access Submenu Definitions
Dial
   This command allows the operator to dial a telephone number on the line accessed. A name may also be entered. The system prompts:
DIAL <name><number>-
   A telephone number of up to 40 digits in length may be entered along with a name of up to 20 characters. The '#' and '*' digits may be dialed simply by entering them from the keyboard. A dial pause can be issued by entering a 'space' between digits.
Fault
   This command allows the operator to take a line out of service. Upon faulting a line the Line status area of the display reflects the new status. The fault command under the line submenu is used to unfault faulted lines.
Gain
   This command turns on the automatic gain feature for the accessed line. When on, the line is automatically given gain if the input level received from the line is determined to below. The maximum amount of gain which can be given to a line is 10 dB. If the line currently does not have automatic gain then the gain is turned on. If automatic gain is currently on then it is turned off.
Hangup
   This command hangs up the accessed line from the system.
Moderator
   This command flags the accessed line as a moderator and updates the line status area accordingly. If the line is currently a moderator then the moderator flag is turned off. If the line is not a moderator then the moderator flag is turned on.
mUte
   This command allows the operator to mute the accessed line. If the line is currently muted then it is unmuted. If the line is not muted then it is muted.
Name
   This command allows the operator to assign a name to the accessed line. The system prompts:
NAME <name>-
   The name may be up to twenty (20) characters in length and is displayed in the line status area.

Release
   This command releases the accessed line from the operator and places it back into the conference from which it was accessed. If the line was previously inactive or faulted it is disconnected from the system.
Transfer
   This command allows the operator to transfer the accessed line to another port. The system prompts:
TRANSFER <number/extension>-
   The system then flash hooks the line and dials the specified digits. The line is then disconnected from the operator and the operator is moved back to its previous conference. This feature only works if the system is connected to a switch or PBX which supports call transfers.
4.2.4.3.3 Conference Submenu Definitions
Clear_all
   This command turns all conference options off and removes any peripheral channels from the conference. Upon initiating the command the Linx prompts:
CLEAR ALL <conf(s)>-
   The operator may then enter the desired conference(s). All conference options are turned off and any record/playback or link lines are removed from the conference. Upon clearing a conference, the conference status window is updated to reflect the change.
Entry_tone
   This command toggles the entry tone heard by conferees as they enter a conference. Upon initiating the command the Linx prompts:
ENTRY TONE <conf(s)>-
   The operator may then enter the desired conference(s). If the entry tone is presently turned on for a conference then it is turned off. If the entry tone is presently off then it is turned on. Upon turning on or off the entry tone the conference status window is updated to reflect the change.
Hangup
   This command hangs up all conferees in the conference which is specified in the command. Upon initiating the command the system prompts:
HANGUP <conf#>-
   After entering a conference number the system prompts:
HANGUP CONFERENCE #XX
ARE YOU SURE (Y/N):
   Entering 'Y' hangs up the conference. Entering 'N' or 'ESC' brings the operator back to the Main Menu.
Lecture
   This command allows the operator to lecture an entire conference. Only lines flagged as moderators are able to be heard by other conferees. The command prompt is:
LECTURE <conf.>-
   The specified conference is then lectured and this is displayed in the conference status window. The lines in the lectured conference display an 'MU' in the line status area to show the lines cannot add speech to the conference.
Name
   This command allows the operator to assign a name to a particular conference and have the name displayed in the conference status window. The system prompts:
NAME
<conf#><name>-
   The entered name may be up to 12 characters in length.
Playback
   This command allows the operator to place one of the playback/record channels into a conference and, through the use of an external tape recorder, play a tape or music to the entire conference. Upon inserting a playback channel into a conference the conference is lectured. The system prompts:

PLAYBACK
<conf#/'Remove'><ch#>-

If an 'R' is input in place of a conference number then the specified channel is removed. Upon removing or inserting a channel into a conference the conference status area of the display is updated to reflect the changes.

Polling

This command allows the operator to poll a conference for DTMF digits. The operator or a moderator may ask a yes/no or a multiple choice question that requires conferees to depress any one key on their keypad. This command is located in the 'Conference' submenu. Upon initiating the command the system prompts:
POLL
<conf#>-

After entering a conference number the system then updates the conference status window and displays the polling submenu. Upon callers entering digits the screen is updated to reflect the total numbers of each digit entered and each line displays the digit entered in the conference number field of the line status display. Digits 1–9 are supported.

Entering 'ESC' from the polling submenu prompts:
EXIT POLLING
ARE YOU SURE (Y/N):

Entering a 'Y' returns to the Main Menu. Entering a 'N' or 'ESC' displays the polling submenu.

Clear—Polling

The operator is able to clear out all digits to prepare for another poll by pressing a 'C'. The system prompts.
CLEAR LINES
<line(s)/'All>-

Lines may be entered an 'A' to clear all lines.

Help—Polling

The operator can access a line in the polling conference that has requested help by pressing an 'H'.

Mute—Polling

The operator may mute or unmute lines while in polling by entering a 'U'. The system prompts.
MUTE
<line(s)>- then prompts for line to muted or unmuted, depending on their present state.

Printing—Polling

The operator printing of the results is supported by pressing an 'A' (print_All), to print all line information along with totals and digit information, or an 'S' (print_Summary), to print only totals and digit information. Upon printing the system prompts:
ENTER TEXT The operator can now enter any comments that should be printed out with the results (i.e. the question asked). The printing can be done via the operator terminal, the system printer, or it can be saved to the hard disk. See System Administrator Operator Station Configuration for details.

Release—Polling

Pressing an 'R' releases the accessed line and the operator back into the conference.

Tag_digit—Polling

The tagging of digits is supported by pressing a 'T'. This prompts the operator with:
TAG DIGIT
<digit><tag>-

The operator can enter a digit and the tag, up to 18 characters, which is then displayed in the conference status area of the screen. Default Commands—Polling The operator talk command and the switching of screen displays is supported while in polling. Question & Answer The Q&A command performs as follows: The operator selects Q&A mode from the operator display. The Linx prompts the operator for the conference and upon entering this information all lines in the conference, except for the moderator(s), are muted.
Q&A
<conf#>-

The screen display changes to display the moderator(s) and the lines which have pressed the "question" key (DTMF '1'). Upon pressing the question key the Linx displays the lines according to their queue position not according to line number.

Help requests are displayed on the screen with the line number in reverse video. The operator may service a help request while in Q&A by moving the cursor to the line requesting help and pressing <RETURN>. This accesses the line to the operator. Pressing <return> again places the line back into the conference.

Operators may access the moderator(s) by moving the cursor to the moderator line and pressing <RETURN>. This access the moderator to the operator. Pressing <RETURN> again places the moderator back into the conference.

The first caller in the queue is displayed on the top left corner of the screen, after the moderator(s) in reverse video. Callers may remove themselves from the Q&A queue by entering a DTMF '#'. No lines except the moderators and the lines wishing to ask a question are displayed on the screen. The operator can use the arrow keys to move from caller to caller. By pressing <RETURN> the highlighted line is unmuted, begins blinking and can be heard by other conferees. When the operator presses <RETURN> again, the line is removed from the screen and the next person in the queue is now highlighted.

Entering 'ESC' from the Q&A submenu prompts:
EXIT Q&A
ARE YOU SURE (Y/N):

Entering a 'Y' returns to the Main Menu. Entering a 'N' or ESC' displays the polling submenu.

Pressing an 'ESC' terminates the Q&A feature however the status of all lines are saved and is displayed when Q&A is entered again.

Clear—Q&A

The queue can be cleared out by issuing the 'Clear' command. Entering this command clears all lines in the Q&A queue and updates the screen accordingly.

Gain—Q&A

While a line is highlighted the operator may turn gain, for that line, on or off by pressing a "G". If gain is presently on for the line it is turned off. If gain is presently off for that line it is turned on. This command turns on the automatic gain feature for the accessed line. When on, the line is automatically given gain if the input level received from the line is determined to be low. The maximum amount of gain which can be given to a line is ??? dB.

Redraw—Q&A

This is similar to the refresh command. It clears and redraws the entire Q&A screen.

Resume—Q&A

After the operator unmutes a line by pressing <RETURN> the line can then be muted again and either removed from the Q&A queue by pressing <RETURN> again or it can be left in the Q&A queue by entering an 'R'.

Default Commands—Q&A

The operator talk command and the switching of screen displays is supported while in Q&A.

Record

This command allows the operator to place one of the record/playback channels into a conference and, through the use of an external tape recorder, record a conference. The system prompts:
RECORD
<conf#/'R'emove><ch#>-

If an 'R' is input in place of a conference number then the specified channel is removed. Upon removing or inserting a channel into a conference the conference status area of the display is updated to reflect the changes.
Security This command allows the operator to setup a conference for security. Upon turning on security for a conference the moderator in that conference may then activate the security feature by pressing a '7' on their DTMF telephone. Operators are then denied access to that conference unless a request for assistance is made. The system prompts:
SECURITY
<conf#(s)>-

Upon turning security on or off the conference status area is updated. A secured conference can no longer request operator help. The conference security must be turned off in order to request operator help.
eXit_tone This command toggles the exit tone heard by conferees as other conferees exit a conference. It works the same as the Entry_tone command.

4.2.4.3.4 Display Submenu Definitions
aNswer

The display answer command allows the operator to view the answer status (whether or not a line answers a call) of each line on the system.
Calls The display calls command allows the operator to view the number of calls per line and the total number of calls per system. Calls are incremented when a conferee disconnects.
Gain The display gain command allows the operator to view the status of the automatic gain feature of each line on the system.
Line_connect_times The display line connect times command allows the operator to view the current connect time for each active line on the system (from system answer to current time).
Minutes_per_conference The display minutes per conference command allows the operator to view the number of minutes accumulated for the 12 conferences being displayed.
Operator_status This command allows each operator to view the status of all operators on the system. The conference status Window is updated to display (1) type of operator card (local or remote), (2) the line accessed by the operator, (3) if the operator is remote and the operator is accessed by another operator, which operator is accessing it, (4) automatic gain, on or off, for remote operators, (5) which conference the operator is currently in, (6) operator talk, on or off, (7) operator name up to 8 characters (this is not labeled). This screen is displayed and updated until either a refresh command or a screen change command is issued. Note: Leased Line operators are displayed as LOCAL.
Show Conferences This command toggles the operator between viewing all lines in all conferences or only the lines which are presently in the same conference as the operator. Default is all lines in all conferences. The message "One Conf." is displayed on the top of the screen when the system is displaying only active conferences. When the system is displaying all conferences the message "All Confs." is displayed.

Total_line_times

This command allows the operator to view the total number of minutes accumulated on all lines and the total amount of system time.

4.2.4.3.5. Fastdial Submenu Definitions

The Fastdial submenu allows operators to create dialing lists for use in blast up dialing or speed dialing. There can be up to 25 dialing lists with each list containing up to 96 telephone numbers and names. Upon creating a list it is automatically saved to disk. The lists may be accessed by any operator or all operators simultaneously. Along with creating lists, operators may remove entire lists, print, duplicate, or modify these lists. Upon accessing a dialing list the operator may scroll through the list using the arrow, keys. Entering an item number and pressing <RETURN> moves the operator immediately to the specified item. Dialing lists may accessed from any of the 6 operator displays and the differences between the 25 line and 43 line displays is shown below.
Blastup Dialing This command allows the operator to blastup an entire dialing list. This command is located in the 'Fastdial' submenu. Upon initiating the command the system prompts:
BLAST
<conf#>-

A conference may be entered or, if only a <return> is pressed the system selects an empty conference. The system then prompts with:
BLAST
<Starting Line>-

A line number may be entered or, if only a <return> is pressed line #1 is used.

The system then displays all the dialing lists available. The operator must choose the list they wish to blastup. Choosing a list may be done by using the arrow keys to highlight the desired list and then pressing <return>.

After a list has been selected, the items in that list are displayed on the screen. Items in the list can be flagged not to dial by using the up and down arrow keys to move through the list and pressing <return> when the item in question is highlighted. Upon doing this the item is flagged and is not dialed during the blastup procedure.

When the operator is ready to begin, pressing a 'B', initiates the blastup procedure. Lines are dialed and placed into the "CLPG" conference where they hear a repeating message (this message is recorded on annunciator #5). The callers can then press a DTMF '1' on their telephone and are moved into the conference. An 'N' may be pressed to automatically access the next caller in the call progress queue. Pressing an 'N' again places the line into the selected conference. Pressing an 'H' hangs up the accessed line.
Create_list This command allows the operator to create a dialing list and enter a series of telephone numbers and names to that list. Upon initiating the command the systems prompts:
CREATE LIST
<name>-

Upon entering a name (xyz for this example) the system prompts:
CREATE LIST—xyz
<name><number>-

The telephone number may be up to 40 digits in length and the name up to twenty (20) characters. The <name><number> prompt continues to appear until either the list is full (i.e. 96 items have been entered), or an 'ESC' is pressed. If an 'ESC' is pressed the operator is returned to the FASTDIAL menu and not the MAIN menu.

Dial

This command allows the operator to fastdial a specific dialing list. Upon initiating the command the system prompts:

DIAL
<conf#>-

A conference may be entered or, if only a <return> is pressed the system selects an empty conference.

The system then displays all the dialing lists available. The operator must choose the list they wish to dial. Choosing a list may be done by using the arrow keys to highlight the desired list and then pressing <return>.

After a list has been selected, the items in that list are displayed on the terminal. The operator may then, using the arrow keys, move down, or up, through the list until the desired item is highlighted.

When the operator presses <return> the system finds a free line, accesses that line to the operator, opens the operator talk path, updates the screen, and dials the number. If a connection is made the operator may place the line into the selected conference by pressing <return>.

If no connection is made (busy, ring no answer) the operator may hangup the line by pressing an 'H'.

The operator talk key command works while in the fastdial mode.

Duplicate List

Upon pressing a 'U' (dUplicate) the system displays all the available dialing lists. The operator may choose the list to reproduce by using the arrow keys to highlight the desired list and pressing <return>. After selecting a list the system prompts with:

DUPLICATE
<NAME>-

The operator enters the name and a new list is created.

Modify List

The Modify list command allows the operator to add, change, or delete items to/from a dialing list. Upon selecting the modify list option a submenu appears prompting the operator with ADD, CHANGE, and DELETE.

After selecting either ADD, CHANGE, or DELETE all the dialing lists are displayed on the screen. The operator may then choose a list by using the arrow keys to highlight the desired list and pressing <return>.

If ADD is selected the system prompts:
Add item to list—xyz
<name><number>-

The operator may now enter new items to the selected dialing list until either, the list is full, or an 'ESC' is entered.

If CHANGE is selected the system displays the items in the selected dialing list. The operator can select an item to change by using the up and down arrow keys. The left and right arrow keys may then be used to move the cursor through the field and make the necessary changes to the telephone number and/or name. The 'DEL', 'BACKSPACE', 'HOME', and arrow keys are used for editing. Insert mode is always enabled and any character entered updates the screen. When updating the telephone number use only '0'–'9', '*', '#' or a space. Once editing an item is complete, pressing <RETURN> modifies the dialing list and updates the other operator screens. To abort an edit use the up or down arrow keys.

If DELETE is selected the system displays the items in the selected dialing list. The operator may delete an item by using the arrow keys to select the desired item and press <return>.

Printing Dialing Lists

This command allows the printing of dialing lists. Upon pressing a 'P' the system displays all the available dialing lists. The operator may choose the list to print by using the arrow keys to highlight the desired list and pressing <return>. The printing can be done via the operator terminal, the system printer, or it can be saved to the hard disk. See System Administrator Operator Station Configuration for details.

Remove List

This command allows the operator to remove a list from the system. Upon initiating this command, all the dialing lists in the system are displayed. The operator may then, using the arrow keys, select the list to be deleted. Pressing <return> initiates the prompt:

Delete list-xyz
(Y/N)p

Entering a 'Y' deletes the dialing list. Entering an 'N' or 'ESC' aborts the deletion. Deletion may only be performed if no other operators are in the fastdial submenu.

4.2.4.3.6. Line Submenu Definitions

Fault

This command allows the operator to take a line out of service. Upon initiating the command the Linx prompts:

FAULT
<line(s)>-

The operator may then enter the desired line(s). If a line is presently faulted then it is unfaulted. If a line is unfaulted then it is faulted.

Gain

This command turns on or off the automatic gain feature for the specified line(s). When on, the line is automatically given gain if the input level received from the line is determined to be low. The maximum amount of gain which can be given to a line is 10 dB. Upon initiating the command the Linx prompts:

GAIN
<line(s)>-

The operator may then enter the desired line(s). Upon turning gain on or off the screen is updated to reflect the change.

Hangup

This command allows the operator to hangup a line or group of lines from the system. Upon initiating the command the Linx prompts:

HANGUP
<line(s)>-

The operator may then enter the desired line(s). If a line entered by the operator is presently active or it is in the 'DC' state it is disconnected from the system. Upon hanging up lines from the system the screen is updated to reflect the change.

Moderator

This command allows the operator to flag a line or lines as moderators. Upon initiating this command the system prompts:

MODERATOR
<line(s)>-

The operator may then enter the desired line(s). If a line entered by the operator is not presently active it is not affected by this command. Upon making a line a moderator the screen is updated to reflect the changes.

Mute

This command allows the operator to mute a line (no audio from the line enters the conference) or group of lines. Upon initiating the command the Linx prompts:

MUTE
<line(s)>-

The operator may then enter the desired line(s). If a line entered by the operator is not presently active it is not affected by this command. If a line is presently muted when the command is issued the line is then allowed to talk to the conference. If the line was presently allowed to talk to the conference and the command was issued the line is muted. Upon muting or unmuting lines the screen is updated to reflect the changes.

Name

This command allows the operator to name a line. Upon initiating the command the Linx prompts:

NAME

<line><name>-

The operator may then enter the desired line followed by a maximum 20 character name. If a line entered by the operator is not presently active it is not affected by this command. Upon naming a line the screen is updated to reflect the changes. Operator lines may be named by entering o1–o8 for the line number. The operator name may only be 8 characters in length. The operator names are displayed when the display operator status command is executed.

4.2.4.3.7. Options Submenu Definitions

Annunciator

The annunciator command displays another submenu with the options PLAYBACK and RECORD. Upon selecting the PLAYBACK command the Linx prompts:

PLAY MESSAGE

<annunciator (1–8)>-

The operator may then enter an annunciator channel to playback. The annunciator plays and the operator may listen from the audio console. After recording or playing back an annunciator the operator is returned to the annunciator submenu.

Upon selecting the RECORD command the Linx prompts:

RECORD MESSAGE

<annunciator (1–8)>-

The operator may then enter an annunciator channel to record. The recording is done via the operator headset.

Chat

This command allows any operator to send a message to any other operator. A character string of up to 60 characters may be sent. Upon initiating this command the system prompts:

CHAT

<operator><text>-

Any operator (1–8) may be entered and the text string. Upon pressing <RETURN> the string is displayed on the top of the specified operator display (see below). The operator which sent the string is also displayed. If the operator has a name assigned to it then the name is displayed in place of the operator number. Messages from the system display "System" in place of the operator name.

Exit

The operator may log out of the system by entering this command. Upon entering this command any accessed line is released, the operator station is returned to the main menu, the screen is cleared and the sign-in prompt displayed.

Scan

This command automatically moves the operator from conference to conference. If a conference is empty it is skipped. Scanning continues until any key is pressed.

4.2.4.3.8. Purge Submenu Definitions

Call_counts

This command zeros the accumulated calls on each line.

Disconnects

This command purges the disconnects for a desired conference or all the disconnects on the system. The system prompts:

PURGE DISCONNECTS

<conf#/'A'11>-

The operator may then enter either a conference number to purge or an 'A' to purge all disconnects present on the system. Purging disconnects clears the name and telephone number and turns off the gain associated with the line being purged.

Minutes_per_conference

This command allows the operator to zero the conference minutes for a specific conference and set the start time for all lines in that conference to the present time. The system prompts:

PURGE MINUTES PER CONFERENCE

<conf#>-

The operator may then enter the conference number to purge.

Total_times

This command zeros all the accumulated line times for each line in the system.

4.2.4.3.9. Set Submenu Definitions

Nighttime

This command tells the system to ignore all incoming calls. Once the operator initiates the command the message "Nighttime Mode Set. Press any key to stop" appears on all operator screens. This message stays on each screen until a key is pressed from any operator station. After a key is pressed the Nighttime mode is disabled and all operators go back to the Main menu.

Scan

This command allows the operator its own independent scanning time for the conference scan feature. The system prompts:

SET SCAN TIME

<time(1–59)>-

4.2.4.3.10. Transfer Submenu Definitions

Conferees

This command allows the operator to transfer groups of conferees to different conferences. The system prompts:

TRANSFER CONFEREES TO

<conf#><line(s)>-

The operator may then enter a conference number and all the lines to be transferred to that conference.

Link_lines

This command allows the operator to transfer the link channels from conference to conference. The system prompts:

TRANSFER LINK LINES TO

<conf#/'R'emove><link line>-

The operator may enter a conference number or an 'R', along with a link line, to either transfer the link line to a conference or remove the link line from all conferences.

4.3 Annunciators

The DCB supports 8 annunciator channels and 8 messages. The messages are digitized, when recorded by an operator, and saved on the hard disk. Each of the 8 annunciator channels can play any of the 8 messages. Upon channels calling into the system an annunciator is played to them. This annunciator can be any of the 8 annunciator channels however the actual message is the one assigned via the administrator console. This configuration allows any message to be played to any annunciator.

4.4. CDRs

A feature is provided for storing/printing line information upon the disconnection of a line from the DCB. The CDR (Call Detail Record) for each line, CDRs are generated when lines disconnect from the bridge, is saved to disk. CDR's can be printed via the printer port on the back of the bridge (see system administrator printer options for details). CDR printing is not supported through operator terminals. The CDR format is as follows:

LINE# CONF# START END CONNECT NAME MODERATOR PHONE# CONF NAME

Line #—The line that disconnected.

Conf #—The conference from which the line disconnected.

Start Time—The time the line either called into the Linx or was dialed out by the operator.

End Time—The time the line disconnected from the Linx.

Connect Time—The amount of time (in minutes) the line was on the Linx.

Name—The name assigned to the line.

Moderator—If the line was a moderator this field contains a 'Y'. If the line wasn't a moderator this field contains an 'n'.

Phone #—The telephone number if the line was dialed out.

Conference Name—The name assigned to the conference.

4.5. Music

The DCB can supply music to any and all conferences simultaneously using a single music source. The INPUT and ENTER conferences are also supplied from the same music source. Inserting and removing music from a conference is done via the operator terminal. The insertion of music to the INPUT and ENTER conferences is done during system initialization and cannot be removed from these conferences.

4.6. Record/Playback

The DCB has the capability of recording from, or playing to, up to 3 conferences simultaneously. Each channel may be configured via the operator terminal for either recording a conference or playing to a conference. Record and playback cannot be done simultaneously on the same channel. There can be a maximum of 3 record/playback channels installed into DCB.

4.7. Configuration Menu

The DCB product allows the system administrator to configure system parameters pertaining to lines, conferences, operators, and the entire system.

4.8. Operator Printing

By connecting a serial printer to the back of an operator station ASCII terminal, operators can initiate the printing of dialing lists and polling results.

System administrators may redirect printer output from the operators to a printer connected to the back of an operator terminal, to the system printer, or to a file saved on the hard disk.

4.9. Administrator MMI

The Digital System 60 (DCB/60) Administrator Console allows conferencing operations supervisors to configure the DCB/60 to meet their conferencing needs. Channel, operator, and system parameters, may be configured through the administrator console. Backups of these configurations, the printing of system reports, setting system date and time, and password/sign-in management are also done through the administrator console. Upon starting the administrator process, the screen is cleared and the administrator main menu is displayed. The entire process is menu driven.

Pressing the 'ESC' key returns you to either the previous menu or to the Main Menu, depending on what command you are executing. If the terminal loses power or becomes disconnected from the system the administrator process aborts and the sign-in process is started. Upon reception of a shutdown command the administrator process is killed.

4.9.1. Main Menu

The Main Menu is displayed upon startup of the administrator process. It consists of the following items.

System Date/Time—Sets the system date and time.

System Configuration—System Configuration Menu.

Channel Configuration—Channel Configuration Menu.

Operator Configuration—Operator Configuration Menu.

Disk Utilities—Format and view removable media.

File Management—View, print, and export files.

Backup/Restore—Backup and restore directories.

Sign-In Management—Sign-In Management.

Operator Display—Allows the administrator start the operator console process.

Exit—Exits administrator screen.

4.9.2. System Date and Time

The system date and time are changed using this menu option. The administrator can move between the date and time fields on the screen using the arrow keys and input the proper values.

Only numeric characters are allowed to be entered into the fields. Pressing 'ESC' prompts with "Save Changes (Y/N)?". Entering an 'N' or 'ESC' does not change the date and time. Entering a 'Y' changes the date and time.

4.9.3. System Configuration

The system configuration menu gives the administrator the ability to name the system, set the number of simultaneous talkers, configure dialout supervision, set annunciator and dial delays, set wink, flash hook and guard times, and enable/disable DTMF acknowledge, Disconnect Mode, Help Mode, and 1 or 2 digit mode. The administrator can move between these fields by using the arrow keys.

Alphanumeric characters are allowed in the name field and numeric characters only are allowed in the Simultaneous Talkers, Annunciator Delay, Dial Delay, Wink Time, Flash Hook Time, and Guard Time fields. The remaining options may be changed by selecting the desired option, using the arrow keys, and pressing the space bar, which toggles through all available options for the specific field. Pressing 'ESC' prompts with "Save Changes (Y/N)?". Entering an 'N' or 'ESC' does not implement the changes. Entering a 'Y' changes the parameters in memory and on disk.

Dial Out Supervision Options—Delay or Wink Default—Delay

Description—After seizing out on a line either, 1> delay for the duration entered in Dial Delay or 2> execute a wink of the duration entered in Wink Time, before dialing digits.

Simultaneous Talkers Options—1–3 talkers Default—3

Description—Number of simultaneous talkers per conference.

Annunciator Delay Options—0–5 seconds Default—0

Description—Amount of delay before annunciator message is played after a call is answered.

Dial Delay Options—1–5 seconds Default—1

Description—Amount of delay before dialing digits. See Dial Out Supervision.

Wink Time Options—300–800 ms. Default—300

Description—Duration of wink signal. See Dial Out Supervision.

Flash Hook Time Options—300–800 ms. Default—300

Description—Duration of flash hook, used for call transfers.

Guard Time Options—300–800 ms. Default—300

Description—Duration of time from when a line disconnects in both directions until that line may be used again for either outgoing or incoming calls. Prevents glare condition which occurs when both ends seize the line simultaneously.

DTMF Acknowledge Options—Yes or No Default—No

Description—Send the caller 2 beeps informing them of the reception of a valid DTMF digit.

Disconnect Mode Options—Yes or No Default—No

Description—Upon a line disconnecting from the system either, 1> keep the line seized out and display 'DC' state on the operator screen or 2> disconnect the line immediately and clear line from the operator screen.

Conference Help Options—Yes or No Default—No

Description—Respond to help by either 1> conference, operator moves to conference requesting help or 2> individual, operator accesses caller that requested help.

Two Digit Mode Options—Yes or No Default—No

Description—Requires an '*' be pressed preceding any DTMF option. Callers must press '*', '0' for operator help.

4.9.4. Channel Configuration

The channel configuration menu gives the administrator the ability to assign a specific annunciator message to a channel, set the answer status of a channel, set the timeout time of a channel, or restore all channels to their defaults. The administrator selects a configuration option by using the arrow keys to move between menu items and pressing return. Selecting defaults prompts with an "ARE YOU SURE? (Y/N):" message and sets all channels to their default configurations if a 'Y' is entered. Selecting 'Main Menu' returns the administrator to the main menu. The channel configuration menu window is shown below.

The window relating to 1 of the 3 channel menu items (annunciator, answer, timeout) is displayed upon choosing an item. Each window displays 24 channels and the remaining channels can be viewed/modified by using the page-up/page-down keys.

The announcement message (1–7, message #8 is reserved for blast out dialing) can be entered via the keyboard and each channel has a default of message #1. Channels do not hear a message if a 0 is entered in the annunciator field. The answer configuration can be a 'Y'es or 'N'o and these are toggled by pressing the space bar. Answer defaults are 'Y' for all channels. Channel timeout can range from 0–60 minutes and these can be entered via the keyboard. Timeout defaults for all channels is 0 seconds, i.e. no timeout. Pressing 'ESC' prompts with "Save Changes (Y/N)?". Entering an 'N' or 'ESC' does not make the changes. Entering a 'Y' changes the parameters in memory and on disk.

4.9.5. Operator Configuration

The operator configuration menu gives the administrator the ability to independently configure each of the 8 operator stations and the administrator station. Terminal bit rate, printer options, terminal beeps, operator talk character, and local/remote operator setups for each operator can be configured from this menu. The administrator terminal can only be configured for baud rate, printer options, and terminal beeps. The operator configuration menu lists all 8 operator stations plus the administrator station.

Upon selecting an operator station to configure, the operator configuration window for the operator selected is displayed.

The Baud Rate selections include 9600 and 19200, selectable by pressing the spacebar. The default baud rate is 19200.

The Printing selections include local, system, file, none or any combination of local/system/file. The print options are selectable by pressing the spacebar and the default for each operator is local.

The Beep Mode selections include single beep, continuous beep or no beep. The beep time option is the interval between beeps, 1–5 seconds, when the continuous beep option has been selected. The Beep Mode options are selectable by pressing the spacebar. The default for Beep Mode is single beep and the default Beep Time is 1 second.

The Talk Key selections include the spacebar and the dash key, selectable by pressing the spacebar. The default is 'spacebar' controls operator talk.

The Remote selections include 'Y'es or 'N'o, selectable by pressing the spacebar. The default is No, i.e. local operator.

The Channel selection gives the administrator the ability to assign a remote operator a channel number. These channel numbers can be any of the user channels currently in service on the system however the channel must be inactive to be assigned remote operator capabilities. Only remote operators can be assigned channel numbers, local operators use the channel assignments given by the system and these cannot be modified.

Pressing 'ESC' prompts with "Save Changes (Y/N)?". Entering an 'N' or 'ESC' does not make the changes. Entering a 'Y' changes the parameters in memory and on disk.

4.9.6 Disk Utilities

The Disk Utilities menu allows the administrator to format or list the files on a floppy disk.

Selecting Format or Directory Listing prompts with the drive select menu, shown below. The administrator must select the disk drive to use and press return, or press 'ESC' to exit.

After selecting a drive the screen is cleared and the following messages are displayed.

"Format of A:" or "Directory Listing of A:"

"Please insert disk into drive A:"

"Press 'ESC' to abort, any other key to continue."

Pressing 'ESC' aborts the procedure, otherwise the command is executed, and when finished, a "Press any key" message is displayed on the screen. If either of these commands are executed without a floppy disk inserted into the appropriate drive the screen hangs until a disk is inserted. Disks are formatted with the DOS format command.

4.9.7. File Management

The file management menu gives the administrator the ability to delete, export, print, and view files on the system which include Alarm Statistics, CDRs, dialing lists, logs, network statistics, and operator printouts. Alarm statistics are written to a file and displayed when this item is selected. CDR, and Log, files are assigned names corresponding to the date they were created (i.e. Sep06) and the system maintains a maximum of a months worth of each type of file and deletes the oldest file as necessary. Network Statistics files are assigned names corresponding to the date created and T1 trunk (i.e. Sep06.0 for trunk 1) and are updated every 15 minutes. The system maintains network statistics files using the same method for maintaining CDR and Log files. Dialing list files are named by their creator and the number of these files is limited only by disk space. Operator printouts are named by the system as oper1.prn, oper2.prn, etc.

Alarm Report file contains a snapshot of the alarms currently active on the system.

CDR files contain Call Detail Records for each line that entered the system.

Dialing List files contain system dialing lists created by operators for use in blastup and fastdial.

Log files contain messages from all software processes used by the DCB/60. These include information messages, software errors, T1 alarms, etc. for use in system maintenance and performance evaluation.

Network Statistics files contain counts of Various T1 events (i.e. alarms, T1 errors, etc.) If this file contains all zero's no T1 problems have occurred.

Operator Printout files contain all operator printouts that have been redirected to a file.

4.9.8. Backup/Restore

The Backup/ReStore menu gives the administrator the ability to backup and restore system configurations, CDRs, Dial Lists, Logs, and Sign-Ins. The administrator selects an option by using the arrow keys to move between menu items and pressing return.

4.9.9. Sign-In Management

The Sign-In Management menu gives the administrator the ability to create and delete operator, administrator, and maintenance sign-ins. Maintenance sign-ins can only be created/deleted if the administrator process was started via the maintenance process. The administrator selects an option by using the arrow keys to move between menu items and pressing return.

4.9.10. Operator Display Monitor

This menu item clears the screen and starts the operator console process. If the operator console was started from the administrator process then, upon exiting the operator console the administrator process is started.

4.9.11. Exit

This menu item exits the administrator process and starts either the sign-in or maintenance depending upon which process started the administrator.

4.10. Maintenance MMI

The Digital System 60 (DCB/60) Maintenance Console allows maintenance personnel to configure and maintain T1 links, perform a system shutdown or re-initialization, access the administrator or operator console processes, and clear network statistics. Upon starting the maintenance process, the screen is cleared and the maintenance main menu is displayed. The entire process is menu driven. The copyright window (shown below) is displayed for each menu selected.

Pressing the 'ESC' key returns you to either the previous menu or to the Main Menu, depending on what command you are executing. If the terminal loses power or becomes disconnected from the system the maintenance process aborts and the sign-in process is started. Upon reception or issuance of a shutdown command the maintenance process is killed.

4.10.1. Main Menu

The Main Menu is displayed upon startup of the maintenance process. It consists of the following items.

T1 Configuration—Configure the T1 trunks.

T1 Status—Display T1 status for all trunks.

T1 Enable/Disable—Enable/Disable T1 trunks.

Clear Network Statistics—Clear the days Network Statistics file.

Administrator Menu—Start the administrator process.

Operator Display—Start an operator console process.

Re-Initialization—Re-boot the system while retaining current conferences.

System Shutdown—Shutdown the system.

Exit—Exits administrator screen.

T1 terminology used in this section is defined as follows.

B8ZS (Binary 8-Zero Suppression)—Ensures a minimum 1 in 8, ones density by replacing any group of 8 consecutive zeros with a known bipolar violation sequence.

Blue Alarm—All 1's intentionally sent if normal data is unavailable.

CRC—Cyclic Redundancy Check—Determines how many frames have errors.

D3/D4—12 bit T1 framing format.

Err.Secs.—Number of seconds that have at least 1 CRC error.

ESF—Extended Super Frame—24 bit T1 framing format which contains CRC and Err.Secs.

Jammed Bit—The system changes bit 7 to a '1' if 8 bits of a word are zero.

OOF—Out of frame, i.e. no recognizable received signal, red alarm.

RED Alarm—Occurs when the near end of a T1 line detects loss of frame. A Yellow alarm is sent to the far end of the T1 line upon detection of a Red alarm.

Slip—An unequal number of frames received from 2 T1 lines.

Sync Source—The source of clock which synchronizes the T1 links.

Yellow Alarm—Occurs when the far end of a T1 line detects a loss of frame.

Zero Code Suppression—Ensures the data output stream never has more than 15 consecutive zeros. This is a T1 line clock recovery requirement. Either B8ZS or Jammed Bit.

4.10.2. T1 Configuration

The T1 configuration is set/modified through this menu item. Moving through the configuration fields is done using the arrow keys.

The spacebar is used to toggle between options in the Sync. Source, Primary, Secondary, Framing, and Zero Code Suppression fields. The remaining fields, Error Thresholds, Slip, BPV, CRC, Err. Secs., and Detect and Clear timers are modified by entering the appropriate value.

The T1 Synchronization source can be internal or external and the primary and secondary source can be configured to any of the installed trunks. A public telephone network is the preferred source.

Minor alarms are generated when Out of Frames, Slips, Bpv, CRC, and Err. Secs reach their specified limits. The default limits are 0 which indicates the alarm is never generated. If a minor alarm is generated by one of these conditions it is cleared after a 15 minute interval passes without reaching the specified alarm limit.

Major alarms occur upon indication of a Red or Yellow alarm condition. The Red or yellow alarm condition must occur for a minimum of "Detect" seconds. Detect and clear are entered in tenths of seconds. The alarm is cleared if there is no occurrence for a duration of "Clear" Seconds.

Framing can be set individually on each trunk as can zero code suppression. Setting framing to 'None' disables the T1 trunk.

Pressing 'ESC' prompts with "Save Changes (Y/N)?". Entering an 'N' or 'ESC' does not make the changes. Entering a 'Y' makes the changes active and saves the T1 configurations to disk.

4.10.3. T1 Status

T1 status is displayed by selecting this menu item. The T1 status screen, shown below, is updated every 2 seconds and is exited by pressing 'ESC'. The status screen size varies depending on the number of T1 trunks installed.

Alarm status displays any pending alarm either Red, Yellow, Blue, or None.

Framing, Zero Code, and Sync display the current T1 configuration.

The ABIn and ABOut displays which of the 24 channels are seized in and/or seized out.

Alarm counts displays the total number of Red, Yellow, and Blue alarms.

The remaining fields display the number of Out of Frames, Slips, BPVs, CRCs, and Err Secs.

4.10.4. T1 Enable/Disable

The T1 Enable/Disable option allows for the disabling or enabling of all installed T1 trunks. The T1 Enable/Disable menu, shown below, displays the current trunk status. The options are configured by using the arrow keys to move between menu items and pressing the spacebar. Pressing 'ESC' prompts with an "ARE YOU SURE? (Y/N):" message and enable or disables T1 trunks as defined if a 'Y' is entered. Entering an 'N' or 'ESC' aborts all changes.

4.10.5. Clear Network Statistics

The Clear Network Statistics option allows maintenance personnel to clear the days Network Statistics file. The Network statistics file is available for exporting, printing, and viewing through the administrator file management menu.

4.10.6. Administrator Menu

This menu item clears the screen and starts the administrator process. Upon exiting the administrator console the maintenance process is started.

4.10.7. Operator Display Monitor

This menu item clears the screen and starts the operator console process. Upon exiting the operator console the maintenance process is started.

4.10.8. Re-Initialization

This option allows the system to be rebooted while maintaining conferencing. The reboot of the system brings down all software processes and finally shuts Unix down. Conferencing is still active as all DSP cards continue to run. Unix is then rebooted which starts up all DCB/60 processes and the conferencing information is uploaded from the DSP Dual Port Ram to the system for initialization purposes.

Upon selecting this item an "ARE YOU SURE? (Y/N):" message is displayed. Entering 'Y' reinitializes the system. Entering a 'N' or 'ESC' aborts the re-initialization.

4.10.9. System Shutdown

Upon selecting this item an "ARE YOU SURE? (Y/N):" message is displayed. If conferences are active on the system this information is also displayed. Entering 'Y' executes a system shutdown. Entering a 'N' or 'ESC' aborts the shutdown.

4.10.10. Exit

This menu item exits the administrator process and starts either the sign-in or maintenance depending upon which process started the administrator.

4.11. User Program Interfaces

There is no user programming on the system.

5. Service and Maintainability Specifications

5.1 MTBF 20,000 to 50,000 hours for 96 to 24 port system.

5.2 MTTR 15 minutes

5.3 Diagnostics

A full suite of power-up, off-line and on-line diagnostics are provided for the use of customers and customer service.

5.3.1 Power-up diagnostics

Power-up test and diagnostics include:

Full memory tests of DSP cards including dual port, quad port, and static RAM.

DSP Load Code

DSP interrupt

DSP semaphore

DSP card connectivity

Reference memory

Analog card xmit & rcv.

MVIP interface

5.3.2 Off-line diagnostics

Off-Line system testing includes:

CPU

Interrupt Controller

DMA Controller

Interval Timer

CMOS Clock

System memory including base, extended and expanded RAM.

Floppy Drive

Serial Port

Parallel Port

Printer

Speaker

5.3.3 On-line diagnostics

The system continually checks all software processes to ensure their sanity. If an error is detected a message is logged and an alarm is initiated.

5.4 Remote Access

A built-in modem allows remote dial-in at speeds up to 9600 bps. The maintenance features available remotely include:

Remote operator

Remote administrator

Remote maintenance:

Remote reboot

File transfer and software update

Remote dump analysis

Viewing of network management statistics and logs

5.5 Software maintenance

Customer service software maintenance tools which may be run locally or remotely include:

Dump analysis

Network management—T1 network interface monitoring

Resources monitoring—E.G.: memory, buffers; disk, processes, etc.

Program Debug and memory inspect and change

File transfer and software update

5.6 Field Replaceable Units

The field replaceable units include each circuit board and the power supply as well as each external assembly.

Power supply

Backplane

CPU board

System enclosure

T1 Interface PCB

DSP PCB

Diskette drive

Hard disk drive

Analog board

Serial port board

Terminals

Internal modem board

Note that the DCB is intended to be small and easily maintained by technicians familiar with PCs. It is easy to replace a board by opening the case or an entire box. No boards may be replaced with the power on.

6. Performance Specifications

Speed of Blast Up, 96 channels, less than 30 seconds.

DTMF Digit processing—96 simultaneous DTMF inputs, no missed digits.

Ring Detection—Detect Ringing and answer line within the first 2 rings.

7. Compatibility Specifications

7.1 Existing MultiLink Products

The DCB is compatible in function, user operation and operator operation with the System 60. The Conferee and Moderator touch-tone controls and audible responses are identical with the System 60. The Operator displays, while necessarily different to address the additional capacity of the DCB are functionally very similar. Only the "Config" menus of the System 60 are appreciably different. An operator trained on the System 60 should be able to use the DCB to run conferences with a minimum of training time.

The DCB may be linked to existing MultiLink bridges with 4 wire Link Lines or through the direct T1 connection to the DCB.

7.2 Customer Equipment

The customer may use any IBM compatible PC with a modem and off-the-shelf or MultiLink supplied terminal emulation software to access the DCB.

The DCB may be connected behind the customer's switch or PBX using T1 or 4 wire connections as long as this equipment provides the proper wink disconnect signaling.

7.3 Standard Equipment

The DCB conforms to a variety of standards for Telecomm, Datacomm and PC/AT.

Telecomm-T1
  DSX-1 interface to local equipment or internal CSU
  Accunet T1.5 compatible (TR62411) with ESF (TR54016) support
Datacomm-Modem V.32?
PC/AT-IEEE 896

8 Agency Approvals

Safety-UL/CSA approvals are provided for rack mountable units. Designed to meet TUV/VDE. EMI—FCC Part 15 class A for rack mountable units.

Telecomm-
  T1 connection—(AT&T?), DOC?, JATE?
  FCC part 68—(only for analog voice connections. Excludes 4 wire E&M as these are all local to customer and MultiLink equipment.)
  Canadian DOC—(only for analog voice connections. Excludes 4 wire E&M as these are all local to customer and MultiLink equipment.)
  JATE—(only for analog voice connections. Excludes 4 wire E&M as these are all local to customer and MultiLink equipment.)

9 Deliverable Configurations

10 Customer Documentation 10.1 Site Prep Guide 10.2 Installation Manual 1.0.3 Operation/Maintenance Manual

11 Future Product Migration Specifications 11.1. Networked Operator Attended Conferencing System The LAN/operator attended software option allows:

Operator terminals can be PCs on a LAN with terminal emulation software.

Up to 5(?) simultaneous remote operators can have sessions to the bridge in addition to the local operator.

The local operator station can access as many as 8(?) remote bridges at one time High resolution displays with X Windows or Windows 3.0 allow multiple operator screens to be displayed simultaneously.

In the future the customer may access the bridge with his own workstation using MultiLink supplied software.

11.2. Reservation and Database System

A relational database can be added to support the advanced reservation of bridge resources for conferences. Conference, user, client and billing databases can be provided. The reservation system can support attended operator usage and later unattended client reservations and inquiries. The client may make a reservation using his DTMF handset and the InteraCtive Voice Response (IVR) capability of the DCB or by dialing in with an ASCII terminal.

11.3.3 Personal Teleconferencing

The Digital Conferencing Bridge can be enhanced to incorporate the functions of a data bridge. The data bridge functionality allows personal computers at multiple conferee's desks to be bridged into a combined voice/data conference. This functionality requires the bridge to support a large number of data connections. The data connections may be from users modems that enter the bridge as analog or T1 connections or from data networks such as LANs or X.25.

11.4. Additional Future Product Extensions

The DCB is designed with an integrated digital voice and processor architecture that allows a wide variety of future products and options to be added to the base product. The following are additional capabilities that might be needed:

Fax—Notification of a conference via automatic sending of fax. Storage of fax to be used in personal teleconferences. Faxmail.

Email/media mail—storage of Email(including files, images and faxes) on the bridge. Email X.400 gateway to corporate or public Email systems.

Voice mail—to support the conferencing

ISDN

CEPT (2 mbps, 30 channel) capability

APPENDIX B

1.0 Introduction

Digital signal processing involves the conversion of signals to sequences of numbers and the subsequent processing of these sequences. The principle governing conversion of continuous-time signals to discrete-time signals is expressed in the Sampling Theorem.

Sampling Theorem: A continuous-time signal can be completely recovered from its samples if, and only if, the sampling rate is greater than twice the signal bandwidth.

For telephone voice data this rate is 8000 samples/sec. The discrete-time signal can be operated upon by a software process, which is faithful to the invertibility, causality, stability, time invariance and linearity properties of the corresponding continuous-time system. Digital signal processing specific microprocessor architectures and instruction sets have made real-time execution of software algorithms possible. Now processing, which was previously accomplished in hardware, can be done in software. The Digital Conferencing Bridge will be realized using digital signal processing hardware and algorithms.

2.0 DSP Hardware Overview

The Digital Conferencing Bridge will consist of up to four DSP boards, connected by an MVIP bus. Each DSP board contains four Texas Instruments TMS320C31 digital signal processors. The TMS320C31 is a high performance CMOS 32-bit floating-point device. The processors are employed in the Microcomputer/Boot Loader Mode. In this mode a bootloader is mapped into locations 0000h through 0FFFh. Each processor communicates with the PC Host via a 4 k×16 dual port ram, featuring arbitration control, 8 semaphore registers and interrupt generating mail-box registers. At the MVIP interface two DSP processors each share 2 k×8 quad port rams. Passage of data between the quad port rams and the MVI.P bus is facilitated by serial to parallel and parallel to serial conversion PLDs. The output serial line destination of quad port ram buffered data is controlled by time slot specific bytes, written by the host to the 1 k×8 dual port control ram.

3.0 TMS320C31 Memory Map

Note: This memory map must also be incorporated into the linker command file. The Linker defines module addresses using the memory map as a reference.

| | |
|---|---|
| 0000000H - 0000FFFH | reserved for Boot Loader (see TMS320C3X User's Guide section 3.4) |
| 0808000H - 08097FFH | Peripheral Bus Memory-Mapped Registers (6K internal) |
| 0809800H - 0809BFFH | Ram Block 0 (1K internal) |
| 0809C00H - 0809FC0H | Ram Block 1 (1K internal) |
| 0809FC1H - 0809FFFH | Interrupt and Trap Branches (64 internal) |
| 0A00000H - 0A007FFH | Quad Port Ram (2k×8) external MVIP input and output Buffers |
| 0B00000H - 0BFFFFFH | Semaphore Registers |
| 0EC0000H - 0ECFFFFH | Code Ram (SIMM, 64k×32) |
| 0FC0000H - 0FC0FFFH | Dual Port Ram (4k×16 external) Host-Dsp Communication Interrupt Generating Mail Boxes Boot 3 - Loader Input File Area MVIP Bus Reference Memory Window |

4.0 Dual Port Memory Data Structures

The TMS320C31 Processors communicate with the host via data structures defined within the dual port memory. The intent is to define structures which enable the logical association of an MVIP time slot with an information port managed primarily by the Host. The association of a time slot and a port defines a channel. Secondly, lists and queues are maintained as means of communicating global information.

4.1 Data Transfer Buffers

Two buffers are provided for record and playback of voice data. The buffers are each 2 Kbytes and are located at DPM addresses Seg.:0 and Seg.:800. A semaphore is allocated to each of the buffers for access control.

4.2 Channel Data Structure Array

An array of eight Channel Data Structures is located at DPM address Seg.:0×1000. The structure is composed of the following items.

| | |
|---|---|
| Dual Port Memory Port (0–191) (node<<3+sequence number) (initialized to assigned port) | |
| Command | (initialized to 0) |
| Error | (initialized to 0) |
| Conference | (initialized to 0) |
| Mute (0–1) | (initialized to 0) |
| AGC (0–1) | (initialized to 0) |
| Music (0–1) | (initialized to 0) |
| Talk (0–1) | (initialized to 0) |
| Time Slot Type | (initialized to 0) |
| Event Queue Head Pointer | (initialized to 0) |
| Event Queue Tail Pointer | (initialized to 0) |
| Event Queue, 10 words | (initialized to 0) |
| Digits-Out, ascii string 50 bytes maximum | (initialized to null string) |

4.3 Channel MVIP Time Slot List

The Channel Time Slot List contains one word entries, indicating the time slot numbers of channels. The list consists of 192 entries sorted by port number ((6 boards)×(8 channels/node)×(4 nodes/board)). Each entry consists of two parts; byte 0=location within serial receive line, byte 1=serial line. The list immediately follows the Channel Data Structures. During initialization the entire list is converted to quad port ram buffer indices and stored with other tables in the external coderam. The transmit buffer indices are equal to byte 0 of the dual port memory time slot entries.

4.4 Conference Number of Talkers List 91 (48 user+8 operator+8 annunciator+1 enter+1 input conferences) one word entries sorted by conference numbers. Each entry indicates the maximum number of simultaneous talkers allowed for each conference. Located immediately following the Channel MVIP Time Slot List.

4.5 System Parameters

The 50 word System Parameters List is preceded by an unoccupied memory location which immediately follows the Conference Number of Talkers List. System parameters are constants which control certain aspects of the digital conferencing bridge, but which may be modified during execution. During initialization the parameters are read into the internal memory of each TMS320C31. Necessary conversions are done at that time. An item can be changed following system initialization. Entry 0 is a pointer to an item in the list which has been changed. Entry 0 is checked once every sample period. A value of zero implies no change to the list.

| | |
|---|---|
| Item Pointer | pointer to changed item |
| Node Number | node number |
| Active Node Mask [part 0] | one bit per node (1=active, 0=inactive) |
| Active Node Mask [part 1] | one bit per node (1=active, 0=inactive) The mask determines nodal participation |
| DTMF On Time | 100 ms |
| DTMF Off-Time | 50 ms |
| DIAL Tone-Wait | 5 sec     unused |
| DTMF Level | −7 dBm |
| Forward Twist (receive) | 8 dB      unused |
| Reverse Twist (receive) | 8 dB      unused |
| Talk Detect Level | −35 dBm |
| Maximum Talkers per Conference | 8         unused |
| Gain (pointer to multiplier in table) | 00001000 |
| Speech Level Out | −16 dBm   unused |
| Channels per DSP Node | 6 channels/node |

4.6 Channel Conference Queue and Pointers

Two pointers and a Channel Conference Queue immediately follow the system parameters. Muting and Movement of channels between conferences are controlled via this structure. An entry consists of the port number concatenated with the new conference number; byte 0=conference, byte 1=port number. The host increments the head pointer when adding an item to the queue. The DSP increments the tail pointer when removing an item from the queue. The queue is empty when the pointers are equal. As items are removed from the queue, a table of conference numbers sorted in port number order is built internally. The table consists of 192 entries ((6 boards)×(8 channels/node)×(4 nodes/board)). Placing an item in this queue automatically causes the port number to be purged from the current conference talk list. This is why the queue also plays a role in the muting of channels. If a channel is muted it must be removed from the talk list. Prior to changing a channel's conference number the host should mute the channel, preventing transmission of a talk bit. The Channel Conference Queue of the node on which the channel resides should be the last updated with the new conference number.

5.0 Internal Data Structures

5.1 Port Information Data Record

An information data record is maintained internally for each of the ports a node is responsible for. The data and history relevant to the port is maintained here and varies by sample period.

| position | name | type | description |
|---|---|---|---|
| 0 | INFO_x | float | x[n]; current input sample |
| 1 | INFO_avm | float | average magnitude of observed voice samples |
| 2 | INFO_confavm | float | average magnitude of conference voice samples |
| 3 | INFO_confid | integer | conference number channel is assigned to |
| 4 | INFO_queue | integer | address of talk list corresponding to conference |
| 5 | INFO_type | integer | channel type; conferee, operator, annunciator,...etc |
| 6 | INFO_rcv | integer | input quad port ram buffer index (timeslot) |
| 7 | INFO_xmt | integer | output quad port ram buffer index |
| 8 | INFO_talker | integer | talklist resident indicator |
| 9 | INFO_mode | integer | tone or silence indication |
| 10 | INFO_time | integer | tone or silent period duration |
| 11 | INFO_switch | integer | tone initialization indicator |
| 12 | INFO_count | integer | digit buffer index |
| 13 | INFO_xtd1 | float | double tone state variable; x[n-1] |
| 14 | INFO_xtd2 | float | double tone state variable; x[n-2] |
| 15 | INFO_ytd1 | float | double tone state variable; y[n-1] |
| 16 | INFO_ytd2 | float | double tone state variable; y[n-2] |
| 17 | INFO_clo | float | coefficient of low member of tone pair |
| 18 | INFO_chi | float | coefficient of high member of tone pair |
| 19 | INFO_y1d1 | float | dtmf filter #1 state variable; y[n-1] |
| 20 | INFO_y1d2 | float | dtmf filter #1 state variable; y[n-2] |
| 21 | INFO_avmy1 | float | dtmf filter #1 - output average magnitude |
| 22 | INFO_y2d1 | float | dtmf filter #2 state variable; y[n-1] |
| 23 | INFO_y2d2 | float | dtmf filter #2 state variable; y[n-2] |
| 24 | INFO_avmy2 | float | dtmf filter #2 - output average magnitude |
| 25 | INFO_y3d1 | float | dtmf filter #3 state variable; y[n-1] |
| 26 | INFO_y3d2 | float | dtmf filter #3 state variable; y[n-2] |
| 27 | INFO_avmy3 | float | dtmf filter #3 - output average magnitude |
| 28 | INFO_y4d1 | float | dtmf filter #4 state variable; y[n-1] |
| 29 | INFO_y4d2 | float | dtmf filter #4 state variable; y[n-21 |
| 30 | INFO_avmy4 | float | dtmf filter #4 - output average magnitude |
| 31 | INFO_y5d1 | float | dtmf filter #5 state variable; y[n-1] |
| 32 | INFO_y5d2 | float | dtmf filter #5 state variable; y[n-2] |
| 33 | INFO_avmy5 | float | dtmf filter #5 - output average magnitude |
| 34 | INFO_y6d1 | float | dtmf filter #6 state variable; y[n-1] |
| 35 | INFO_y6d2 | float | dtmf filter #6 state variable; y[n-2] |
| 36 | INFO_avmy6 | float | dtmf filter #6 - output average magnitude |
| 37 | INFO_y7d1 | float | dtmf filter #7 state variable; y[n-1] |
| 38 | INFO_y7d2 | float | dtmf filter #7 state variable; y[n-2] |
| 39 | INFO_avmy7 | float | dtmf filter #7 - output average magnitude |
| 40 | INFO_avmyt | float | 0.5*(avmylo+avmyhi) |
| 41 | INFO_peak | float | greatest magnitude of 256 samples |
| 42 | INFO_sum | float | sum of 256 sample magnitudes |
| 43 | INFO_intcnf | integer | inter digit count |
| 44 | INFO_pfcnt | integer | sample count; 0-256 |
| 45 | INFO_rowcol | integer | dtmf digit row and column |
| 46 | INFO_talkdet | integer | talk detect indication |

5.2 Channel Conference List

As entries are removed from the channel conference queue a list is maintained internally. The list is in port number order and contains the conference number a port is assigned to.

5.3 Talk Lists

Each conference has a Talk List assigned to it. The Talk List is a three member FIFO queue. As participants satisfy the talk list criteria they move onto the talklist until pushed off by future conference activity. If a port is moved to a new conference or muted, it is purged from the current talk list.

5.4 Talk Bit Translation Table

During each sample period a DSP node can transmit one byte to communicate new talk list candidates. The bit positions correspond to the sequential order of the ports serviced by the node. A non-zero bit indicates that the corresponding port is a candidate. The translation table members are 32 bit words. The table members are accessed using the talk bits as an index. A string of four bit numbers is recorded within each translation word to denote the specific bits set in the index. Each number equals bit position plus one. The four bit numbers within the translation word are processed right to left. As numbers are processed the 8 nibble string is shifted right 4 bits to place the next nibble at the extreme right. A zero value in this location indicates end of string. The port numbers written to the talk lists are formed from these numbers; Port Number=(Node<<3)+(N-1).

| Talkbits (byte) | | Translation (word) |
|---|---|---|
| 00000000 | => | \|0\|0\|0\|0\|0\|0\|0\|0\| |
| 00000001 | => | \|0\|0\|0\|0\|0\|0\|0\|1\| |
| 00000010 | => | \|0\|0\|0\|0\|0\|0\|0\|2\| |
| 00000011 | => | \|0\|0\|0\|0\|0\|0\|2\|1\| |
| 00000100 | => | \|0\|0\|0\|0\|0\|0\|0\|3\| |
| 00000101 | => | \|0\|0\|0\|0\|0\|0\|3\|1\| |
| 00000110 | => | \|0\|0\|0\|0\|0\|0\|3\|2\| |

-continued

| Talkbits (byte) |    | Translation (word) |
|---|---|---|
| 00000111 | => | \|0\|0\|0\|0\|0\|3\|2\|1\| |
| 00001000 | => | \|0\|0\|0\|0\|0\|0\|0\|4\| |
| """"""" | => | """"""""""""""""" |
| """"""" | => | """"""""""""""""" |
| """"""" | => | """"""""""""""""" |
| 11111100 | => | \|0\|0\|8\|7\|6\|5\|4\|3\| |
| 11111101 | => | \|0\|8\|7\|6\|5\|4\|3\|1\| |
| 11111110 | => | \|0\|8\|7\|6\|5\|4\|3\|2\| |
| 11111111 | => | \|8\|7\|6\|5\|4\|3\|2\|1\| |

6.0 Data and Interrupts
6.1 Data Input

Input data is transmitted from the T1 interface via the input MVIP bus at 64 Kbits (8000 samples/sec). The serial to parallel converter deposits the input samples in the quad port ram. Prior initialization (by the host) of the Receive Control Register (value=01H) positions four 256 byte buffers at address 0000H. One quad port ram contains buffers for nodes A and B, while the other contains buffers for nodes C and D. The buffer pairs alternate within a quad port ram. The buffers automatically switch as interrupts occur. The external pin XF1 has been configured to indicate the buffer being filled. As XF1 toggles its current state is mirrored by bit #7 of the IOF Register. The IOF register is queried following the MVIP interrupt; TSTB 128,IOF. The result of this test causes the correct address to be loaded into the buffer pointer.

6.2 Data Output

Prior initialization (by the host) of the Transmit Control Register (value=85H) positions four 32 dbyte buffers at address 0400H in the quad port ram. One quad port ram contains buffers for nodes A and B, while the other contains buffers for nodes C and D. The buffer pairs alternate within a quad port ram. The parallel to serial converter transfers the data from these buffers to the output MVIP bus at 64 Kbits (8000 samples/sec). The buffers automatically switch as interrupts occur. The external pin XF0 has been configured to indicate the buffer being transferred. As XF0 toggles its current state is mirrored by bit #3 of the IOF Register. The IOF register is queried following the MVIP interrupt; TSTB ,8,IOF. The result of this test causes the correct address to be loaded into the buffer pointer.

6.3 Mulaw to Linear Conversion

The data entering the conference system is in eight bit u255 format (mulaw—psssqqqq). The polarity bit (p) determines the sign of the number. sss is the segment number of the piece-wise linear logarithmic approximation curve. qqqq represents the quantization number within a segment. Conversion of mulaw data (psssqqqq) to floating-point linear is accomplished by table look up. The mulaw codeword is used as the table index.

6.4 Linear to Mulaw Conversion

The conversion has been implemented by indexing into an 8K table, based upon the following sequence of steps. The number is converted to an integer. The mulaw polarity bit (p) is set to 0 or 1, indicative of either a positive or negative number. The number is replaced by its absolute value. The bias factor 33 is added to the absolute value. If the value is greater than or equal to 8192, sss=7 and qqqq=F. Otherwise the bit position of the highest non-zero bit is determined. The segment number (sss) equals the bit position minus 5. The quantization bin number (qqqq) is equal to the four bits immediately following the high non-zero bit. Form the mulaw code word psssqqqq from the individual parts. Complement the code word prior to transmission.

6.5 Interrupt Service Vectors

Unlike the microprocessor mode, the microcomputer/boot loader mode uses a dual-vectoring scheme to service interrupt and trap requests. In a dual-vectoring scheme, branch instructions to an address, rather than direct interrupt vectoring are used. The TMS320C31's last 63 locations of RAM Block 1 (address 00809FC1H) are assumed to contain interrupt and trap branch instructions. The following code segment is written to that location prior to bootloader operations.

| | | |
|---|---|---|
| _INT0 BR | mvip | ;MVIP data ready in quad port ram |
| _INT1 BR | mailbox | ;Host/Dsp mailbox |
| _INT2 BR | 0000H | ;Boot Loader |
| _INT3 BR | errant | ;inactive interrupt |
| _XINT0 BR | errant | ;inactive interrupt |
| _RINT0 BR | errant | ;inactive interrupt |
| | .space 2 | |
| _TINT0 BR | errant | ;inactive interrupt |
| _TINT1 BR | errant | ;inactive interrupt |
| _DINT0 BR | errant | ;inactive interrupt |
| | .space 20 | |
| _TRAP0 BR | errant | ;inactive interrupt |
| " " | " " | " " " " " " |
| " " | " . " | " " " " " " |
| _TRAP27 BR | errant | ;inactive interrupt |

6.6 MVIP Data Ready Interrupt Service Routine

"mvip" is the MVIP frame interrupt service routine. In order to avoid context save, no work is actually done in the interrupt service routine. At the beginning of the processing loop, the program waits as long as register BK=0. The interrupt service routine sets register BK to 1 as a signal for program continuation. At program continuation BK is set to 0. The mulaw data is processed directly from the input buffer.

6.7 Node Mailbox Interrupt Service Routine

"mailbox" is the Node Command Processing interrupt service routine. The interrupt service routine reads the Host/DSP mailbox at dual port memory location FCOFFFH. The word in the mailbox indicates the action to be taken.

7.0 Node Command Processing

Some command processing is necessary at the Node level. At present I see this being used primarily to allow orderly progress through the initialization phase. During system initialization a Node waits in a loop for mailbox commands from the Host. The commands are input via the Host/Dsp mailbox in the dual port memory at location FFE (1FFC in byte offset from the PC side). When the host writes a command to the mailbox, the DSP is interrupted. The DSP clears the interrupt by reading the mailbox and branches to the procedure which handles the command.

| Commands | Actions |
|---|---|
| 0000H | No command |
| 0001H | Enter Node Command Mode (future use) |
| 0002H | Invoke Boot Loader |
| 0003H | Synchronize with other processors and enter Channel |
| Command Mode | |

7.1 Invoke Boot Loader

The Host initially invokes the Boot Loader by resetting the processor. In this implementation the input file is expected to be input via the dual port memory. The dual port memory is of limited size (4 k×16). The Boot Loader will have to be re-entered as many times as required to transfer the entire input file. The first section of code to be loaded will consist of the command interpreter for Node Level Command processing, the interrupt service branches and a waiting loop. The Boot Loader entry point is read from address 0000H and written to the INT3 interrupt branch field at location 0809FC3H. Interrupts INT2 and INT3 are enabled. If the next command is Invoke Boot Loader (0002H), the DSP sets bit #3 in the CPU Interrupt Flag Register. This generates an interrupt, which causes a branch to the entry point at which the Boot Loader normally polls the IF. Subsequently, a branch is made to the Boot Loader section responsible for transfers from the dual port memory. Upon completion of each block transfer, control again returns to the waiting loop.

7.2 TMS320C31 Processor Synchronization

Each processor branches to a waiting loop following boot loader operations on its node. The Host issues the command Synchronize (0002H) by writing to the mailboxes. Each DSP branches to the mailbox interrupt service routine and retrieves the command. In response The DSPs branch to a synchronize procedure and enable interrupts. Each processor sets and transmits bit #0 in its Talk Bits Byte. Following the next interrupt, each processor retrieves all the transmitted bits and arranges them in register bit positions corresponding to the sender's node number. The goal is to form a pattern, which mirrors the active node mask. All processors will repeat the process until the goal can be attained globally.

8.0 Channel Command Processing

The host communicates a command to a channel by writing a non-zero value to the Channel Command field. The DSP decodes the command, executes a specific software routine and sets the channel command field to 0000H indicating completion. The host writes a command to a channel only when the Channel Command field equals 0000H. If a command processing error occurs, the DSP writes FFFFH to the Channel Command field and a numerical value to the Channel Error field. In this case the Host must take some corrective action.

8.1 Record Voice Data

Record allows an annunciator channel to transfer mulaw data, entering via the quad port ram, to a disk file. The processor receives the command Start Record (0003H) on an annunciator channel. The Dual Port Memory resident buffers are filled alternately starting with #0. Prior to filling a buffer the DSP must first acquire its semaphor and subsequently set it active low. Completion of a fill operation requires the DSP to reset the semaphor, write the corresponding Data Buffer Ready value to the Channel Event Queue, and write 0×FFFF to the host mailbox at address FCOFFFH, generating an interrupt. If the channel is not an annunciator, the host has committed an error. FFFFH is written to the Channel Command field. The error indicator value 0001H is written to the Channel Error field. The host terminates Record by issuing the command Stop Record (0004H).

8.2 Play Voice Data

Play allows an annunciator channel to transfer mulaw data from disk to the output MVIP bus via the quad port ram. The processor receives the command Start Play (0001H) on an annunciator channel. The Dual Port Memory resident buffers are filled alternately starting with #0. Prior to emptying a buffer the DSP must first acquire its semaphor and subsequently set it active low. Completion of a empty operation requires the DSP to reset the semaphor, write the corresponding Data Buffer Ready value to the Channel Event Queue, and write 0×FFFF to the host mailbox at address FCOFFFH, generating an interrupt. If the channel is not an annunciator, the host has committed an error. FFFFH is written to the Channel Command field. The error indicator value 0002H is written to the Channel Error field. The host terminates Play issuing the command Stop Play (0002H)

8.3 Tone Generation

Tone Generation is accomplished in software by recursive production of the unit sample response of a second order harmonic oscillator.

$$y[n]-(2.0*R* COS(a))* y[n-1]+(R*R)* y[n-2]=x[n]$$

$$a=(2.0*p*f)/F$$

$f$=tone frequency, $F$=8000.0 samples/sec, $p$=3.1415927, $R$=1.0

The behavior of the oscillator is determined by the coefficients of the y terms. The frequency of oscillation depends upon alpha, while damping is controlled by R. R is the distance of the pole from the unit circle in the complex Z-plane. For an oscillator R equals 1.0, placing a pole directly on the unit circle at the frequency of interest. Production of samples commences two sample periods beyond t=0

$$t=2, x[n]=0, y[n-1]=2.0*R * COS(a), y[n-2]=1.0$$

The samples produced lie between −1.0 and +1.0. Multiplication by a scaling factor adjusts the samples to the proper power level. Scaling factors are provided to the DSP as Decibel values. Conversion to a linear scaling factor is accomplished prior to use. The scaled samples are converted to mulaw, complemented and written to the channel's quad port ram buffer. One new output datum is produced each sample period.

8.3.1 DTMF Acknowledge Tone

The Host issues the command Generate DTMF Acknowledge Tone (0007H) to a channel in response to reception of a valid DTMF tone. Sequence: {[single tone—1477 hz, 200 msec], [single tone—1447 hz, 200 msec]}.

8.3.2 Conference Entry Tone

The Host issues the command Generate Conference Entry Tone (0008H) to all conference channels in response to entry of a new conference participant. Sequence: {[single tone—1209 hz, 200 msec]}.

8.3.3 Conference Exit Tone

The Host issues the command Generate Conference Exit Tone (0009H) to all conference channels in response to the departure of a conference participant. Sequence: {[single tone—1633 hz, 200 msec]}.

8.3.4 Security-On Tone

The Host issues the command Generate Security-On Tone (000AH) to all conference channels when the moderator toggles conference security on (DTMF 7). Sequence: {[single tone—1209 hz, 200 msec], [single tone—1336 hz, 200 msec]}.

8.3.5 Security-Off Tone

The Host issues the command Generate Security-Off Tone (000BH) to all conference channels when the moderator toggles conference security off (DTMF 7). Sequence: {[single tone—1209 hz, 200 msec], [single tone—1336 hz, 200 msec], [single tone—1209 hz, 200 msec]}.

8.3.6 Dial a Telephone Number—DTMF Generation

DTMF generation is accomplished by summing the scaled output samples of two second order harmonic oscillators, implemented as described previously. The oscillator frequencies are taken one each from the row and column frequencies; row: 697, 770, 852, 941 column: 1209, 1336, 1477, 1633. The DTMF on and ofttimes are specified as system parameters. A number to be dialed is placed by the Host in the Channel Digits-out field (ASCII). The Host issues the command Dial a Telephone Number (0005H) to a channel. The double tones corresponding to the ascii digits are generated one at a time separated by pauses. One output datum is generated each sample period.

8.4 Acknowledge

When the host wishes to determine if a DSP node is functioning, the command Acknowledge (0006H) is issued to a channel serviced by that DSP. If it can, the DSP responds by clearing the command field.

9.0 Talk

During a conference the speaking privilege is rationed among the active channels.

9.1 Talk Detection

The articulated speech signal exhibits non-stationary characteristics, which are the basis for distinguishing it from noise. A simplified model of the speech signal equates it to the product of two random processes: an "envelope" and a "carrier". The carrier has a spectrum lying between 300 and 3400 Hz, while the bandwidth of the much narrower envelope is 0 to 50 Hz. A channel's activity level is tracked continuously using a single pole integrator. The cut-off frequency of the integrator should completely eliminate the fine structure due to the carrier, but pass the rough structure due to the envelope undisturbed. Input to the integrator is the magnitude of the current codec sample on that channel. The output is considered the average magnitude of the input signal. This calculation is also done for the composite conference output to yield a conference average magnitude.

$$mk[n]=(1.0-a)*mk[n-1]+a * ABS(x[n])$$

$a=0.01=$"filter time constant"

$((1.0-a)/a)=99=$number of samples integrated over

A channel has to be on a Conference Talk List in order for its voice data to be broadcast. Two conditions must be satisfied for admission to the talk list. A channel is considered talking when its integrator output is greater than the talk level threshold (−35 dBm).

(1) $mk[n]>$TalkLevel$\rightarrow$"talking"

An above threshold channel is considered a candidate for the conference talk list, if its average magnitude is greater than one third the average magnitude of the conference.

(2) $mk[n]>(m1[n]+m2[n]+m3[n])/3\rightarrow$"talk list candidate"

9.2 Talk Lists

Each processor has 8 bits reserved for MVIP bus broadcast of talk list candidacy. One bit is reserved in sequential order for each of the channels a processor is responsible for. If a channel satisfies both of the stated criteria its talk bit is set. Each processor writes its talk byte to the quad port ram for broadcast over the MVIP bus. The talk bytes are made available to all processors next sampling period. One talk byte is processed per sample period in round robin sequential order. Each node also transmits a sequential count variable which corresponds to the node numbers. The count variable specifies which node's talk bits are to be processed this sample period. Only the lowest active node's count variable is heeded. Synchronization is thus maintained by the lowest active node. The processor accesses the Channel Conference List to determine what conference the candidate belongs to. The talk byte acts as the index into the talk bits translation table. The corresponding talk list is updated with port numbers formed by the concatenation of the count variable (node number) with sequence numbers removed from the translation table. The new candidates are added at the top of the list as current members are pushed down and eventually off If a processor adds or removes one of its channels from the list, it must update the relevant items in its internal information data structure. A muted or current talk list channel is never eligible for Talk List consideration. When a talk list member talks or becomes quiet, the DSP informs the HOST. The DSP sets the Chan_talk field to either 1 (talking) or 0 (silent).

9.3 Broadcast

Each DSP node uses its channel conference assignments and the Conference Talk Lists to determine which quad port ram input samples are to be summed, scaled, and to whom broadcast. If a channel is on a Talk List his speech sample is not included in the sum broadcast to him. A channel, whose music indicator is set, receives music instead of voice data.

10.0 Music

Music can be supplied to any conference participant. If the Channel Data Structure's Music (CHAN_music) indicator equals "1", data samples from the music input time slot are routed to the channels time slot over the output MVIP bus.

11.0 Record/Playback

A channel is a Record/Playback Channel if its corresponding MVIP time slot is a record/playback time slot. The Time Slot Type field of the Channel Data Structure should equal 0005H. Though inanimate a Record or Playback Channel is treated virtually the same as a regular conference participant. The mode of operation is dependent upon the mute status. If unmuted the channel can gain access to the talk list and broadcast to conference participants. Otherwise the channel will act as a passive conference participant and listen (record). A Record/Playback Channel is placed in a conference by placing an entry in the dual port memory Conference Queue.

12.0 Link Line

A channel is a Link Line Channel if its corresponding MVIP time slot is a link line time slot. The Time Slot Type field of the Channel Data Structure should equal 0006H. A Link Line joins two DCBs and is capable of transmit and receive of voice data. A Link Line Channel is treated the same as a regular conference participant.

13.0 DTMF Detection

Dual Tone Multi-Frequency (DTMF) is the generic name for push button telephone signaling. DTMF signaling allows channels another means of communicating with the DCB. Valid DTMF digits include; "0"=Help Request, "1"=Add to Q&A queue, "#"=remove from Q&A queue, {"1"–"9"}= Polling responses. DTMF detection is performed on conferee channels constantly. A DTMF signal results from the addition of two sinusoids at different frequencies. The frequencies are selected from row and column frequency groups, having four members each. The row frequencies are 697, 770, 852 and 941 hertz. The column frequencies are 1209, 1336, 1477 and 1633 hertz. Decoding a DTMF tone requires separation and identification of the members forming the tone pair. The input samples are input to a parallel bank of eight infinite impulse response digital resonators, centered at the previously listed frequencies.

$$yk[n]=(a1 * x[n])+(a2* x[n-1])+(b1* yk[n-1])+(b2* yk[n-2])$$

| filter coefficients frequency | a1 | a2 | b1 | b2 |
|---|---|---|---|---|
| 697 | 0.0782560 | −0.0668920 | 1.6912040 | −0.9806259 |
| 770 | 0.0851360 | −0.0701440 | 1.6279699 | −0.9789406 |
| 852 | 0.0928640 | −0.0729880 | 1.5507061 | −0.9770511 |
| 941 | 0.1012520 | −0.0750560 | 1.4596493 | −0.9750043 |
| 1209 | 0.1265120 | −0.0741800 | 1.1460505 | −0.9688669 |

| filter coefficients frequency | a1 | a2 | b1 | b2 |
|---|---|---|---|---|
| 1336 | 0.1384800 | −0.0697680 | 0.9795147 | −0.9659721 |
| 1447 | 0.1517720 | −0.0617200 | 0.7838895 | −0.9627682 |
| 1633 | 0.1664720 | −0.0489120 | 0.5571413 | −0.9592359 |

Each resonator has associated with it a single pole integrator for measurement of its output.

$$mk[n]=(1.0-a)*mk[n-1]+a * ABS(y[n])\ a=0.0119934$$

For a single tone the magnitude of the integrator output approaches the rms value of the signal. A DTMF digit is indicated when a row frequency and column frequency dominate their respective groups. To be valid the two magnitudes must lie between −30 dBm and +dBm. An integrator's output magnitude must represent more than half the total energy of its group. A DTMF signal is considered present as long as the two single tones are above −30 dBm. It is expected that these conditions will prevail for 32 milliseconds prior to further testing. When considered over the total time present, this becomes an exercise in repeated trials with the probability of a correct determination increasing with the number of observations. The statistical differences between tones and speech are used to increase the certainty of DTMF detection. The Gamma probability density function is a good approximation to the probability density function of speech amplitudes. A single tone's amplitude probability density function is uniform. The amplitude probability density function of a double tone is the convolution of two uniform probability density functions and is therefore triangular. These statistical differences manifest themselves in a factor called peak factor. Peak factor is defined as the ratio of peak magnitude to root mean square value during some time interval. The time interval chosen is 32 msecs. To simplify the calculation the average magnitude rather than the root mean square value is used. For double tones embedded in white noise the resulting value falls within the interval; 2.344–2.714. In contrast, the peak factor range of speech is 3.5–27.0. A valid DTMF tone should be longer than 40 msec and above a threshold of −30 dBm. The difference in power between the tones should not exceed 8 dB. Any other energy must be 20 dB below the DTMF power for 40 msec to guarantee detection. When a new digit is detected it is written to the dsp/host channel event queue in the form xx02h. The DSP interrupts the host by writing 0xFFFF to the dsp/host mailbox at address FCOFFFH.

14.0 Volume Controls

The energy levels of output signals are controlled. This is necessary both for user comfort and conformity to compliance standards.

14.1 System Wide Gain

A system-wide multiplicative gain factor is always applied. The magnitude of this factor is indicated by a gain parameter, having 16 binary values (0000–1111). The gain parameter acts as index into a table containing the multipliers, which each correspond to a specific dB change. The gain factor is initialized on request or at initialization.

14.2 Automatic Gain Control

A composite conference output sample is transmitted to each conference participant. These output samples are subjected to either automatic gain control or automatic limiting. In either case the necessary multiplier is read from a table containing 128 values. The mulaw equivalent of the conference average magnitude acts as the table index. The tables were computed by converting a power level input/output characteristic to one involving signal magnitudes.

Po=average output power

Pi=average input power

Mo=average output magnitude

Mi=average input magnitude

AGC Function

Po=−16.0+0.3*(16.0+Pi) yielding in terms of average magnitude $Mo=79.582009* Mi^{0.3}$ Limiting Function Po=−13.0+0.1*(13.0+Pi) yeilding in terms of average magnitude $Mo=379.21491* Mi^{0.1}$ The table values are the ratios of the Mi's to the Mo's. The Mi's are the linear values corresponding to the mulaw values 00H to 7FH. The resulting tables are piece wise linear and have the same quantization bin behavior as the mulaw table. The multiplier chosen from the table does not often change in response to a small change in the conference average magnitude 15.0 Program Flow (1) Wait for interrupt (2) Update parameters if necessary (3) Process Channel Commands (if command field is non-zero)

(4) Talk Detect (5) DTMF Detection (6) Output Voice Sums, Music, Annunciators or Playback to Channels (7) Update Talk Lists (8) Service Conference Queue 16.0 Realtime Operation Each TMS320C31 DSP microprocessor comprising the Digital System 70 Conferencing Bridge must execute all of the tasks itemized in item 15.0 completely every 125 microseconds. Successful operation of the system is dependent upon this. The distribution of tasks (i.e. channel type; conferee, annunciator, operator, linkline, record/playback) per node is itemized in document #14002082, "DCB Tables for MVIP Bus and Related Assignments".

APPENDIX C

Introduction

The DCB-96 will be an all digital audio conference bridge, featuring 96 ports in the first release. Four T1 trunk interfaces provide access to the 96 conference ports. Digital Signal Processing will combine the required speech samples and transmit them to the conferees. Two analog ports provide the ability to expand a system—linking it to another DCB-96 or an installed LINX system 60. Operators can monitor conferences through eight analog ports; and music may be sent to the conferees on another. The system will be available in three sizes, 24, 48, 72, and 96 ports initially. Future expansion to 144 ports will be studied, but will not be part of the initial release.

The T1 provides access to the bridge through the telephone network. The speech samples flow onto the DSi section of the MVIP Bus where they are accessible to all of the Quad DSP boards. Digital Signal Processors (DSPs) can analyze the speech, analyze tones, generate tones, and combine add speech samples. The DSPs can then output the speech onto the DSo section of the MVIP Bus. These output speech samples are transmitted to the listeners through the T1 card and the telephone network. An analog board provides access to the system for operator headsets, music, playback & record, and link lines to other bridges. A 486 processor runs the UNIX operating system, downloads codes to the Quad DSP Boards, controls the conferences, etc. A serial card provides access to operator terminals, either directly or through modems. A modem card is provided for remote maintenance.

Interface Specifications

The following is a summary of the hardware specifications at the interfaces to the system. Some hardware features are not supported in the first software release.

| T1 Interface | |
| --- | --- |
| Frame Rate | 8 kHz |
| Bit Rate | 1.544 MHz |
| Framing Pattern | D3/D4 (12 frame pattern) or Extended SuperFrame (24 frame pattern) |
| Supervisory Signalling | Common Channel Signalling (Primary Rate D Channel) |
| Terminating Impedance | 100 Ohms |
| Cable Type | Shielded twisted pair(1 pair transmit; 1 pair receive) |
| Plug | 8 Pin Modular Plug |
| Maximum cable length | 655 feet |
| Clocking | Normally received from network(+/−130 ppm) Optionally internally generated |
| Operator Interface | |
| Audio | 4 wire headset, 6P4W modular plug; 24 VDC Max, 30 mA Max 600 Ohms, >30 db return loss |
| Data | RS-232, DB25 |
| Other Audio Interfaces | |
| Link Line | 4 wire, 6P4W modular plug 600 Ohms, balanced dry connection |
| Record/Playback | 2 wire, 6P4W modular plug 600 Ohms, balanced dry connection |
| Music | 2 wire, 6P4W modular plug 600 Ohms, balanced dry connection |
| Alarm Interfaces | |
| Major Alarm | 2 contact closures rated at 100V, 1A Amber LED indication |
| Minor Alarm | 2 contact closures rated at 100V, 1A Amber LED indication |
| CPU LED | flashing green LED |
| Local Maintenance Port RS232,DB9 | |

T1 Telephone Interface Board

T1 advantages

Using T1 telephone interfaces in place of analog 2500 set interfaces provides the following advantages
Low noise,
No attenuation,
Low cost,
Reduced cabling, and
Dense packaging per telephone channel,
Alarms for system maintenance.

T1 circuits are commonly restricted to trunk interfaces, which will provide quick call set up and disconnection and features such as ANI and DNIS.

Mitel

The DCB-96 will use the Mitel MB89110 Dual T1 Card. It provides 48 telephone trunk circuits with two T1 interfaces and offers the following features—Two T1 interfaces per card, Programmed through PC bus, Extended Super Frame, D3/D4, or SLC-96 Framing options, Robbed bit (channel associated) signalling of each trunk, or common channel signalling, Alarm detection and generation, Diagnostic loop back, DSX line equalization, MVIP interface with a Time Slot Interchange ability, Hand set jack for test purposes, Certified in US and Canada.

Description of Hardware

The card supports two independent, bi-directional T1 lines. Each T1 requires a Line Interface Unit Circuit which amplifies the received signal, recovers a clock signal from the received bit stream, amplifies and shapes the transmitted bit stream. Each T1 also requires a framer circuit. This framer circuit assembles the 24, 8 bit, Pulse Code Modulated speech samples into a frame. It adds the framing bits and robbed bit signalling bits when required on the transmitted signal. It also reverses the process in the receive direction.

All of the speech samples flow through a time slot interchange switch matrix. This matrix is programmed through the AT Bus. Once programmed, the switch repetitively connects any T1 time slot to any time slot on the MVIP bus, or connects a time slot to a data memory in the switch accessible by the AT Bus, or connects a time slot to the other T1. This switch is discussed in more detail later in this section. The 48 port capacity provided by this card reduces the board count 24:1 over the LINX product.

Hardware Setup

T1 line connection

One top connector (J1) is referred to as trunk A and another connector is referred to as trunk B. The board should be optioned as the user side of the line. Optioning the board for the network side reverses the transmit and receive pair assignments.

T1 line Equalization

The output can drive up to 655 feet of cable. Equalization is provided in three steps from 0 to 655 feet. This cable equalization is for the cable distance from the DS60 to a DSX-1 crossconnect panel if there is one. (The DSX-1, crossconnect panel, is a restoration facility in large telephone offices. Where the DSX-1 is not used this is the demarcation point where service is handed with the far facility. If the far end equalizes the entire cable length, use a length of 0 feet in setting the cable length.)

PC Interrupt

Interrupt IRQ 12 is the standard selection on P4 (the jumper on header P3 would move to P4) of the board. The board offers IRQ 3, 4, 5, 6, 7, 9, 10, 11, 12, 14, and 15 as options. The first T1 board must use the termination selected by position 6 of header P3. All other boards using the same interrupt should remove the jumper from that position and reposition it so that the lower position of the jumper contacts the higher pin of the header at pin 6. This way the option is not selected, but the jumper is not lost for future reconfiguration.

PC Base I/O address

The first T1 board will use I/O address 300; the second 2300.

MVIP Bus

Positions 1, 2, 3, and 4 of P1 select the terminations for the MVIP bus. These should be optioned on the last board on the MVIP bus. Otherwise the jumpers should be positioned so that the jumper contacts only one pin on the header.
Software Options
T1 Framing Chip Setup
To initialize the framing device there are Master control words and Per Channel Control Words. There are two Master control words for each T1 framing chip.
Master Control Word 1
This controls the following functions
D3/D4 Yellow Alarm—returns the indication that a loss of frame condition was received if framing pattern is D3 or D4.
Robbed Bit—enables robbed bit signalling.
ESF Yellow Alarm—returns indication that a loss of frame condition was received if framing pattern is Extended Superframe.
External Control Pin
8 kHz Output Select—chip outputs a frame sync signal, only one framer can be enabled at a time.
Binary Eight Zero Suppression—used in wide-band data transmissions.
Transparent Zero Code Suppression—stops zero code transmission in data transmissions.
Debounce—removes 6 to 9 ms transitions in the received robbed bit signaling information.
Master Control Word 2
This controls the following functions
Maintenance Mode—4 out of 12 consecutive errored Ft bit causes a RED alarm, out-of-frame.
CRC/MIMIC—determine the mode of finding frame in out-of-frame condition.
SLC-96 Mode select—not enabled in release 1.
Reframe—a change from high to low will force the framer to find frame again.
ESF Select—set for Extended Super Frame; clear for D3/D4 frame.
All One's Alarm—sends all 1's, blue signal.
DGLOOP—Used for diagnostics.
Remote loopback—Used in far end testing of T1 line.
Normally the Master Control Word2 is 00 for D3/D4 framing, and 10 for Extended Superframe.
Per Channel Control Word 1
This controls three functions on each channel.
Data Channel Enable—disables the robbed bit signalling
Per Channel Loopback—loopback one channel.
Polarity—inverts the bits in the channel.
Normally the PCCW1 is 04.
Per Channel Control Word2
This contains the robbed bit signalling information. There is one PCCW for each channel.
Time Slot Interchange Setup
The time slot interchange circuit is composed of four, 256 channel, digital switches. One digital switch chip connects the framers to the MVIP Bus; one connects MVIP Bus to the framers; one connects framer to framer; and one connects MVIP channel to MVIP channel. Each device must be programmed to set the necessary connections between 256 inputs and 256 outputs.
Also, each switch device contains internal memory that may be connected to a channel input or output. The AT bus can assess this memory to control the supervisory signaling. The memory is bank switched by a control word; therefore only a small portion of the memory is available at one time.
Control Register The control register is accessed anytime that A5 bit is equal to 0 and the device is selected. The control registers control which serial bit stream can be accessed, and which control byte for each channel in the bit stream. There are four functions in the control register.
Line Address Bits—to select the serial line to control.
Memory select bits—select between the following three byes—
Data memory
Connection Memory Low
Connection Memory High
Message Mode—
Split Memory—When set to 1, reads are from data memory, writes are from Connection memory low.
Connection Memory High
This has three per channel control bits.
Output Enable—can tristate any given channel output
CSTo Bit—(unused in switch #3 & 4, set to 1)
Message Channel—sends information from data memory on designated channel
Connection Memory Low Bits
This normally determines the input connection for this output time slot. It has two components.
Channel Address—selects the input channel
Line Address Bits—selects the input line
Alternatively, if the channel is designated a message channel, the contents of this register are sent.
Framing Format
This board supports the two most common framing formats—the Extended Super Frame or: D3/D4. The D3/D4 is the largest installed base, while the new ESF is common in new installations. This must be optioned to be compatible with the equipment on the other end of the line. Otherwise the system will not find the frame, resulting in a constant alarm condition. This option is set in bit 4 of the Master Control Word 2, offset address 0C1F.
Supervisory Signalling
Release 1 of the DCB-96 product will offer channel associated signaling; also known as robbed bit signaling, or AB bit signaling, or ABCD bit signaling. This format transfers the on-hook/off-hook information in both directions of transmission. Release 1 will support E&M format signalling. In this case the A bit transfers the information that a relay would otherwise send. When A=0 the channel is idle; when A=1 the channel is active. During a call set up period there may be transitions—winks, etc. For E&M signalling the transmitted B, C, and D bits are defined to equal the A bit. On the receive line only the A bit is read. The signaling state is stored in a nibble in the PCCW, the Per Channel Control Word. These are located at offset addresses 0C00 to 0C1E h.
PC Interface
Interrupts
The T1 boards will share interrupt IRQ12.
I/O Memory Map
Each T1 board must have a unique base address, set by the DIP switch on the board. Board 1 will use 300h; board 2, 2300h; and board 3, 4300. Eight blocks of memory are defined on each board based on this base address.
Load and Drive
The data, address, and reset inputs will present a 0.1 ma load on the bus. The IOchrdy and the IOchwr inputs will present a 20 ua load to the PC bus. The drive capability is 24 ma except for IOchrdy that is 4 ma.
Alarms
T1 has two important alarms Red (out-of-frame), and Yellow. The alarms are reported to status registers that must be polled. No LED's or alarm contacts are provided on the option board. When a fault occurs in a T1 line, the terminal on the receiving end generates a Red alarm, and sends a Yellow alarm to the far end. Another condition 'Blue Alarm' is only detected if the signal is unframed; and then it is reported as Red. The Blue alarm state is an all one's pattern generated as a keep alive signal when repeating equipment receives no input signal to transmit. If you receive a blue signal you know you are out-of-service, but you also know the problem is down stream. The T1 Board can send a Blue Alarm to indicate out-of-service conditions.

Customer Service Unit

If this board connects to the public telephone network from customer premise equipment, a Customer Service Unit is required. Also in installations where the T1 cable exceeds 655 feet a CSU may be necessary. The CSU is external box that Drives up to 6000 ft of cable, May terminate the 130 Volt power feed, Provides loopback functions and Provides a 'keep alive' signal when the conference bridge is serviced.

Provides data buffering, necessary to tolerate clock variations.

Certifications

The MB89110, T1 board is certified in the USA and Canada by UL, CSA, FCC, part 68, and DOC CS-03. This board level certification reduces the required system level. (The MB89120, E1 board is pending UK certification to BABT requirements. However, using this dumb board to support multiple E1 lines with common channel signalling is an open issue)

Digital Signal Processing Board

The T1 board connects to the Quad Digital Signal Processing Board through the MVIP Bus. The Receive gate array reads all 256 DSi time slots on the MVIP bus and stores them in a buffer. These PCM time slots are then available to the C31 Digital Signal Processor as required. The Digital Signal Processing detects signals, generates tones, and conferences channels together. DSP adds flexibility to the system. DSP provides functions described in code that were previously provided in hardware, allowing rapid changes and additions to functions. All code, commands, host to DSP interrupts, and data structures are sent through the dual port RAM. All output samples are sent in PCM format through the Transmit buffer. The Transmit gate array reads this buffer together with the reference memory and places the time slot on a DSo time slot. There are four TMS320C31 processors on each board in this system.

MVIP INTERFACE

The telephone channels from the T1 boards occupy part of the first six MVIP Bus lines; each T1 uses the first 24 channels on the 32 channel line. The channels 24 to 31 are reserved for operator services, music, recording, etc. The last two lines, DSi(6&7), are reserved for inter-processor communication.

RECEIVE

A field programmable gate array writes all information received on the 256 channels into two quad port rams. Each of these RAMS is connected to two processors. This gives each DSP processor access to all of incoming telephone information. This information is double buffered, i.e. while the new bus information is written into one section of memory, the processors are reading it from another. The content of the RX control register determines the memory locations used.

The board provides an option to connect the last two receive lines to the transmit DSo(6&7) lines, providing inter-processor communication. This option will be enabled in all boards in release 1. The option is exercised by setting bit 1 in the Base Address Register.

TRANSMIT

The transmit connections to the MVIP bus attempt to reverse the receive process. The processor can write a speech sample into any of 32 memory locations, each representing a channel on the MVIP Bus. The gate array will automatically retrieve the information and together with a line assignment from the reference memory. This process however contains blocking; because once a speech sample is stored in the location for channel 1; it is the only channel 1 that processor can transmit on. This complicates the time slot, or channel assignments on the MVIP bus. One processor can transmit up to 32 channels of information as long as each has a unique channel number (0 to 31).

The PC loads the reference memory with a map of channel assignments while the system is out of service. Thereafter the gate array reads a location each time it reads from the quad port RAM and the content of the memory does not change. Every 125 us frame, the gate array will access 32 locations in the quad port RAM and 32 locations in the reference memory looking to place the quad port information on the bus. One bit in each reference memory is used to indicate if this channel is unused.

DIAGNOSTIC LOOPBACK

A diagnostic loopback circuit is provided at the MVIP interface. Position 8 of SW1 controls the clock connection at the interface. In the ON position, the clock is derived from the 33 Mhz board clock; in the OFF position, the MVIP Bus clock is used.

DSP

Each TMS 320C31 Digital Signal Processor operates at 33 Mhz. It has static RAM for code and data space. The quad port RAM is used to communicate with the MVIP bus; and a dual port ram provides communication with the PC Bus. The four processors on a board can communicate with each other through their serial port or they can communicate to a sibling through the quad port RAM.

PC INTERFACE

The switch S1 is used set a unique I/O address for each board between 10 to 300 h.

Load and Drive

The Quad DSP presents a 0.6 ma load on the AT bus and a 24 ma drive to the bus.

APPENDIX D

SCOPE OF DOCUMENT

This documents is intended as a design specifications document for the Multi-Link DSP Processor or MDP Card.

SECTION 1

Provides a functional description of the MDP card, a summary of the various subsections in the MDP card is presented.

SECTION 2

Describes the PC Interface and Shared Memory Circuit Implementation and Related Timing.

SECTION 3

Describes typical TI320C31 based DSP Node circuit with reference to Related Timing. The Memory and Register MAPs for each Node is described.

SECTION 4

The MVIP Interface using PLD1 and PLD2 and is described. The functionality of the MVIP Transmit and Receive Sections are described in detail.

INTRODUCTION

The Multi-Link DSP Processor (MDP) is being designed to meet Multi-Link's performance objectives for Voice Conferencing applications. The MDP card is a full size PC-AT card which is based on a distributed processing architecture using four Texas Instruments TNS320C31 DSP Nodes. The MDP card is designed to process (voice) channel data from eight (T1/CEPT lines) on the MVIP bus. This design allows all four DSP Nodes access to a total of 192/256 voice channels.

A Feature summary of each sub-section of the MDP card is given below.

FEATURE SUMMARY

PC Interface (detailed in Section 2)

Full 16 Bit PC-AT Interface

I/O Mapping Range 0×100 to 0×3FF

Memory Mappable In full 16 Meg Range of PC-AT

Window sizes of 16K & 32K supported.

Jumper Selectable PC-AT Interrupts (IRQ3–IRQ15)

DSP Node, detailed in Section 3)

Processor 33 MHz Texas Instruments TMS320C31

33 MFLOPs 16.67 MIPS 2K 32-bit Internal RAM

64×32 Internal Cache

16 Megaword Addressing Range

Memory:

4K×16 Dual Ported SRAM (shared with the PC)

64K×32 Private Code SFWM (expandable to 256R) (SIMM Connector)

Inter-Node Communications

This maybe accomplished via the Quad Port RAM or Dual Port RAM by the PC-Host.

MVIP Interface (detailed in section 4)

The MVIP Interface is to have the following features:

1 MVIP Interface Receive PLD

1 MVIP Interface Transmit PLD

Dual Port reference memory which is shared with the PC.

Two Quad Port RAM which are accessible by all DSP Nodes.

SECTIONS 1 and 2

INTRODUCTION

The MDP card is designed to meet the full 16-bit ISA (PC-AT) specification. The MDP may be Memory mapped in the full 16 Megabyte address range of the PC-AT.

The PC Interface allows the PC to reset, run, upload code via a shared memory window, exchange interrupts and data with all four DSP Nodes. This interface allows the MDP card to be uniquely I/O and Memory Mapped in the PC.

I/0 MAP

The MDP is I/O mapped into the I/O Address space of the PC Host Processor. The I/O base address of the MDP card is determined by the settings of the first six positions of switch S1.

MDP registers are organized into seven Group Base Addresses by the decode logic performed by decoders U7, U9 and U10 in conjunction with PC Address Lines A10, A11, A12 and A13.

There are three functional I/O Mapped register groupings:

a. PC-Interface Control Registers (IO Address Group 0)

b. Dual Port Semaphore Registers (IO Address Group 1–4)

c. MVIP Interface Control Registers (IO Address Group 5&6)

These three groups are described in more detail in this section.

MEMORY MAP

The MDP presents a 16K Shared RAM window which maybe opened or closed and rapped anywhere in the 16 MB range of the PC-AT. The Memory Decode and Control functions are performed by the PC Control Register, Base Address Register, Virtual Mode Register and associated control logic. The function of these Registers is described in the paragraph on PC-Interface Control Registers.

PC-INTERFACE CONTROL REGISTERS (IO Address Group 0)

The I/O MAP for these group of Registers is selected by PBA13 being low and completely decoded by U10. These registers provide the PC Host processor access to several I/O registers for controlling shared RAM access parameters, Node Reset and Interrupt Control. The function of each host register is as described.

PC Control Register (PCR) (R/W) U8

This is a PC Host controlled Read/Write register which controls resetting and running the C31 processors, opening and closing the shared RAM windows and resetting of the MVIP Interface Control logic (PLD1 & PLD2). This register is cleared on Power-up and by PC Reset.

Base Address Register (BAR) (R/WJ) U11

The base address of DSP Node Dual Port or MVIP Reference shared RAM Window in PC Memory is set and enabled by writing to this register. The MVIP Reference Memory is shadowed by the Dual Port RAM. In the intended application, the Reference Memory would be accessed by the PC-Host during initialization, after which it is switched back into the 'shadow'. Note that the Dual Port RAM interface for the Nodes is 16 bits, while the Dual Port Reference Memory for MVIP Transmit function is 8-bit. The format of the MVIP reference memory is described in more detail in Section 4 of this Appendix.

The base addresses should be selected as increments/offsets of the window size of 16K. This register is cleared on power-up but not by PC Reset.

e.g.

BAR=80 for PC Base Address of 80000

BAR=A0 for PC Base Address of A0000

Virtual Mode Register (VMR) (U13)

This register is used in mapping the MDP in Extended PC Memory above the 1 MByte Intel Real Mode range. This register in combination with the BAR allows the shared RAM window to be located anywhere in the 16 Mbyte Addressing range of the 80236/803B6 PC Host. Address AD20 to AD23 are programmed into Bits 0–3. The ENVPM bit in the PCR must be set to activate the Protected Mode Address defined by this register.

INTERRUPT CONTROL

The interrupt control logic allows each Node to Interrupt the PC Host or the PC Host to Interrupt each DSP Node separately. The generation of interrupts in both directions is performed by writing into two fixed mail-box locations (offset FFE from the PC-Host side and offset FFF from the DSP Node side) in the Dual Port RAM (IDT 7024).

PC to DSP Node Interrupts

The PC which has access to the Right Hand Port of each Dual Port RAM (U29, U35, U42, U48) writes into location FFE, (1FFC in byte offset from PC side) this causes an interrupt to be generated on the Left Hand Port (INTL). The INTL interrupt outputs of all DPRAM are synchronized by PALs U17 and U 18 before being connected to the/INT1 input of each DSP Node. The DSP Node may clear the interrupt by reading location FFE.

DSP Node to PC Interrupt

Each DSP Node which has access to the Left Hand Port of the Dual Port RAM generates an interrupt to the PC by writing to location FFF. This causes an interrupt to be generated out of the Right Hand Side of the DP RAM, this INTR interrupt line (NDX INT) is fed to U16 which is responsible for or-ing all Node Interrupts to the PC and driving the selected IRQ Line. The PC has to determine the source of the Node Interrupt by polling software defined parameters in the DP RAM. Since the Interrupt Line may be shared through a 'WIRED-OR' arrangement, the PC-Host will have to determine the Interrupt Sources by polling the DP RAM of all DSP Cards in the system.

The PC may clear each node interrupt by reading location FFF (1FFE in byte offset) in the appropriate DP RAM. The interrupt level to the PC-HOST is jumper selectable from among IRQs 3,4,5,9,10,11,12 or 15 at J1

NODE SEMAPHORE REGISTERS (IO Address Group 1–4)

These eight registers located within the Dual Port RAM of each Node are IO Mapped for PC-Host access. The decode down to each register is performed within each DP RAM. These registers are Memory mapped into each DSP Node access the DP RAM from the Left Port.

The group base address (PC Side) for each Node is as below:

Node A—2000+Board I/O base address

Node B—2400+Board I/O base address

Node C—2800+Board I/O base address

Node D—2000+Board I/O base address

For each C31 node Semaphore register address is as follows:

| Reg0 | B00000 |
|------|--------|
| Reg1 | B00001 |
| . . . | . . . |
| Reg7 | B00007 |

Example for Node A and semaphore Reg1

C31 node A attempts to set semaphore Reg1 by writing 0 to B00001.

If C31 reads back 0. It has control.

If it reads back 0xff, PC has control.

PC attempts to set semaphore by writing 0 to I/O address 0x2002+Board Base Address.

If PC reads back 0. It has control.

If PC reads back 0xff. C31 A has control.

To release semaphore register, C31 or PC rust write 1 to the respective address.

MVIP INTERFACE CONTROL REGISTERS (IO Address Group 5 & 6)

The third I/O decode grouping is for MVIP Receive Control registers internal to PLD1 (U52) and MVIP Transrit registers internal to PLD2 (U50). Up to eight (8 bit) individual registers for each Group Base Address is decoded within each PLD. The functions of individual registers is described in Section 4 of this Appendix.

SECTION 3. DSP NODES

INTRODUCTION

The processing power of the MDP card is provided by four DSP Nodes. The main building blocks for each DSP Node is provided by a 33 MHz Texas Instruments TMS320C31 DSP (RISC) Processor, an Address decoder/wait state generator, up to 256 KBytes of Private (Code) Static RAM, a 4K×16 Dual Port RAM and a Quad Port RAM. The C31 accesses the MVIP through a Shared Memory Interface for both Receive and Transmit functions.

TMS320C31 PROCESSOR

The TMS320C31 is a cost reduced version of the C30 Processor packaged in a 132-pin plastic guad flat pack. The following is a summary of its features:

64×32 byte cache

Two 1K Internal RAM blocks

Addressing Range: 16 Meg

Data Bus: 32

1 DMA Controller, 2 Timers & 1 Serial Port.

ADDRESS DECODER & WAIT STATE GENERATOR

The memory address decode function at each node is performed by a 5 nS, 16L8 PAL. This PAL is selected because there are currently no standard Decoders that can meet the speed requirement.

For access to slower Code and Peripheral Memory, a wait state generator is implemented using a 16V8 GAL in conjunction with a two position jumper. The output of this GAL is fed to the decoder PAL in order to assert wait states. The decoder PAL has a ready output which connects to the Ready input of the C31.

PRIVATE (CODE) RAM

Up to 256K of 32 bit private Code RAM Space mapped between EC0000 to EFFFFF is available to each C31 processor. When 64K×32 RAM SIMM modules are used, they are mapped from EC0000 to ECFFFF. The Speed of SRAM modules used dictate whether wait-states need to be asserted for accessing Private RAM code. (SRAM Speeds of 45 NS require 1 wait state, SRAM Speed of 25 nS does not require wait states.)

DUAL PORT RAM (BOOT & PC-INTERFACE)

The Dual Port RAM is used for booting each DSP Node and for exchange of Code and Data with the PC Host.

Each DSP node has access to the left port of a (4K×16) Dual Port RAM, the right port is accessible by the PC. Only the lower 16-bits read by the C31 Processor contain valid data, the upper 16-bits are in an undefined state. Software 'blanking' of the upper 16 bits is necessary to put them into '0' state The IDT7024 has been selected for this application. The IDT7024 includes such features as arbitration control, semaphore registers and interrupt generating mail-box registers. The arbitration control feature asserts a BUSY output signal to hold-off arty device trying to access a 'busy address'. The mail-box register locations nay be used by the DSP nodes and the PC to interrupt each other. A more detailed explanation of this interrupt scheme is provided in Section 2 of this Appendix.

QUAD PORT RAM

There are two IDT7052 2 k×8 Quad Port SRAM, these are shared by two DSP Nodes each. The QUAD Port RAM provide a shared RAM interface to the MVIP Interface Circuit. Each DSP Node may read and process received MVIP DATA and output data to be Transmitted by the MVIP Interface.

This Quad Port RAM does not feature arbitration logic, for preventing address collisions. It is the responsibility of the applications (protocol) code to ensure data integrity. The functions of the QUAD PORT RAM in conjunction with the MVIP Interface is described in Section 4 of this Appendix.

SECTION 4 MVIP Interface

INTRODUCTION

The MVIP Interface performs two basic functions which include receiving MVIP Bus Data from the Serial Input Lines and transmitting MVIP data onto the MVIP Serial Output lines.

The Received MVIP Data is formatted and deposited in Quad RAM receive buffers for processing by DSP Nodes.

The Data to be transmitted is formatted for transmit on the NVIP Serial Output bus.

MVIP RECEIVE INTERFACE

The functional blocks within PLD1 (Actel-1020) device consist of a PC-Host Interface, Control Logic and a Serial to Parallel Converter.

PC-Host Interface—The PC has access to registers for configuring and monitoring the status of this circuit. One register is receive control register. The register includes a 'run' bit.

One register is the 'run' bit (when in 1 state) is responsible for initializing and starting the Receive Interface. The register also includes an 'Addr10' bit which selects the level of address 10 line. This determines the 1 Kbyte block of the QPR to be written. Bit 3 of this register is Read Only, and provides the status of Address line 9 to the QPR. The Status of this 'Ping-Pong' bit points to the 256-byte block that is being currently written to by the MVIP Receive circuit. STAT1 bits indicate the state of the 'ADDRESS' lines respectively. A 'CLKSEL' bit drives the SELECT line to a PAL, to control clock muxing function.

Other registers in the PC-Host Interface are the Receive and Clock Status registers which are used for diagnostics purposes to monitor the state of the respective lines. An abnormal line state such as 'open' and 'stuck' line can be detected by reading these registers.

Test Mode

The 'Test Mode' bit enables the local Test bus loopback path for testing functionality of both the Transmit and Receive MVIP Interfaces. The Test Mode connect all four (4) transmit MVIP lines to the MVIP Receiver. Within the MVIP Receiver these loopback receive lines are 'doubled' by connecting Line 0 to 4, 1 to 5, 2 to 6, and 3 to 7. This doubling of loopback lines allows all the Serial to Parallel conversion logic for 8 lines to be tested. (Note that the corresponding received data is also duplicated in the receive buffers).

Timing & Control Logic

This state machine is responsible for generating the basic timing, muxing, address generation (RAD0-RAD10), write strobes and status lines. This circuit block is responsible for writing received data in parallel to two Quad Port RAMS. The received block for each Frame is written alternately to two 256 byte blocks, a status line (PING) which connects to the XFO input of all C31's is toggled to indicate the 'current' received buffer.

MVIP TRANSMIT INTERFACE (U52, Sheet 7)

The organization of functions within this device is the opposite of the Receive Interface device. The main functional blocks include the PC-Host Interface, Control Logic and the Parallel to Serial Converter PC-Host Interface—This interface consists of one control register for controlling and monitoring the Transmit Interface. The transmit control register has similar functions to its counterpart in the Receive section.

Parallel to Serial Converter

This circuit is responsible for converting byte parallel data to bit serial data format for output onto the MVIP Bus. The logic for this function is the reverse of the Receive Circuit.

Control Logic

This circuit generates addresses and performs two data fetches from quad port (transmit buffers) and the 'steering' or reference dual port RAM.

Transmit Control Register

This register must be initialized appropriately by the PC Host. This register is cleared to all '0's on power-up. A value of '1' indicated an active state. Bit 0, the 'RUN' bit is used to start or stop the Transmit 'State Machine'. The 'Test Mode' bit when active enables the four 'Test Output' line feedback to the MVIP Receive PLD. The 'Master Output Enable' bit enables the Transmit MVIP outputs to drive the MVIP bus. This bit must be inactive In 'Test Mode' but active in normal operation. The 'Addr6' bit is a read only bit which shows the status of the Address 6 line. This bit will 'toggle' when the MVIP Transmit State Machine is in the 'RUN' mode. Bits 4 to 7 of this register are used for locating the base address of MVIP Transmit Buffer in the Quad Port RAM.

MVIP TRANSMIT BUFFER MEMORY ORGANIZATION

The MVIP Transmitter uses 2 Quad Port RAMS as the source of data which can be routed out to any of the 8 MVIP Bus output serial streams. The dual-port reference memory which provides the output routing information on a channel by channel basis is described in the next section.

The transmit buffer section of each Quad Port RAM is partitioned into four 32 byte buffer areas. The transmit buffer may be located on any of the sixteen (16) 128 byte boundaries by programming Address lines 7,8,9 and 10 in the MVIP Transmit Control Register.

The MVIP Transmitter will alternately transmit ('ping-pong') the buffer start address on a frame by frame basis. Bit 3 of the Transmit control register when read by the PC will indicate the current transmit buffer. The Transmit 'Ping-Pong' status is reflected by Address Line 6(TAD6) which is connected to the XFO flag pin at each processor. Each Node processor can hence track and output to the appropriate transmit buffer.

Each of the 32 bytes of the transmit buffer corresponds to the 32 time slots available on each of the 8 MVIP bus lines. The contents of the MVIP Transmit references memory determines which time slots and lines are to be driven.

MVIP TRANSMIT DUAL PORT REFERENCE MEMORY

This Dual Port Reference RAM is accessible by both the PC and the MVIP Transmit Control Logic. This steering memory should be initialized for each channel ('transmit byte time slot').

The dual port reference memory is partitioned into two 32 byte reference buffers. This reference buffer is fixed at location 0 within the reference memory. Proper setup of this reference memory (from PC Host) allows data from the any DSP Processor to be steered onto any channel (time slot) of any of the 8 output MVIP lines.

APPENDIX E

1. Host Software Environment

The Host Application software consists of individual processes running under VENIX/386 3.2. This operating system was chosen for a number of reasons:

UNIX standard: VENIX conforms to the standard AT&T system V interface spec. (they are a source licensee of AT&T). This allows our software to conform to the industry standard (SVID). It also allows us to add "shrink wrapped" software in the future if needed (i.e. database, X-Windows support).

Networking: VENIX supports standard TCP/IP and NFS implementations. This can be used both as a development tool, and can be integrated into the software for future applications (i.e. communicating to, monitoring multiple bridges).

Real Time: VENIX has a pre-emptable kernal. This way, our software can respond appropriately to real time external events 2. Data Flow-Diagram
3. InterProcess Communications This is a "message driven" system. Each process is assigned an input message queue. Receipt of a message will "wake up" a process if it is sleeping. Message sending/receiving will follow the standard UNIX guidelines for message passing between processes.

3.1 Standard Message Format

| | |
|---|---|
| Source Process ID | Identifies which process sent the message. Each process is assigned a specific "process ID" that will be recognizable by all the other processes. These IDs are assigned at initialization time, and not the same as the UNIX PID. |
| Priority | Normal or High. High priority messages will get placed ahead of normal priority messages in the destination process's queue. |
| Tag | 0=no response needed to this message; Nonzero=REPLY expected upon completion of operation(for example, digits dialed successfully). This tag number would be included in the REPLY message. This way, the sending process would know which message was being acknowledged. |
| MSGTYPE | The high byte of the message ID. |
| | CF_COMMAND identifies this message as a low-level command to initiate some action for a channel, or list of channels. |
| | CF_EVENT identifies this message as one that is generated by an asynchronous event(i.e. a T1 line seizing in). |
| | CF_REPLY identifies this message as a response to a command(i.e. dialed digits completed). |
| | CF_GENCMD identifies the message as a general conferencing command to initiate action for channel(s) or conference(s). |
| | CF_HLCMD identifies the message as a high-level command. These commands typically get translated into multiple low-level commands. |
| | CF_APPCMD identifies the message as an application-level command. These commands typically place an entire conference(or the system) into a particular state of operation. |
| MESSAGE | The low byte of the message ID. This identifies the actual message. |
| wParam | Parameter word. Usage depends on the values in the CMD field. |
| lParam | Parameter long. Usage depends on the values in the CMD field. |
| data | Optional data field. Usage depends on the values in the CMD field. |

3.2. Conference Messages

The following is a list of message descriptions. The following rules apply: "Channel" refers to the logical channel number (LCN). LCNs get translated to MVIP timeslots by the various processes that deal with them. LCNs are expressed as hex numbers (0–255).

DIGITDATA refers to a data structure that contains DTMF digits. This is a null terminated ASCII string of digits (0–9, A–F).

CHANDATA refers to a data structure that contains a list of LCNs. This is a series of LCNs terminated by a −1.

3.2.1. Low Level Command Messages

| | |
|---|---|
| Disconnect Out | |
| Description: | Physically hang up the line(i.e. go onhook). No DataBase update. |
| Destination Process: | T1 Handler |
| MSGTYPE: | CF_COMMAND |
| MESSAGE: | CMD_DISCONNECT |
| wParam: | channel(LCN) |
| lParam: | — |
| Data: | — |
| Seize Out | |
| Description: | Seize a line(i.e. go offhook). When this command is issued prior to dialing out, it acts as an offhook. When this command is issued in response to a Seize In event, it answers the line. |
| Destination Process: | T1 Handler |
| MSGTYPE: | CF_COMMAND |
| MESSAGE: | CMD_SEIZE_OUT |
| wParam: | channel(LCN) |
| lParam: | — |
| Data: | — |
| Fault Line | |
| Description: | This command is a "toggle". The first time it is sent, it faults out a T1 line. This causes a "seize out" on this line, so it will appear to be offhook. The next time this command is sent, the line is placed back onhook. |
| Destination Process: | T1 Handler |
| MSGTYPE: | CF_COMMAND |
| MESSAGE: | CMD_FAULT |
| wParam: | — |
| lParam: | — |
| Data: | CHANDATA channel list |
| Hookflash Out | |
| Description: | Initiate a hookflash on a line. |
| Destination Process: | T1 Handler |
| MSGTYPE: | CF_COMMAND |
| MESSAGE: | CMD_HOOKFLASH |
| wParam: | channel(LCN) |
| lParam: | — |
| Data: | — |
| Mute Line | |
| Description: | This command is a "toggle". This command either connects or disconnects the "mouthpiece" of the specified line to/from the "earpieces" of the rest of the lines in the conference. |
| Destination Process: | DSP Command Processor |
| MSGTYPE: | CF_COMMAND |
| MESSAGE: | CMD_MUTE |
| wParam: | — |
| lParam: | — |
| Data: | CHANDATA channel list |
| Gain | |
| Description: | This command either turns on or off the automatic gain control for a line. |
| Destination Process: | DSP Command Processor |
| MSGTYPE: | CF_COMMAND |
| MESSAGE: | CMD_GAIN |
| wParam: | On/Off flag |
| lParam: | — |
| Data: | CHANDATA channel list |
| Put Line Into Conference | |
| Description: | Place line into a conference. This automatically removes the line from any previous conference it was in. This essentially connects the "earpiece" of this line to the "mouthpieces" of all the other lines in the specified conference. If this line is not muted, it also connects the "mouthpiece" of this line to the "earpieces" of all the other lines in the specified conference. Music can be played to this line as well. If music is played, the channel is automatically muted. |
| Destination Process: | DSP Command Processor |
| MSGTYPE: | CF_COMMAND |
| MESSAGE: | CMD_PUT_INTO_CONF |
| wParam: | Music On/Off flag |
| lParam: | conference number |
| Data: | CHANDATA channel list |
| Play Tone | |

| | |
|---|---|
| Description: | Generates the specified tone to the specified channel(s) |
| Destination Process: | DSP Command Processor |
| MSGTYPE: | CF_COMMAND |
| MESSAGE: | CMD_PLAY_TONE |
| wParam: | Tone ID |
| lParam: | — |
| Data: | CHANDATA channel list |

Play Announcement

| | |
|---|---|
| Description: | Plays a specified digitized voice message to the specified annunciator channel. |
| Destination Process: | Annunciator |
| MSGTYPE: | CF_COMMAND |
| MESSAGE: | CMD_PLAY_ANNUN |
| wParam: | message number(predefined to specific filename) |
| lParam: | — |
| Data: | Annunciator channel number: Specifies the dedicated annunciator channel that the message will be played to. Any line that is to hear this message must have previously been placed into conference with this channel.<br>Filespec: Complete UNIX filename(including path) of file that contains the digitized voice data to be played.<br>Mode: Single Play or Continuous Play. Continuous Play will cause the message to be repeatedly played until a Stop Announcement command is issued. |

Record Announcement

| | |
|---|---|
| Description: | Records a digitized voice message on the specified annunciator channel. Records until a Stop Announcement command is received, or the duration has expired. |
| Destination Process: | Annunciator |
| MSGTYPE: | CF_COMMAND |
| MESSAGE: | CMD_RECORD_ANNUN |
| wParam: | message number(predefined to specific filename) |
| lParam: | — |
| Data: | Annunciator channel number: Specifies the dedicated annunciator channel that will be used to record the message. The line that is "speaking" the voice message(typically an operator) must have previously been placed into conference with this channel.<br>Filespec: Complete UNIX filename(including path) of file that will receive the recorded digitized voice data. If the file exists, it is overwritten. If not, it is created.<br>Duration: Maximum duration of message (in seconds) |

Stop Announcement

| | |
|---|---|
| Description: | Stops the playing or recording of a digitized voice message on the specified annunciator channel. This will, in turn, trigger an Announcement Done event message for that channel. |
| Destination Process: | Annunciator |
| MSGTYPE: | CF_COMMAND |
| MESSAGE: | CMD_STOP_ANNUN |
| wParam: | annunciator channel number |
| lParam: | — |
| Data: | — |

Dial DTMF Digits

| | |
|---|---|
| Description: | Outpulses DTMF digit(s) on specified line. |
| Destination Process: | DSP Command Processor |
| MSGTYPE: | CF_COMMAND |
| MESSAGE: | CMD_DIAL_DTMF |
| wParam: | channel(LCN) |
| lParam: | — |
| Data: | DIGITDATA digit string |

Start Timer

| | |
|---|---|
| Description: | Start a timer. When the specified duration has elapsed, the sending process will receive a Timer Complete event message, containing the specified tag value. Many different timers (TBD) can be running concurrently. If a process needs to have multiple timers running, they must each contain a different tag value. |
| Destination Process: | Timer |
| MSGTYPE: | CF_COMMAND |
| MESSAGE: | CMD_START_TIMER |
| wParam: | auto-repeat flag |
| lParam: | duration(increments of 100ms) |
| TAG: | Tag value: Sending process assigns this value so it knows which timer has completed upon receipt of a Timer Complete |

-continued

|  |  |
|---|---|
|  | event message. |
| Data: | — |

Stop Timer

| | |
|---|---|
| Description: | Stops the specified timer. If this message is sent before the timer's duration has elapsed, no Timer Complete event message will be sent for that timer. |
| Destination Process: | Timer |
| MSGTYPE: | CF_COMMAND |
| MESSAGE: | CMD_STOP_TIMER |
| wParam: | — |
| lParam: | — |
| TAG: | Tag value(matches the one specified in the Start Timer message) |

Get T1 Statistics

| | |
|---|---|
| Description: | Obtain current settings of T1 network management statistics. These values consist of cumulative data collected since the last time the statistics were reset. |
| Destination Process: | T1 Handler |
| MSGTYPE: | CF_COMMAND |
| MESSAGE: | CMD_GET_T1_STATS |
| wParam: | starting line(?) (or T1 span?) |
| lParam: | ending line(?) |
| Data: | T1 network statistic data (format TBD) |

Reset T1 Statistics

| | |
|---|---|
| Description: | Resets the T1 network management statistics |
| Destination Process: | T1 Handler |
| MSGTYPE: | CF_COMMAND |
| MESSAGE: | CMD_RESET_T1_STATS |
| wParam: | starting line(?) (or T1 span?) |
| lParam: | ending line(?) |
| Data: | — |

3.2.2. Asynchronous Event Messages

Seize In

| | |
|---|---|
| Description: | This event message is sent when incoming line seizure is detected(i.e. someone has dialed in on a particular line). It is also sent when the far end has answered in response to our dialing out. |
| Destination Process: | Call Handler |
| Priority: | Normal |
| MSGTYPE: | CF_EVENT |
| MESSAGE: | EVENT_SEIZE_IN |
| wParam: | channel(LCN) |
| lParam: | — |
| Data: | — |

Disconnect In

| | |
|---|---|
| Description: | This event message is sent when far end disconnect has been detected on a line(i.e. the far end has gone onhook). |
| Destination Process: | Call Handler |
| Priority: | Normal |
| MSGTYPE: | CF_EVENT |
| MESSAGE: | EVENT_DISCONNECT |
| wParam: | channel(LCN) |
| lParam: | — |
| Data: | — |

DTMF Digit(s) In

| | |
|---|---|
| Description: | At least one DTMF digit has been received on a particular line. |
| Destination Process: | Call Handler |
| MSGTYPE: | CF_EVENT |
| MESSAGE: | EVENT_DTMF_DIGIT |
| wParam: | channel(LCN) |
| lParam: | — |
| Data: | DIGITDATA digit string |

DSP Failure

| | |
|---|---|
| Description: | A failure has been detected on a DSP processor. This may mean that voice data is no longer being processed for the specified channels. |
| Destination Process: | Call Handler |
| MSGTYPE: | CF_EVENT |
| MESSAGE: | EVENT_DSP_FAILED |
| wParam: | — |
| lParam: | — |
| Data: | CHANDATA channel list |

T1 Alarm Set

| | |
|---|---|
| Description: | A T1 alarm condition has been detected for the specified channels. |
| Destination Process: | Call Handler |
| MSGTYPE: | CF_EVENT |
| MESSAGE: | EVENT_T1ALARM_SET |
| wParam: | type of alarm(red, yellow) |
| lParam: | — |
| Data: | CHANDATA channel list |

T1 Alarm Clear

| | |
|---|---|
| Description: | The T1 alarm condition for the specified lines has been cleared. |
| Destination Process: | Call Handler |
| MSGTYPE: | CF_EVENT |
| MESSAGE: | EVENT_T1ALARM_CLEAR |
| wParam: | type of alarm(red, yellow) |
| lParam: | — |
| Data: | CHANDATA channel list |

Line Clear

| | |
|---|---|
| Description: | This event message is sent in response to a Disconnect Out command. Typically, when a line goes onhook, there is a "guard time" that must elapse before it can go offhook. Thus, when a Disconnect Out is executed for a line, one should wait for the Line Clear event message before attempting to seize out on the line again. |
| Destination Process: | Call Handler |
| MSGTYPE: | CF_EVENT |
| MESSAGE: | EVENT_LINE_CLEAR |
| wParam: | channel(LCN) |
| lParam: | — |
| Data: | — |

3.2.3. Reply Messages

Announcement Done

| | |
|---|---|
| Description: | This message is sent when the playing of an annunciator message has completed(in response to a Play Announcement command). This means that the specified annunciator channel is now available to play another message. It is also sent when the recording of an annunciator message has completed, either by timing out or the sending of a Stop Announcement command. |
| Destination Process: | Call Handler |
| MSGTYPE: | CF_REPLY |
| MESSAGE: | REPLY_ANNUN_DONE |
| wParam: | annunciator channel |
| lParam: | — |
| Data: | — |

Hookflash Done

| | |
|---|---|
| Description: | This message is sent in response to a Hookflash Out command. Typically, a hookflash takes about 500ms to 750ms to complete. This message informs the sending process that the hookflash has completed. |
| Destination Process: | Call Handler |
| MSGTYPE: | CF_REPLY |
| MESSAGE: | REPLY_HOOKFLASH_DONE |
| wParam: | channel(LCN) |
| lParam: | — |
| Data: | — |

Timer Complete

| | |
|---|---|
| Description: | This message is sent in response to a Start Timer command. This informs the sending process that the duration specified in the Start Timer command has elapsed. |
| Destination Process: | Call Handler |
| MSGTYPE: | CF_REPLY |
| MESSAGE: | REPLY_TIMER_DONE |
| wParam: | — |
| lParam: | — |
| TAG: | tag (corresponds to the value specified in Start Timer message) |
| Data: | — |

Dial Done

| | |
|---|---|
| Description: | This message is sent in response to the Dial Out command. This informs the sending process that the DTMF outpulsing has completed. It does not, however, indicate that the far end has answered. |

-continued

| | |
|---|---|
| Destination Process: | Call Handler |
| MSGTYPE: | CF_REPLY |
| MESSAGE: | REPLY_DIAL_DONE |
| wParam: | channel(LCN) |
| lParam: | — |
| Data: | — |

3.2.4. General Commands

Hangup Channel(s)

| | |
|---|---|
| Description: | Tells the Call Handler to generate Disconnects to the specified channels. This also causes the Database entries for each channel to be updated (i.e. channels taken out of conferences). |
| Destination Process: | Call Handler |
| MSGTYPE: | CF_GENCMD |
| MESSAGE: | CMD_HANGUP |
| wParam: | — |
| lParam: | — |
| Data: | CHANDATA channel list |

Toggle Music

| | |
|---|---|
| Description: | Tells the Call Handler to turn music on/off for a particular conference. This causes the Call Handler to generate PUT_INTO_CONF messages for each channel in the conference with the music flag set appropriately. |
| Destination Process: | Call Handler |
| MSGTYPE: | CF_GENCMD |
| MESSAGE: | CMD_TOGGLE_MUSIC |
| wParam: | Conference number |
| lParam: | — |
| Data: | — |

Transfer Channel

| | |
|---|---|
| Description: | Causes a channel to be transferred from one PBX line to another. The Call Handler initiates the transfer by hookflashing and dialing the supplied dtmf digits (the new extension). |
| Destination Process: | Call Handler |
| MSGTYPE: | CF_GENCMD |
| MESSAGE: | CMD_TRANSFER |
| wParam: | channel(LCN) |
| lParam: | — |
| Data: | DIGITDATA digit string |

Restore Previous Conference

| | |
|---|---|
| Description: | When the operator accesses a channel, that channel is placed into an operator conference. When that happens, the number of the conference that the channel was in is saved. This command places the channel back into that conference. |
| Destination Process: | Call Handler |
| MSGTYPE: | CF_GENCMD |
| MESSAGE: | CMD_REST_PREV_CONF |
| wParam: | channel(LCN) |
| lParam: | — |
| Data: | — |

3.2.5. High Level Commands

Blast Dial

| | |
|---|---|
| Description: | Initiates a Blast Dial sequence. Basically, the Call Handler finds a free outgoing line, places the operator into conference with it, and dials all the numbers in the specified list. |
| Destination Process: | Call Handler |
| MSGTYPE: | CF_HLCMD |
| MESSAGE: | CMD_BLAST_DIAL |
| wParam: | index into dialing lists |
| lParam: | — |
| Data: | — |

Hang Up Conference

| | |
|---|---|
| Description: | Hangs up all the channels in a conference, and takes them all out of the conference. |
| Destination Process: | Call Handler |
| MSGTYPE: | CF_HLCMD |
| MESSAGE: | CMD_HANGUP_CONF |
| wParam: | conference number |
| lParam: | — |
| Data: | — |

Purge Disconnects

| | |
|---|---|
| Description: | When a channel hangs up or is disconnected, it cannot be used |

|  |  |
|---|---|
|  | again until it is "cleared". This command clears all the disconnects for a specified conference. |
| Destination Process: | Call Handler |
| MSGTYPE: | CF_HLCMD |
| MESSAGE: | CMD_PURGE_DISC |
| wParam: | conference number (−1=all conferences) |
| lParam: | — |
| Data: | — |
| Operator Play Annunciator Message | |
| Description: | This sets up an annunciator conference with the specified operator, and initiates a Play Message sequence. The annunciator channel is allocated dynamically. |
| Destination Process: | Call Handler |
| MSGTYPE: | CF_HLCMD |
| MESSAGE: | CMD_OP_ANN_PLAY |
| wParam: | operator channel(LCN) |
| lParam: | annunciator message number |
| Data: | — |
| Operator Record Annunciator Message | |
| Description: | This sets up an annunciator conference with the specified operator, and initiates a Record Message sequence. The annunciator channel is allocated dynamically. |
| Destination Process: | Call Handler |
| MSGTYPE: | CF_HLCMD |
| MESSAGE: | CMD_OP_ANN_REC |
| wParam: | operator channel(LCN) |
| lParam: | annunciator message number |
| Data: | — |
| Operator Stop Annunciator Message | |
| Description: | This command stops the playback or recording of an annunciator message with the specified operator. |
| Destination Process: | Call Handler |
| MSGTYPE: | CF_HLCMD |
| MESSAGE: | CMD_OP_ANN_STOP |
| wParam: | operator channel(LCN) |
| lParam: | — |
| Data: | — |
| Set Nighttime Mode | |
| Description: | Enabling this mode tells the Call Handler to ignore all incoming line seizures. Disabling it tells the Call Handler to use the original configurations for each channel. |
| Destination Process: | Call Handler |
| MSGTYPE: | CF_HLCMD |
| MESSAGE: | CMD_SET_NIGHT_MODE |
| wParam: | Enable/Disable |
| lParam: | — |
| Data: | — |

3.2.6. Application Level Commands

|  |  |
|---|---|
| Place Conference Into Lecture Mode | |
| Description: | This command basically mutes all the channels in a conference except that of the moderator. This can be enabled or disabled. |
| Destination Process: | Call Handler |
| MSGTYPE: | CF_APPCMD |
| MESSAGE: | CMD_LECTURE_MODE |
| wParam: | conference number |
| lParam: | Enable/Disable |
| Data: | — |
| Place Conference Into Q & A Mode | |
| Description: | This command basically sets up one moderator, enables digit recognition, and places conferees into the Q&A queue upon receipt of digit(s). |
| Destination Process: | Call Handler |
| MSGTYPE: | CF_APPCMD |
| MESSAGE: | CMD_QA_MODE |
| wParam: | conference number |
| lParam: | Enable/Disable |
| Data: | — |
| Place Conference Into Polling Mode | |

| | |
|---|---|
| Description: | This command basically sets up a moderator, enables digit recognition, and collects digits into various queues. |
| Destination Process: | Call Handler |
| MSGTYPE: | CF_APPCMD |
| MESSAGE: | CMD_POLL_MODE |
| wParam: | conference number |
| lParam: | Enable/Disable |
| Data: | — |

4. Host/DSP Interface

The host software will communicate to the DSP card(s) via the DSP Command Processor, the DSP Event Processor, and the DSP Driver. Refer to the individual descriptions of these processes for more information about them.

Each DSP card contains a block of dual ported RAM; 4 k×16 for each DSP processor. There are 4 DSP processors on each card. Each DSP processor handles 6 user channels. Each DSP processor also handles TBD annunciator channels, and TBD other internal channels. Thus, each 4 k×16 RAM is partitioned into areas to handle each channel. Each user channel area contains a data structure that describes the current state of the channel. This data structure will be defined as part of the Host/DSP design.

When an asynchronous event occurs (i.e. digit reported by the DSP), the DSP processor that handled the event will generate an interrupt. This will cause the card containing that DSP processor to generate an interrupt to the host (i.e. UNIX). The DSP Driver will process the interrupt. It will figure out which channel the interrupt occurred on, and signal the Event Processor, passing the channel number to it. The Event Processor, having the channel number, will look at the channel data structure for that channel, and figure out what the event was (i.e. incoming digit). At that point, the Event Processor can do what it wants with the information (i.e. signal the Call Handler).

If the host software wants to initiate some action for a channel via the DSP, it does it via the DSP Command Processor. This process initiates action for that channel via the corresponding channel data structure in the shared 4 k×16 RAM for the DSP processor that handles that channel. The actual command processing and handshaking between the, DSP Command Processor and the DSP will be defined as part of the Host/DSP design.

The Annunciator also has direct access to the 4 k×16 RAM for dedicated annunciator channels. This is described further in the process description for the Annunciator. The actual mechanism of how the data is passed will be defined as part of the Annunciator process design.

5. Global Data Base

Global (system-wide) data structures will be accessible by all processes. For example, multiple Operator Console processes will access this data base for any information they need for their respective console displays. The issue of "data locking" would need to be addressed (multiple processes accessing the same data). Some of the data structures that need to be defined are:

per-channel configuration & real-time data global system configuration parameters per-conference data structures per-operator configuration data lists (names, phone numbers, conferences)

network management stats (gathered from T1 card)

partial CDR records raw report data (conference & channel stats)

6. Conference Assignments

A conference is a virtual grouping of MVIP channels. Any channel within a conference is "connected" to all other channels within the same conference. Channels may individually be set to talk, listen, or both. If a channel is set to talk, its mouthpiece is broadcast to all the other channels in the conference. If a channel is set to listen, its earpiece is connected to all other channels in the conference. Typically, a channel is always set to listen. However, it may be "muted", meaning that its mouthpiece is disconnected from the other channels.

The following conferences are predefined for various functions:

| Conf. | Assignment |
|---|---|
| 0 | Quiet(no talkers). Channels are placed into this conference by default, when they are not connected to any other channel. |
| 1–48 | User conferences. These are the 48 conferences that are managed by the operators. |
| 49–56 | Annunciator. Each annunciator channel has a conference reserved for it. Any channel(s) listening to an annunciator message will be placed into one of these conferences. |
| 57 | Enter Conference. All channels that have "entered" the system are placed into this conference. This happens after a user has listened to an annunciator message. A music (or radio) channel is placed into this conference (permanently) so that users who enter this conference have something to listen to while they're waiting for an operator. |
| 58 | Input Conference. Any channel that calls into the system when no annunciator channels are available is placed into this conference. A music channel is permanently placed into this conference. The channel stays in this conference until an annunciator channel is available. Then it is placed into that annunciator's conference. |
| 59–66 | Operator Conference. Each operator (up to 8) is assigned one of these conferences. When an operator accesses a channel, it is placed into its |

| Conf. | Assignment |
|---|---|
| | corresponding operator conference with that channel. |

7. Error Handling

In this initial implementation of the DCB-60, our strategy is to detect errors whenever they occur. The process that detects the error will log an error message to the system error log file. In this release, we will not try to take corrective action. There are 3 levels of errors that we are concerned with:

"Normal" Hardware Errors: These are errors that we expect to happen every now and then, such as T1 alarms. The Call Handler can detect these conditions and take appropriate action, such as faulting out the affected T1 lines.

"Unexpected" Hardware errors: These are more serious hardware failures such as an interface card that fails to respond properly, or a DSP processor crashing. Our current strategy is to periodically "poll" our hardware interfaces. If we detect a failure, we will log the error, and take the affected lines out of service. We will not attempt to restart or reinitialize any faulty hardware component.

Software errors: In the unlikely event of a software error, the detecting process will log the error (if possible). These types of errors include: A process receiving an unexpected message type; A software condition that should not be met, etc. Another type of software error is when a process fails to respond to a poll from the Diagnostic process. In this case, the Diagnostic process would log an error message.

8. Process Descriptions

Each process is listed as follows:

| | |
|---|---|
| D | Data flow |
| C | Control flow |
| O | Output from process |
| I | Input to process |

8.1. Initialization Process

To begin with, we need to at least initialize & download code to the DSP and T1 cards. We need to set up the control RAM on the DSP (at least with some default configuration). This should have been done in the DSP Loader. Later, we can add more functionality to Init, such as starting up individual processes, initializing the global data areas, reading con fig data from disk, and eventually, some warm restart capability. This process will have to pay close attention to any special requirements of Embedded VENIX.

This process could consist of 2 processes. The 1st would be the UNIX initialization process. This process is run once at system start up (boot). It performs all UNIX initialization. It then loads the 2nd init process. This would be the application init. This would load and start up the appropriate application processes. It would determine if this was a cold or warm restart. Based on this, it would initialize all processes and data structures accordingly. For a cold restart, it would initialize and load all configured hardware (T1 card, DSP card(s), analog card(s), etc.). For a warm restart, it would have to "regenerate" some data structures from these cards (i.e. DSP cards' channel arrays and conference list).

| Data/Control Flow | Type | Description |
|---|---|---|
| Analog Config Info | D,O | Data used to configure the analog interface cards |
| Init Analog Card | C,O | Commands sent to analog interface cards to initialize them. |
| DSP Config Info | D,O | Data used to configure DSP card(s). This would include the code downloaded to the cards to run the DSP processors. Also, the dual port control RAM data that maps the MVIP channels to their TDM time slots. |
| DSP Config Info | D,I | Data read from the dual port 4 k × 16 RAM buffers on the DSP cards in the case of a warm restart. |
| Init DSP Board | C,O | Commands sent to DSP cards to initialize and start them. |
| T1 Config Info | D,O | Data used to configure T1 interface cards. |
| Init T1 Card | C,O | Commands sent to T1 interface cards to initialize and start them. |
| Config Info | D,I | System configuration data read from disk. This data is used to configure all hardware interface cards, and the system's Data Base. |
| Start Process | C,O | This is the UNIX control mechanism that is used to start up the individual processes. |

8.2. DSP Driver

Assuming that a driver must be written to handle the interaction between the DSP and the host, this work would be done here. A probable design scenario would be as follows: The DSP would interrupt on some real-time condition (i.e. active talker). The driver would handle the interrupt, passing data and signaling the Event. Processor of this condition. The Event Processor would then notify the appropriate process(es) accordingly. This minimizes the amount of time spent in the driver, allowing the user-mode processes to do most of the work.

The driver would have access to the shared RAM on the DSP card(s). This way, it could pass the channel number of the interrupting channel to the Event Processor. This would be sufficient for most event handling. Once the channel number is passed, the Event Processor could get any other information it needs from the channel data structures on the DSP card itself.

| Data/Control Flow | Type | Description |
|---|---|---|
| Channel Event | C,I | This is the interrupt that occurs when an individual DSP processor wishes to report an asynchronous event. Examples of this are digit(s) in, talk indication. |
| Channel Info | D,O | Information about the channel for which the event occurs (typically the channel number). |

8.3. DSP Command Processor

This process receives commands from various processes to initiate actions for a particular DgP channel. It sends the proper command to the appropriate DSP. It should not send a command for a particular channel unless that channel is ready to process it (i.e. the DSP may not be finished processing the previous command for the channel). Thus, this process could "buffer" multiple commands for a particular channel while performing an "ack/nak" procedure with the DSP for each command.

This process would "sleep" until it is woken up by receipt of a message.

We may want to build into this process a "statistics" area that keeps counts & other info about the commands that are sent to the DSP. This could be useful for later debugging, or general information gathering (i.e. system performance, loading, etc.).

This process should be able to run in a "simulation" mode. In this mode, it would send commands to the Application Test process instead of the DSP card. It would get its channel status information from this process rather than the channel data structures in shared RAM on the DSP card.

| Data/Control Flow | Type | Description |
| --- | --- | --- |
| Channel Commands | C,I | These are the commands that are intended to initiate some action for a channel via the DSP. For example, place a channel into a conference, dial digits, adjust gain, etc. |
| Channel Info | D,I,O | This is the data portion of a channel command. This may include the channel number, digits to be dialed, etc. |
| Send Channel Command | C,O | This is the mechanism used to communicate a channel command to the DSP. Refer to the Host/DSP interface for more details. |

8.4. DSP Event Processor

This process handles events reported "up" from the DSP card(s). Typically, when an external event occurs asynchronously (i.e. active talker, dtmf digit detected), the affected DSP card will interrupt. The driver will field this interrupt, and notify the DSP Event Processor. The Event Processor will then obtain the appropriate information from the channel data structure in shared RAM on the DSP card. It will then take the appropriate action (i.e. send a message to the Call Handler Process, or modify a data structure in the Global Data Base, then signal the Operator Console Processes, etc.).

This process would "sleep" until it is woken up by receipt of a message, or a signal.

We may want to build into this process a "statistics" area that keeps counts & other info about the events that were detected from the DSP. This could be useful for later debugging, or general information gathering (i.e. system performance, loading, etc.).

This process should be able to run in a "simulation" mode. In this mode, it would respond to messages & signals from the Application Test process instead of interrupts from the DSP card. It would get its channel status information from these messages rather than the channel data structures in shared RAM on the DSP card.

| Data/Control Flow | Type | Description |
| --- | --- | --- |
| Channel Event (in) | C,I | This is the message (or signal) that tells the Event Processor that an event has occurred on the DSP that needs attention. |
| Channel Event (out) | C,O | This is the message that is sent to the Call Handler to inform it that an asynchronous event has occurred (i.e. digit in). |
| Channel Info | D,I,O | This is the data that is included in a channel event message. Input from the DSP Driver, it may only contain the channel number. Output to the Call Handler, it may contain digit(s), etc. |
| Talk Indication | C,O | This message is sent to all active Operator Console processes when reported by the DSP Driver. |

8.5. T1 Handler

The 1st phase of development of the T1 handler is detection of far-end answer, incoming line seizure, or far end disconnect. It would also have to invoke outgoing line seizure, disconnect, and answer. This part of the process would periodically gather the A/B bits from the T1card's registers. It would determine if answer, line seizure, or disconnect has occurred for any channel. If so, it would send a message to the Call Handler process. To invoke action for a channel, the appropriate A/B bit combination for that channel would be written to the card.

The second part of the T1 Handler process collects data from the T1 card and stores it in the Data Base. The data is comprised of T1 statistical data, stored in the card's registers. The data collected would be available to the Reports process. The actual mechanics of how this data is gathered will depend on what the Mitel card can offer us.

We may want to build into this process a "statistics" area that keeps counts & other info about the data collected from the T1 card. This could be useful for later debugging, or general information gathering (i.e. system performance, loading, etc.).

| Data/Control Flow | Type | Description |
| --- | --- | --- |
| Incoming Line Seizure | C,O | Sent to the Call Handler when incoming line seizure has been detected for a channel on a T1 card (i.e. someone dialed in). Typically, the channel number is passed as data. |
| Outgoing Line Seizure | C,I | The Call Handler sends this message to the T1 Handler when it wants to "seize out" on a line, in preparation to dial out. It can also use this to "fault" a line. |
| Far End Disconnect | C,O | Sent to the Call Handler when disconnect has been detected for a channel on a T1 card (i.e. someone went onhook - hung up). |
| Disconnect | C,I | The Call Handler sends this message when it wants to go onhook (i.e. hang up) for a particular T1 channel. |
| Answer Detected | C,O | Sent to the Call Handler when an offhook (i.e. answer) is detected for a channel on a T1 card. |
| Answer | C,I | The Call Handler sends this message when it wants to answer (i.e. go offhook) a particular channel. Typically, this is in response to an incoming |

| Data/Control Flow | Type | Description |
|---|---|---|
| | | line seizure. |
| T1 Alarm | C,O | This message is sent to the Call Handler whenever an alarm condition (red, yellow) is detected on a T1 span. |
| T1 Stats | D,I,O | This consists of any statistical data that is kept by the T1 card. This would consist of periodically polled registers on the card. This data is formatted (TBD) and kept in the global Data Base. |
| Obtain T1 Stats | C,O | This is the mechanism that this process uses to obtain T1 statistical data from the T1 card(s). |
| Update Net. Mgmt. | C,I | This message tells the T1 Handler to reset any counters etc. on the T1 card(s), and also, if nec. in the global Data Base. |
| A/B Bits | D,I | The T1 Handler will periodically read the A/B bits from the T1 card's registers. From this, it can determine incoming line seizure, far end disconnect, or far end answer. It can also write the A/B bits to invoke outgoing line seizure, disconnect, or answer. |
| Hookflash | C,I | This message tells the T1 Handler to invoke a hookflash for the indicated channel. |
| Fault | C,I | This message tells the T1 Handler to "fault out" the indicated channel. |

8.6. Annunciator Process

This process handles the recording and playing back of digitized voice messages. Special channels on the MVIP bus will be dedicated for Annunciator use. It keeps track of which annunciator channels are in use, and which ones are available. Upon initialization, this process will just load the messages from disk into a set of buffers (one for each message). When a message is to be played, it will just read it from RAM and send it to the DSP that is responsible for that particular annunciator channel. This eliminates real-time disk latency problems upon playback. We will probably change this in the future if we wish to add more messages for voice-response applications. The recording of messages will send the data to RAM and disk.

The actual mechanisms used to record & play digitized voice messages will be determined in the design of the Host/DSP Interface, and the Annunciator process. However, the general theory of operation is as follows:

Play A Message: This process receives a Play Message message for a selected annunciator channel. This process then populates a specified buffer on the 4 k×16 dual port RAM with a digitized voice message (from disk or host RAM), and signals the DSP that the data is there. The DSP then "plays" the data on the selected annunciator channel, and signals when the buffer has become available. Any channels in conference with that annunciator channel will hear the message. We will probably use a double-buffering scheme, so that the host can be filling one buffer while the DSP is playing the other buffer. The actual handshaking mechanism will be determined as part of the Host/DSP interface. When the Annunciator process has finished sending the digitized voice message, it sends a message to the Call Handler, indicating that the annunciator channel is available.

Record A Message: This process receives a Record Message message for a selected annunciator channel. This process then reads a specified buffer on the 4 k×16 dual port RAM, and stores it in host RAM and disk. It does this until the specified duration has expired or receipt of a Stop Record message. Again, a double buffering scheme would be used. The record procedure has a maximum duration of TBD seconds, for safety.

This process has the capability to inform the Call Handler process of the availability of annunciator channels. The Call Handler is signaled when 1) no channels are available, and 2) a channel has become available. This process will also stop playing a message when signaled to do so. Note that this will cause a "channel available" message to occur.

This process will have the capability of playing a message in "continuous play" mode. That is, it will play the same message over and over until it receives a message to stop.

| Data/Control Flow | Type | Description |
|---|---|---|
| Digitized Voice (disk) | D,I,O | The input data is read from disk upon initialization, and stored in a local RAM buffer. It contains the digitized voice messages for each annunciator channel. The output data is stored to disk when annunciator messages are recorded. |
| Digitized Voice (DSP) | D,I,O | The input data is read from the appropriate DSP dual port RAM buffer while an annunciator message is being recorded. The output data represents the digitized voice data sent to the DSP dual port RAM buffer while an annunciator message is being played. |
| Start/Stop Record | C,I | This message tells the Annunciator process to either start or stop the recording procedure for a designated annunciator channel. |
| Start/Stop Play | C,I | This message tells the Annunciator process to either start or stop the play procedure for a designated annunciator channel. This message may tell the Annunciator to play a message repeatedly until told to stop. |
| Channel Available | C,O | The Annunciator process sends this message to the Call Handler whenever an annunciator channel has finished playing a digitized message. It tells which channel has become available. |

8.7. Call Handler

This process handles all calling scenarios for each channel. It keeps track of which state each channel is in, and takes the appropriate action depending on the input received concerning that channel, the state it is in, and its configuration at that time. Input can be received from an operator console action (i.e. dial a number, move a line from conf. x to conf. y), by the DSP Evem Processor (i.e. receive digits, etc.), by the T1 Handler (offhook, line seizure, disconnect), or by the Annunciator (annunciator channels available—yes/no). Some real-time events (such as talk indication) can be reported by the DSP Event Processor directly to the Operator Console processes, without needing to bother this process.

This process operates on each configured channel according to a state diagram (TBD). When it receives input from another process pertaining to this channel, it will perform whatever action is called for, according to the type of message received, and the current state of the channel.

All channel information is updated in the central Data Base. The Operator Console processes are notified of any changes that require an update to the console display.

The state diagrams can be designed as "templates", so that they may be more easily modified to handle various calling scenarios in the future (i.e. unattended operation). Initially, these templates may just consist of some code and their associated data structures (i.e. "objects"?). These would be maintained in house "by hand". In the future, we may want to develop a utility that configures these templates, so that call handling scenarios can be developed by 3rd party vendors (or the customers themselves?).

This process would "sleep" until it is woken up by receipt of a message.

| Data/Control Flow | Type | Description |
|---|---|---|
| Channel Event | C,I | This tells the Call Handler that an event has occurred for a particular channel. It contains the necessary information for that channel about the event. For example, a Digit In message would contain the channel number and the digit(s). |
| Channel Command | C,O | This message is sent to the Command Processor to initiate action for a particular channel. It contains the necessary information for that channel for the DSP to initiate the action. |
| Channel Available | C,I | Says that an annunciator channel has become available. |
| Star/Stop Play | C,O | Tells the Annunciator to start or stop playing a digitized voice message. |
| Channel Info | D,I,O | This represents any information about a channel that resides in the Global Data Base. |
| Console Update | C,O | Tells the Operator Console processes that some information about a particular channel has changed (in the Global Data Base). |
| CDR Update | C,O | Tells the CDR process that a call on a particular channel has been completed. Passes all info for that call to the CDR process. |
| T1 Alarm | C,I | Alarm message from the T1 Handler. Call Handler may have to "fault" out a T1 span by seizing out on all 24 channels. Minor alarms may just have to be tracked. |
| Seize,Disconnect, Answer,Hookflash, | | Described in T1 Handler process description. |
| Fault | | |

8.8. Login Process

A copy of this process is attached to each TTY port. Up to 8 TTY ports are used as functioning operator consoles. The others are used for maintenance, and admin functions. This process allows someone to log into the system as an operator, system administrator, or maintenance person. Depending on how one logs in, the corresponding process will be spawned from the Login process. For example, if the operator login is given, the Operator console process will be spawned from the Login process that is attached to that TTY port. Each TTY port capable of running the Operator Console process will be assigned to a specific analog port for its headset (voice path).

| Data/Control Flow | Type | Description |
|---|---|---|
| Maint. Login | C,O | Spawn Maintenance process. Only one Maint process allowed to run at any given time. |
| Operator Login | C,O | Spawn Operator Console process. This process may be run on each TTY port. |
| Admin Login | C,O | Spawn Admin process. Only one Admin process allowed to run at any given time. |

8.9. Operator Console Process

This process maintains the operator console screen, and handles all interaction with the operator. It responds to keystrokes from the operator, and sends messages to other processes, informing them of action initiated by the operator (i.e. place a line into a conference). It maintains the "state" of the console, depending on which keystrokes have been hit (i.e. how many lines are displayed, which status display is active, which menu are we in). It also updates the console according to messages it receives from other processes (i.e. show active talker).

Multiple copies of this process may be running to support multiple operator consoles. Each Console process knows which data it must display (i.e. which channels, conferences, etc.). This data is made available by the "Data Base". Each Console process accesses the Data Base for whatever information it needs to store or retrieve.

The physical console itself would be any ASCII terminal that supports the necessary screen features (i.e. 43 line mode). Refer to the Product Specification for more details. We could use CURSES to provide a nice color operator console interface for the console if it were running an EGA/VGA monitor.

| Data/Control Flow | Type | Description |
|---|---|---|
| Start/Stop Record | C,O | Starts/Stops the recording of a digitized voice message on a particular annunciator channel. |
| Channel Command | C,O | Initiates action for a particular channel on the DSP. Sent to either the Call Handler, or directly to the Command Processor. |
| Talk Indication | C,I | Indicates active talker currently on designated channel. Operator Console process must flash '*' next to channel |

| Data/Control Flow | Type | Description |
|---|---|---|
| Console Update | C,I | if displayed. Information for designated channel has been updated. Console display must be updated to reflect new info. The channel info resides in the Global Data Base. |
| Channel Info | D,I,O | This represents any information about a channel that resides in the Global Data Base. |
| Hookflash | C,O | Tells T1 Handler to initiate hookflash for indicated channel. |
| Fault | C,O | Tells T1 Handler to fault out indicated channel. |

8.10. Maintenance Console Process

This process allows various reports to be run. It also allows initializing of network management data. It allows the user to perform various system maintenance functions such as the formatting of diskettes, running diagnostics, etc. It does this by "wrapping a shell" around various UNIX utilities, if necessary, to shield the user from UNIX. It also allows the operator console function to be run in a "display only" mode. In this mode, no voice path is provided, and no access to lines or conferences is allowed. Line and conference activity can only be monitored in this mode.

| Data/Control Flow | Type | Description |
|---|---|---|
| Initiate Report(s) | C,O | Message sent to the Reports process. This initiates any reports to be printed (TBD). |
| Update Net. Mgmt. | C,O | Tells the T1 Handler to initialize any T1 network stats it happens to be keeping track of. |

8.11. Administrator Console Process

This process allows various system configuration parameters to be set (per line, per conference, per operator, etc.). It also allows other system configuration such as the adding/deleting of user accounts and passwords. Disk backups may be performed here. It may do this the same way as in the Maintenance process (hiding UNIX from the user).

| Data/Control Flow | Type | Description |
|---|---|---|
| Config Data | D,I,O | Represents System configuration data read or written to/from disk or the global Data Base. |

8.12. Reports Process

This process generates all the required reports. It accesses data resident on disk, formulates reports, and prints them. The data that it uses was collected by other processes. This process may clear or initialize certain data after running a report (i.e. network management statistics). It may be beneficial to support various types of printers. This process could use UNIX to keep the actual printer type "transparent" (similar to the way different terminal types could be used for operator consoles).

| Data/Control Flow | Type | Description |
|---|---|---|
| Raw Report Data | D,I | This represents any data stored in the global Data Base that must be formatted into reports. This data can be collected by any process. |
| Initiate Report(s) | C,I | Message sent to the Reports process. This initiates any reports to be printed (TBD). |

8.13. Status/Error Logging

This process collects messages from other running processes. It formulates these messages into status or error logs. It writes these logs to disk file(s). Certain messages may need to be reported to the operator console(s). This could be done by sending a message to the desired operator console process queue. Other messages may need to go to the printer.

Error logs can be generated by any process. A process may run into an error condition during the various phases of its operation. There are at least 2 categories of error conditions: (1) Internal software errors. These can be attributed to faulty data, conditions which shouldn't exist, and so forth. (2) System errors. These can be hardware faults, etc. Some errors may only need to be reported & logged, while others may require a system restart.

| Data/Control Flow | Type | Description. |
|---|---|---|
| Update Log | C,I | This message tells this process to update either the Status Log, or the Error Log. |
| Log Info | D,I,O | This is the log data that is part of the above message. It is formatted, and written to the disk log file(s). |

8.14. CDR Process

This process collects CDR records from the Call Handler. These records are generated when a call is completed, and contain all the information needed to log the call (i.e. start/end time, channel #, dialed digits if outgoing). This process merely formats the record and writes it to a disk file. This process thus acts as a "buffer" for the Call Handler, eliminating the need for the Call Handler to access the disk.

| Data/Control Flow | Type | Description |
|---|---|---|
| CDR Update | C,I | This message tells the CDR process that a call has completed for a particular channel. It contains all the information needed to log the call. |
| CDR Record | D,O | This represents the formatted CDR records that are written to disk. |

8.15. Diagnostics Process

This process periodically sends a message to each host process, just looking for an acknowledgment. If it gets an ACK, then it knows that the host process is running, or at least able to receive and respond to messages. If it doesn't receive an ACK, it will log an error message. In the future, it could kill & restart that process (individual process initialization becomes an issue here). Another (more undefined) thing it could do is to periodically execute some real-time diagnostics on the various configured pieces of hardware that are installed.

It could execute the set of power-up diagnostics when the system is started from a cold boot. It could also execute some set of tests that could be run from the Maintenance menu. These all have to be defined in more detail before we can get into specifics.

| Data/Control Flow | Type | Description |
| --- | --- | --- |
| Poll Process | C,O | This message polls the destination process to see if it is running and able to respond. |
| ACK | C,I | This represents the ACK that would be received as a correct response to a Poll message. |

8.16. Timer Services

This process manages all of our system timers (maximum number TBD). When a process wants to know when a specific time duration has elapsed, it sends a Start Timer message to this process. A tag value identifies the timer, and is defined by the sending process. A duration value is also set (increments of 100 ms). This process allocates a timer, and decrements the timer every 100 ms. When the timer has reached zero, it sends a timer event message, containing the tag value, to the sending process. If it receives a Stop Timer message from the process, it will stop the timer that contains the matching tag value. No timer event message is sent in this case.

This process combines the tag value with the sending process's ID to identify the timer. This eliminates any problems with multiple processes using the same tag values.

| Data/Control Flow | Type | Description |
| --- | --- | --- |
| Start Timer | C,I | Starts a timer operation for the sending process. |
| Stop Timer | C,I | Stops a timer operation for the sending process |
| Timer Event | C,O | Sent to the sending process when the timer's duration has expired. |

APPENDIX F

1. Introduction

The principal areas for which the Digital Signal Processor (DSP) board and the host computer need to communicate are:

DSP initialization, command and information exchange, and notification of events (digits in, talk indication, etc.) acquired by the DSP.

The DSP-Host interface design:

specifies the commands and data structures that need to be exchanged, assigns the Dual Port Memory (DPM) locations used for these purposes, and relates the sequence of steps needed to initialize and to communicate with the DSP.

The global header files, dsp_cnfg. h, dsp_host.h and dsp_regs.h, contain manifest constants and macros defining the data structures, member values, DSP registers, register contents, and operations on the registers.

2. System Data

Most configuration information is maintained in the DPM. Per channel, per conference, and per DSP node information are supported. As used in this document, a node refers to that part of the system supported by a single DSP.

2.1. DPM Data Structures

Each DSP Node contains the following data structures:

A. Two Data Transfer Buffers (0 and 1 ) used for the transfer of voice data during record and playback operations each of size 2 KBytes located at DPM Addr. Seg.:0 and DPM Addr. Seg.:800, respectively. One semaphore each is used to control access to these buffers (see later section on semaphores).

B. An array of eight Channel Data Structures located at (DPM Addr Seg.:0×1000). Six of these structures are used for T1 channels, one is used by an annunciator or operator channel, and one is reserved for future use. Each structure member is two bytes (1 word) in size except as noted below. The structure is comprised as follows:

| | |
| --- | --- |
| DPM Port (0–191) | (initialized to the assigned port) |
| Command {see command section} | (initialized to 0) |
| Error (TBD) | (initialized to 0) |
| Event {see command section} | (initialized to 0) |
| Mute (0–1) | (initialized to 0) |
| Gain (0–1) | (initialized to 0) |
| Music (0–1) | (initialized to 0) |
| Time Slot Type {see type section} | (initialized to 0) |
| Digits-in - ASCIIZ string 50 bytes max. | (initialized to null string) |
| Digits-out - ASCIIZ string 50 bytes max. | (initialized to null string) |

C. Channel Conference List following the Channel Data Structure Array.

192 (6 boards×4 DPM's/board×8 channels/DPM) entries sorted by channel (one word each containing the conference number)

D. MVIP Time Slot List following the Channel-Conference List.

192 (6 boards×4 DPM's/board×8 channels/DPM) entries sorted by channel (one word each containing the channel MVIP time slot)

E. Conference Number of Talkers List following the Channel MVIP Time Slot List.

67 (48 user+8 operator+8 annunciator+1 enter+1 input+1 null line conferences) entries sorted by conference (one word each containing the maximum number of talkers allowed)

F. Node Information located following the Conf. Number of Talkers List.

Node Number (0–15) (initialized to assigned node)

Active node mask—one word (16 bits) with one bit per node (1=active; 0=inactive)

G. System Parameter List Buffer located following the Node Information.

50 words will be reserved for the System Parameters including those currently defined (see later section on System Parameters) and possible future items.

2.2. Command Values

The DSP commands recognized in the Channel Data Structure are:

| | |
| --- | --- |
| No command | (Command value = 0x0000) |
| Start playing a message | (Command value = 0x0001) |

85
-continued

| | |
|---|---|
| Stop playing a message | (Command value = 0x0002) |
| Start recording a message | (Command value = 0x0003) |
| Stop recording a message | (Command value = 0x0004) |
| Dial a telephone number | (Command value = 0x0005) |
| Acknowledge | (Command value = 0x0006) |
| Generate DTMF acknowledge tone | (Command value = 0x0007) |
| Generate conference entry tone | (Command value = 0x0008) |
| Generate conference exit tone | (Command value = 0x0009) |
| Generate Security-in tone | (Command value = 0x000A) |
| Generate Security-out tone | (Command value = 0x000B) |

2.3. Event Indicators

The set of event indicators recognized in the Channel Data Structure is:

| | |
|---|---|
| No change | (value = 0x0000) |
| Talk indication | (value = 0x0001) |
| DTMF digits in | (value = 0x0002) |
| Data buffer 0 ready | (value = 0x0003) |
| Data buffer 1 ready | (value = 0x0004) |
| Dial done | (value = 0x0005) |
| Play-tone done | (value = 0x0006) |

2.4 Time Slot Types

The set of time slot indicators supported in the Channel Data Structure is:

| | |
|---|---|
| Unused | (value = 0x0000) |
| Conferee | (value = 0x0001) |
| Local Operator | (value = 0x0002) |
| Remote Operator | (value = 0x0003) |
| Annunciator | (value = 0x0004) |
| Tape Record | (value = 0x0005) |
| Tape Playback | (value = 0x0006) |
| Link Line | (value = 0x0007) |
| Music | (value = 0x0008) |

2.5. System Parameters

Each system parameter is stored in one word (2 bytes) with units as indicated below. The System Parameter List in order of contents is:

| | |
|---|---|
| DTMF On Time | (default = 100 ms.) |
| DTMF Off Time | (default = 50 ms.) |
| Dial Tone Wait | (default = 5 sec.) |
| DTMF Level | (default = −7 dBm) |
| Forward Twist - Receive direction | (10 dB) |
| Reverse Twist | (10 dB) |
| Talk Detect Level | (−35 dBm) |
| Max. Talkers/conf. | (default = 8 talkers/conf.) |
| Max. Gain | (10 dB) |
| Speech Level Out | (−16 dBm) |
| Channels Per DSP Node | (default = 6 channels/node) |

2.6. Semaphores

86

Eight semaphores are supplied for use with each node. The content of a semaphore is 0x0001 when not in use. The semaphores are acquired when either side successfully writes and then reads a value of 0x0000 from the location specified below. The side that acquires the semaphore must return it when finished using the resource by writing 0x0001 to the same location. The current assignment of semaphores is as follows:

| | |
|---|---|
| Control access to Data Transfer Buffer 0 | (0x2000 + I/O Addr. + 0) |
| Control access to Data Transfer Buffer 1 | (0x2000 + I/O Addr. + 1) |
| Unassigned | (0x2000 + I/O Addr. + {2–7}) |

2.7. Interrupts—DSP to Host Event Notifications

When a DSP detects one of the previously specified events, the occurrence will be indicated by writing the event number in the corresponding Channel Data Structure. Subsequently, the DSP will generate an interrupt by writing 0x00FF to DPM internal address 0xFCOFFF, which corresponds to the host's mailbox located at byte offset 0x1FFE in the DPM. The host clears the interrupt by reading its mailbox.

2.8. Interrupts—Host to DSP Mode Control

Several interrupt commands have been defined to control the operating mode for a DSP node. They currently provide a means of controlling the installation of the load module, initialization, and DSP start synchronization.

| | |
|---|---|
| No command | (value = 0x0000) |
| Enter Node Command Mode (future use) | (value = 0x0001) |
| Invoke Boot Loader Mode | (value = 0x0002) |
| Synchronize and Enter Channel Command Mode | (value = 0x0003) |

The first value is not actually issued by the host; rather it is the mailbox value after the DSP reads the mailbox. The second value is reserved for future use. A later section on downloading DSP code describes how the last two commands are used.

3. DSP Initialization

The initialization operations required for each DSP board are described in the following sections. Up to four I/O Addresses are configured by unique jumper settings on each board and acquired during installation from the set: {0x220, 0x240, 0x250, 0x260, 0x2A0, 0x2B0, 0x300}. The Base Memory Address Segments for the boards are assigned contiguously in virtual memory.

3.1. Reset each DSP Board

| | |
|---|---|
| A. Write Base Addr. Reg. (BAR) | (I/O Addr + 2) <= Mem. Addr. Seg.>>8 |
| B. Write Virtual Mode Register (VMR) | (I/O Addr + 4) <= 0x00 |
| C. Write PC Control Reg. (PCR) | (I/O Addr + 0) <= 0x10 |
| D. Reset Receive Control Reg. | (3000 + I/O Addr.) <= 0x00 |
| E. Reset Transmit Control Reg. | (3400 + I/O Addr) <= 0x00 |
| F. Write Clear RCV Line Status Reg. | (3000 + I/O Addr+2) <= 0x00 |

3.2. Clear Interrupts and Semaphores for Nodes A, B, C, & D

| | |
|---|---|
| A. Read Mailbox for each node {0x0000, 0x2000, 0x4000, 0x6000}) | (Mem. Addr Seg.:0x1FFE + |
| B. Clear 8 Semaphores per node 0x2A00} + I/O Addr + {0-7}) <= 0x01 | ({0x2000, 0x2400, 0x2800, |

3.3. Write Reference Memory

| | |
|---|---|
| A. Read PCR | (I/O Addr. + 0) |
| B. Write PCR | (I/O Addr. + 0) <= PCR\|0x10 |
| C. Write BAR | (I/O Addr + 2) <= 0xD1 |
| D. Transfer 32 bytes to MVIP DPM | (Mem. Addr. Seg + {0–63}) <= file(contentsTBD) |
| E. Write BAR | (I/O Addr + 2) <= 0xD0 |

3.4. Download DSP Code on all Nodes

Avoiding the interrupt mailbox addresses, the host uses the rest of the DPM to download to the DSP its code/data from the COFF file, dsp_code. out, generated by a DSP cross-compiler on DOS. Source code for a COFF loader was obtained from the Texas Instruments bulletin board; this loader is used to translate the DSP code file to the download module. The loader includes a host supplied software module to write the loader output to the DPM. The following procedure is used to download the first block to the DSP:

| | |
|---|---|
| A. Read PCR | (I/O Addr. + 0) |
| B. Write PCR | (I/O Addr. + 0) <= (PCR&~current node bit)\|0x10 |
| C. Write boot code | (Mem. Addr. Seg.:{0-0x0FFF}) <= COFF loader output |
| D. Write PCR | (I/O Addr. + 0) <= PCR\|current node bit |

The built-in DSP Boot Loader takes over from there, moves the block to the destination address(es) and starts the DSP at the first destination named in the download. The host will write the same block to all nodes before returning to the COFF loader to download another block of the DSP load module. To avoid writing boot code for the DSP, the first block includes code in which the DSP waits for the host to download another block from the COFF loader and to interrupt the DSP by writing the Invoke Boot Loader interrupt command to its mailbox before proceeding. The DSP will, in turn, vector to the start of the DSP Boot Loader. The host will repeat the above procedure for each block of the DSP load module. The host includes enough of the first block with each download to cause the built-in DSP Boot Loader to start the DSP at the original entry point after each pass.

3.5. Initialize DPM Data Structures

For all nodes, the host initializes the Channel Data Structures, the Channel-Conference List, the Node Information, and transfers the System Parameter List to the DSP.

| | |
|---|---|
| A. Read PCR | (I/O Addr. + 0) |
| B. Write PCR | (I/O Addr. + 0) <= PCR\|0x10 |
| C. Write data structures | (Mem. Addr. Seg.:{0-x}) <= data |

3.6. Enable MVIP Registers

| | |
|---|---|
| A. Read PCR | (I/O Addr. + 0) |
| B. Write MVIP Receive Register | (I/O Addr. + 0x3000) <= 0x01 |
| C. Write MVIP Transmit Register | (I/O Addr. + 0x3400) <= 0x85 |
| D. Write PCR | (I/O Addr. + 0) <= PCR\|D0 |

3.7. Mark all active nodes and Start Full DSP Operation on all Nodes

The host updates the Active Node Mask in the Node Information structure on all active nodes. The host then interrupts the DSP one final time by writing the Synchronize interrupt command to the DSP's mailbox. After that, the DSP's begin full operation.

4. Command and Information Exchange

The major operations required are:

Send channel information and commands to the DSP.

Send node configuration information to the DSP.

Acquire channel events from the DSP.

Detect DSP failures.

4.1. Channel Commands

For the commands identified in the earlier section on commands, the host checks for a clear command member in the Channel Data Structure which indicates that the DSP has completed any previous command for that channel. If the DSP encounters an error before completing a command, it returns an error code in the error member of the Channel Data Structure and then sets the command member to 0×FFFF instead of clearing it. When the host encounters an error return from the DSP, the host's Command-Processor sends an appropriate message to the Log process.

For the Dial command, the telephone number is first placed in the Channel Data Structure of the target channel. For the Dial and the Play-Tone commands, the command value is set in the command member of the Channel Data structure. When these commands are completed, the DSP interrupts the host with the appropriate event indication as described later in the acquire events section.

For Playback and Record commands, control of the Data Transfer Buffers is detailed in the next section. The command value is then set in the command member of the Channel Data Structure. The DSP clears this member when the command has been started.

To change the conference for a channel or to mute a channel, the host notifies the DSP as described later in the update talker-conference section.

4.2. Record and Playback Voice

The Data Transfer Buffers are used alternately beginning with Buffer #0 to record or playback voice data. These operations are required, respectively, by an Operator or an Annunciator channel. Access to each buffer is controlled by a designated semaphore.

For recording, the host first issues the start record command. The DSP then acquires the Buffer #0 semaphore, fills the corresponding buffer, releases the semaphore, sets the Data Buffer 0 Ready event, interrupts the host, acquires the Buffer #1 semaphore, fills its buffer, releases that semaphore, sets the Data Buffer 1 Ready event, interrupts the host, and continues at the beginning. At the same time, the host waits for an interrupt, acquires the first semaphore, transfers data from the first buffer, releases the first semaphore, waits for another interrupt, acquires the second semaphore, transfers data from the second buffer, releases the second semaphore, and continues at the beginning. The host must issue the stop record command to terminate this action.

For playback, the host acquires the Buffer #0 semaphore, fills the corresponding buffer with voice data, releases the semaphore, issues the start playback command, waits for an interrupt, acquires the second semaphore, fills its buffer, etc. The host issues the stop playback command to end the playback action. The DSP follows with actions analogous to the record scenario. Unless the playback is aborted, the host will terminate the playback by filling an extra buffer with zero level data (0×7F) and wait until the DSP acquires the semaphore for that buffer before issuing the stop playback command.

4.3. Change Node Configuration

When it is necessary to update the Channel-Conference List, Channel MVIP Time Slot List, Conference Number of Talkers List, Node Information, or System Parameters List, data structures that concern an entire node, the host will update the appropriate data structure. The host will make a single change in the lists at any one time. To minimize differences in information among nodes, the change is made as quickly as possible to all nodes in a round-robin fashion. No additional indication of the change will be made to the DSP's.

4.4. Acquire Events

When a DSP detects one of the previously specified events, the occurrence will be indicated by writing the event number to the Channel Data Structure. Subsequently, the DSP will generate an interrupt by writing 0×FF to DPM internal address 0×FCOFFF, which corresponds to the host's mailbox located at byte offset 0×1 FFE in the DPM.

Upon receipt of the interrupt, the host will examine the Node Interrupt Status Registers for each board. The register is located at address (I/O Addr.+6). Within the register, bits 0–3 indicate which node generated the interrupt. More than one register may have a bit set. The host side determines which channel or channels on an interrupting node are reporting events by detecting a non-zero event field in the Channel Data Structure. The host side will acknowledge receipt of the event by setting the event field to zero.

4.5. DSP Failure Detection

The host will periodically transmits the Acknowledge command to one or more channels on a node to determine the DSP's ability to respond.

5. Issues

Before initialization, we may need to determine if we are doing a warm restart and if the DSP board is already in operation.

Does the DSP/Host interface suffer from the big-endian/little-endian syndrome; i.e., does one side need to do byte-swapping? If so, the host will do the byte-swapping.

APPENDIX G

1. Introduction

The Command Processor is one of the processes that comprise MultiLink's Digital Conferencing Bridge (DCB). It accepts messages from other DCB processes to control the operation of a line connected to the DCB. The operations include:

dialing a number on one of the lines, setting the gain factor on or off for a group of lines, muting or unmuting a group of lines, playing an acknowledge dtmf, conference entry, conference exit, security on, or security off tone on a group of lines, and putting a group of lines into a specific conference with or without music.

The Command Processor will execute these requests by passing the command to the Digital Signal Processor (DSP) that handles the affected line.

2. Design Description

At a high level, each of the requests is performed through an interface provided by the Command Processor for one of the purposes already enumerated. A non-blocking interface is provided for each of those purposes. With the exception of dialing a number, the command is performed without an indication of completion to the requestor. When a number is dialed, a completion reply is provided to the caller. Commands directed to failed lines will be recorded in the Error/Status Log.

At the low level, the Command Processor will determine the board, node, and DSP channel associated with each requested line. The appropriate channel data structure will be checked for an error indication due to a previous request. If an error is indicated by the DSP, the Command Processor will record it in the Error/Status Log and report the affected lines as failed to the Call Handler. After the DSP performs dial-dtmf and play-tone requests, the Command Processor expects to receive a completed event message via the Event Processor.

3. Data Structures

The Command Processor will keep a bitmask of the active nodes to determine which nodes are active. Upon initialization of the Command Processor, ail possible nodes will be assumed active until proven otherwise. In the first release of the DCB once a node is marked inactive, it will remain so until the Command Processor is restarted. A node will be marked inactive if an error is encountered or if the node does not respond to an acknowledge command, discussed later in the detailed design section.

The Command Processor communicates with each DSP via data structures located in the associated Dual Port Memory (DPM). These structures are defined and their usage is described in the DSP-Host Interface Design, see Document 14002059.

When the Command Processor can not immediately execute a dial-dtmf or a play-tone request because the DSP is busy with a previous request, it will temporarily acquire memory to store the request and repeat the execution attempt after a fixed period of time.

4. Detailed Design

For requests on nodes that have been marked inactive, the Command Processor will log an error in the Error/Status Log and ignore the request.

When the request is to change the gain factor or muting for a group of lines, the Command Processor will simply update the corresponding flag located in the appropriate DSP channel data structures. If the request is to place lines in a conference, the Command Processor will set the music indicator on or off as requested for the specified lines and update the Channel-Conference structures on all active nodes as quickly as possible.

For dial-dtmf or play-tone requests, the Command Processor will individually determine if each requested DSP channel is ready to accept a new command. If it is not, the Command Processor will privately store the request for that channel in a queue. The request will be attempted again when the appropriate completed event message arrives from the DSP Event Processor. The Command Processor provides an interface for the completed event messages.

When the DSP is ready to accept another command on a desired channel, any associated data will first be placed in the associated channel data structure followed by the command. If the request is dial-dtmf, each DSP channel will be checked when the corresponding completed event arrives from the DSP Event Processor and if the dialing was successfully completed, the line number will be returned to the caller with a REPLY_DIAL_DONE reply.

An alarm will be set approximately every 5000 ms. which will cause the Command Processor to interrogate each active node with the acknowledge "are you active?" command. If the DSP does not respond by clearing that command before the next alarm arrives, the incident will be recorded in the Error/Status Log, the Call Handler will be informed of the lines affected through its interface provided for that purpose, and the associated node will be marked inactive both internally and in the DSP node data structures for all DSP's that remain active.

Finally, a dsp-failed interface is provided for use by the Annunciator Process. Its purpose is to consolidate knowledge of DSP failures in the Command Processor. The Command Processor will handle this notification as it handles internally detected DSP failures, just described.

APPENDIX H

1. Introduction

The Event Processor is one of the processes that comprise MultiLink's Digital Conferencing Bridge (DCB). It reads a bit-array of Digital Signal Processor (DSP) nodes that are interrupting the host from the DSP Driver. It then accesses the DSP's Dual-Port Memory (DPM) to determine the event(s) causing the interrupt(s) and processes those event(s). The events include:

Digits have arrived from a specific user channel,

The talk-_present flag has been set or reset for a specific user channel,

A data buffer is ready for a specific annunciator or operator channel,

A play-tone request previously issued by the Command Processor has been completed, and Dialing has been completed for a previous dial-digits command issued by the Command Processor.

The design of the DSP Driver is also described in this paper. It provides the following functionality for the host software:

Access to the DSP device through the open() interface.

A bit-array of interrupting DSP nodes through its read() interface, and

A means to reset each node, get the physical address of the DPM's, get and put a bit-array of active DSP nodes, get and put I/O register contents, and enable or disable printing of register accesses through its ioctl() interface.

2. Design Description

The existence of a DSP Driver is closely associated with the Event Processor because of a desire to reduce possible process context switches when handling interrupts from the DSP.

2.1. Event Processor Design

The Event Processor blocks while waiting for an interrupt from the DSP Driver. It determines which channels indicate an event and it processes each event. The possible events are enumerated in the introduction section. Depending on the event, the Event Processor executes an interface provided for the purpose by another interested process. After processing all the indicated events, the Event Processor waits for another interrupt to occur.

2.2. DSP Driver Design

The DSP Driver handles all DSP interrupts and provides the sole interface to the DSP registers. It is also the source for information such as the address of the DPM's and the active DSP nodes.

The DSP Driver is a character device. It provides handlers for dspinit(), dspopen(), dspioctl(), dspread(), dspintr(), and dspclose(). During initialization, the driver attempts to determine the existing boards from a list of possible I/O base addresses specified in the driver's System installation file. The contents of the driver's installation files are given in the appendices. The driver assigns the starting address of the physical memory for the DPM to the first memory address indicated in the System installation file.

The driver allows any number of cooperating processes to open the DSP device. Ioctl calls are used to reset each DSP node, to get and put information about the DSP's from and to the driver, and to control printouts of each register access on the console for debugging purposes. The supported ioctl commands are defined in the dsplib.h header file which is included in the appendix. In a future software release, an ioctl command may be added to support a DSP test function.

When an interrupt occurs, the intr section of the driver forms a bit array of all interrupting nodes and stores it in a buffer managed by existing kernel routines. The information is subsequently acquired by the read interface.

The device is closed when the last process having the DSP open issues its close call.

3. Data Structures

The device read() interface uses an unsigned long to provide a bit array of the interrupting nodes in the first 24 bits.

Arguments for the various ioctl() commands are defined below.

An unsigned short is used to specify the board to be reset in a RESET_DSP request. This will be used only by the InitDCB Process.

An unsigned integer is used to get and put a bit array of active DSP nodes in the first 24 bits for $GET_{13}$ ACTIVE and PUT_ACTIVE requests. The active-nodes information is acquired and saved during the higher level interface open_dsps() call, described in the attached dsp manual page.

A long integer is used to get the starting physical memory address of the DPM's via the GET_DSPMEM request. This information is also acquired and used during the open_dsps() call.

A DSPIO structure, defined in the dsplib.h header file, is passed through the interface to get and put DSP register contents for GET_REGISTER and PUT_REGISTER requests.

For debugging purposes, a long integer is used to define a bit array of interrupting nodes to simulate an interrupt via the PUT_INTERRUPT request. This value is returned during a subsequent read request.

An array of six integers is used to get the base I/O address of each possible DSP board via the GET_IOBASE request. Since the information contained therein is automatically inserted by the driver during register accesses, this interface is currently used only to provide debugging information.

No argument is necessary for the DEBUGON or DEBUGOFF requests.

4. Detailed Design

Additional details of the design outlined above are provided here.

4.1. Event Processor Details

When started, the Event Processor initializes the interprocess communication routines, opens the DSP device, and initializes the shared database. It then enters an infinite loop in which it reads the bit array of interrupting nodes, processes each event and reads again.

To process each interrupt, the event member of each channel data structure on each node having a bit set in the bit array is examined for the presence of an event. If an event is detected, the logical channel number (lcn) is determined and further processing is dependent on the type of event as described below.

For a talk event, the talk flag is obtained from the DPM and stored in the talk indication slot of the shared database for the lcn.

For a dtmf-digits-in event, the digit(s) are copied to a DIGITDATA structure, the source in the DPM is set to a NULL string, and ReportDigits() interface is used to send the information to the Call Handler.

When a data-buffer-ready event occurs, the annun_bufrdy() interface is used to send the information to the Annunciator Process.

When a dial-done or tone-done event is received, the Command Processor is informed via the cmd_dial_done() or cmd_tone_done() interface, respectively.

Finally, to signal the DSP that the event has been processed, the event member of the DSP channel is cleared by storing NULL_EVENT in it.

4.2. DSP Driver Details

During driver installation, a system-wide config.h file is formed from the System file of all device drivers. The Space.c file will be supplied in source form to each DCB software installation site and used to obtain configuration information from the config.h file. Through global variables initialized in the Space.e file from the config.h information, the DSP Driver learns the assignment of the starting DPM address and the base addresses for each board's I/O registers.

On system startup, the driver's init handler prints MultiLink's copyright notice and indicates whether each of the six possible DSP boards was detected or not. With this, a DCB system administrator is assured that the driver is present and that it has recognized the presence of all installed boards. Since the DSP has no ID register, the Receive Control Register of each board mentioned in the System file is examined. This address (offset 0x3000) is seldom used by other devices. The register is clear on power-up and is never purposely set to 0xFF, which is returned when no device is present. Therefore, if 0xFF is not read, a DSP is assumed to be present.

When a board is detected, its I/O base address is stored in an array of iobases for future reference.

The first process to open the driver causes the initialization of read buffers managed by existing kernel routines. The buffers are used to store a bit array of interrupting nodes formed from the Node Interrupt Status Register on each DSP board by the interrupt handler. Subsequent device open calls simply increment the count of processes having the device open.

The close routine decrements the count of processes having the device open. When the count goes to zero, the read buffers are actually closed.

The read routine is simply a call to the aforementioned buffer handler managed by the kernel.

Ioctl commands control specific requests including DSP resets and all I/O register operations. The user arguments are copied from user memory to kernel memory, acted upon, and returned by copying from kernel memory to user memory, depending on the specific command.

The attached dsp manual pages specify high level interfaces to access driver functionality while hiding some of the low level interface details.

5. Issues

A DSP semaphore is probably needed to signal when the host is removing digits following a dtmf-digits-in event.

The DSP Driver could provide a means for software manufacturing to insert source level identification of version or configuration information through initialization of an additional character string in the Space.c file that could be printed upon DCB system start-up.

APPENDIX I

1. Introduction

The InitDCB Process is one of the processes that comprise MultiLink's System 70 Conferencing Bridge. It manages the System 70 start-up and sanity operations:

pre-service diagnostics, resource initialization or recovery, process creation, process sanity checks with deadman placation, alarm reporting, and System 70 reinitialization or shutdown.

2. Design Overview

Initdcb is the first System 70 process to be invoked. It is designed to be called by the UNIX® init process from an entry in the inittab file. Depending on the boot status, described below, it performs a sequence of preliminary diagnostics and initializations, as required, including but not limited to Digital Signal Processors (DSP's), T1 boards, the analog board, serial board, shared memory, databases, displays and the deadman timer. It creates the remaining System 70 processes, providing each with prescribed startup arguments.

Initdcb finally enters a lifelong loop in which it periodically placates the System 70 deadman circuit and requests a reply to the CMD_RU_THERE message from each process that accepts messages. It sends signals to other processes, to which the receiver similarly replies by message. The init_signals() interface, described in the appendix, is provided for this purpose. If any process does not respond within a limited time, an error message is logged and an alarm is fired.

Initdcb accepts messages to set and to retire major and minor alarms. It also accepts a message requesting System 70 reinitialization or shutdown. It subsequently sends a CMD_SHUTDOWN message or corresponding signal to all processes, thereby requesting them to exit gracefully. When all processes have exited, up to a specified time limit, initdcb causes the UNIX kernel to reinitialize or shutdown.

3. Data Structures

Initdcb keeps an array of child process names, process id's, process priorities, message queue id's, and process alarm states for use by system reinitialization, interprocess communication, or system shutdown. It also keeps a count of the number of outstanding requests for major and minor alarms.

The multi-processor architecture of the DCB allows conferences to remain active while the system is reinitialized. This process is called a 'warm boot.' While the host processor reinitializes, the conferences remain active because the DSP processors and T1 Network Interfaces run asynchronously from the host processor. However, the host software must correctly recover the information required to restore the conference and channel data structures to their correct state. All conference and channel data, which is updated in real-time (e.g. call counts and timers), are stored in the dual-port memory of the DSP. Other channel and conference data, that are not updated in real-time, are stored on disk. This information includes conference and channel names, conference modes, etc.

Data structures stored in the Digital Signal Processor's (DSP's) Dual-Port Memory (DPM) are examined by initdcb to determine the warm vs. cold boot-up status of the system and, for a cold boot, initialized. Information stored in the DPM data structures survives System 70 warm boot-up reinitializations and is sufficient to recover per-channel and per-conference data, including time and billing records. Thus, the reinitialization has a minimum impact on pre-existing conference calls.

4. Detailed Design

Initdeb processing is performed in the order of the following sections describing its functionality.

4.1. DCB Environment

The root of the DCB directories is defined by DCBPATH to be/usr/dcb in the attached init_lib.h header file. Initdcb first adds DCBPATH to the set of environment variables and sets the current directory to that value. There are subdirectories of DCBPATH for various functions:

announce contains voice data files, bin contains the DCB process executable files, cdr contains call detail record files, dbase contains database, dial lists, password and related configuration files, some of which are stored in subdirectories of dbase, new contains updated executable files to replace those in the bin directory on the next DCB restart, log contains files with error and status messages, reports contains DCB report files, and tmp contains temporary files destined for the print spooler.

4.2. DPM Access.

Access to the array of DPM data structures is through interfaces described in the DSP-Host Interface Design Specification. These interfaces obtain the physical starting address of the array of DPMs and map that address to virtual memory in the current process. A global pointer to the array of DPM structures is saved. Using this, DPM data is obtained simply by de-referencing the pointer.

4.3. Boot and Pre-service Test Status

The following algorithm is used to decide when to declare a cold/warm boot situation and when to perform pre-service diagnostics:

When initdcb is started, the warmboot boolean variable is initialized to TRUE and the testdsp boolean variable is initialized to FALSE.

If initdcb was executed with the -t option, testdsp is set to TRUE.

If initdcb was executed with the -0 option, warmboot is set to FALSE.

If warmboot is now TRUE, initdcb examines known information stored in active DSP nodes. The active nodes value must match the DSP driver's value. The value of this_node must match the assigned value. For all ports, the dpm_port value must match the assigned value. If any of these conditions are false, warmboot is set to FALSE.

4.4. Pre-Service Diagnostics

Using the results of the initialization status algorithm described in the previous section, if warmboot is FALSE and testdsp is TRUE, pre-service diagnostics are performed. Initdcb performs hardware diagnostics on the serial board, DSP's, T1 boards, and an integrated diagnostic that verifies operation of DSP's, T1 boards and analog ports. No hardware diagnostics are performed upon a warm boot.

The serial card ports are checked by looping back the outputs and detecting the transmission of a prescribed sequence of ASCII characters. The operator may visually determine proper baud rate compatibility and display operation when presented with the first console display screen.

DSP diagnostics are based on SDL provided source code for the DSP and the host that have been translated to DCBcallable functions.

T1 diagnostics primarily checks that registers can be written and read back correctly.

An integrated diagnostic loops back and detects DSP generated signals through the T1 board, analog card and back to verify signal connectivity.

4.5. Hardware and Resource Initialization

Hardware and resource initializations are performed as follows:

if there are executable or DSP code files in the new directory, initdcb will move them to the bin directory (if present, a new version of initdcb will be exec'ed to replace the one executing), InitSHM() initializes the memory database and the alarm database, init_dsp() is called to initialize the DSP's for cold boots, the warm/cold boot initialization procedure for T1 boards is called, and InitDBCold() initializes system databases for cold boots; InitDBWarm() does the same for warm boots while taking into account the per channel conference numbers, in-conference time, and signaling information derived from the hardware. InitDBWarm() recovers the conference number per logical channel unit and in-conference minutes from the DSP's Dual-Port Memory (DPM) and the per channel signaling information from the T1 Status registers (polling and Q&A data will be lost). The algorithm used for warm boot initialization and conference recovery is outlined below:

For each channel in the system, obtain the channel's current voice path information (this includes the conference number, mute state, gain state and music state) and network hook state settings (both incoming and outgoing).

Channels which are idle (on-hook in both directions) are placed in the Null Conference.

Channels which are connected (off-hook in both directions) and are in a user or operator conference are left in that conference. Channels in any other conference are placed in the Enter Conference. The channel's status information is recovered from both dual-port memory and from disk. A delta-time operation is performed on the channel's seizure time and the current time to recover any time information lost during the reinitialization.

Channels which are disconnected (off-hook in one direction only) are placed in the Null Conference. The channel's status information is recovered from both dual-port memory and from disk for Call Detail Record (CDR) reporting.

Conference status information is recovered both from dual-port memory and from disk for conferences which have 1 or more user channels.

Record, Playback, Operator and Annunciator channels are all left in their current conferences.

4.6 Process Creation

Next, initdcb creates the other DCB processes using their assigned priorities and provides the boot status as their first argument. The order of process creation is:

first, processes providing low level services—Error/Status Log, Timer, DSP Event and T1 Event processes, processes providing higher level services—DSP Command Processor, Annunciator, Call Handler, and T1 Handler, lastly, user interface processes—Netmgr, Cdr, Report, Display Handler, and Login's (8).

Admin, Maint, Opcon's (8) and Display Update's (8) will be exec'd by the Display Handler and Login processes.

If any diagnostic problems or missing boards have been detected, initdcb executes an interface provided by opcon to relate the problem to the operator(s) and an interface provided by the Error/Status Log to record the problem in a disk file and send it to the system printer.

4.7. Sanity Checks and Deadman Placation

Initdcb then sets a repetitive timer alarm for 3 second intervals and automatically placates the deadman circuit each time the timer reply is received. As each timer reply is received, initdcb requests a sanity check reply by sending a message or signal to one of its child processes. It sends the request to each child process in round robin fashion and expects a reply before the same process is addressed again. Disphand and the login processes will answer with knowledge of the sanity of their child processes in mind. If the process has not replied to the sanity check request when it is due for another message, initdcb sets a major or minor alarm, depending on whether or not the process is a core process (critical to conferencing). It then repeats the deadman placation and sanity check processing continuously.

4.8. Alarm Reporting

Initdcb accepts messages, through an interface described in the appendix, for reporting major and minor alarms. It keeps a count of the number of times each alarm is exercised. If the count is greater than zero, the corresponding alarm is fired. It retires an alarm only when the count for the corresponding alarm drops to zero. Initdcb sets the major alarm if the following core processes do not respond the sanity check: Timer, DSP Event, T1 Event, DSP Command, Call Handler, and Display Handler. The minor affirm is set if the following, non-core, processes fail to reply to the sanity check: Error/Status Log, Annunciator, Login's, Cdr, and Netmgr.

4.9. System Shutdown

Finally, initdcb also accepts a message for a system reinitialization or shutdown. This is expected to originate only from the maint process so that maintenance personnel can install new boards, new lines, etc. or cleanly shutdown the system for any reason. It is the maint process's responsibility to insure that no conferences are still active before issuing this request. Initdcb then sends a message or signal to each process requesting that the process exit gracefully. After allowing 20 seconds for processes to close resources and to exit, initdcb then:

kills any surviving child processes, closes the DSP's with the close_dsp() interface, closes other resources that have provided an appropriate interface, and exits.

When initdcb exits for shutdown, the inittab script is designed to shutdown the UNIX kernel and wait for interaction from maintenance personnel; for reinitialization, a warm reboot is automatically invoked.

APPENDIX J

1. Introduction

MultiLink's Digital Conferencing Bridge (DCB) MVIP bus and ST bus time slot assignments and related tables are documented here. These tables view the data from various points of view as described in the tables section.

One T1 line is assigned to each of the first six MVIP bus rails; only four T1 lines are planned for the first DCB release. On each rail, the first 24 time slots are allocated to T1 channels in channel order.

MVIP rails 6 and 7 are reserved for DSP internal communication. The first 24 time slots of these rails are allocated for talked and talk lists, respectively. A node sync is assigned to one of the remaining time slots on rail 6.

One operator or one annunciator channel is assigned to each of the first 16 Digital Signal Processor (DSP) nodes for a total of eight channels each, evenly distributed on the first four DSP boards (there are four DSP nodes per board). The operators and annunciators are assigned the remaining (i.e. last) eight time slots of separate MVIP bus rails. The transmit and receive sides of the operator channels are assigned to the lower and upper of two adjacent rails, respectively.

A music channel, the receive side of two link lines, and three record/playback channels are assigned to unused time slots on another MVIP bus rail. The transmit side of the two link lines is assigned to the lower adjacent rail. One link line and one record/playback channel are allocated to each of the first two and first three DSP boards, respectively.

We claim:

1. A signal processing apparatus for use in a system for teleconferencing a plurality of phone channels, said system being of the type including common bus means for carrying digital signals representing data incoming from and outgoing to said plurality of phone channels, comprising:

A. at least one digital signal processor (DSP), coupled to said common bus means and associated with at least three of said plurality of phone channels, and including means for:

(i) responding to incoming data on each of said associated phone channels by generating status signals, wherein each of said status signals is representative of a status of one of said associated phone channels;

(ii) transferring said status signals onto said common bus; and (iii) responding to a control parameter for at least initializing teleconferencing between said plurality of phone channels;

B. host processing means, coupled to said at least one DSP, for generating and storing for access thereby, said control parameters;

C. said at least one DSP further including means for:

(i) responding to said status signals associated with said plurality of phone channels to generate output data signals, wherein one of said output data signals is generated for each of said associated phone channels and wherein each of said output data signals is a function of at least selected ones of said incoming data signals;

(ii) transferring to each of said associated phone channels, one of said output data signals by way of said common bus; and (iii) maintaining teleconferencing between at least selected ones of said plurality of phone channels in the event of a selected fault by said host processing means.

2. A signal processing apparatus for use in a system for teleconferencing a plurality of phone channels, said system being of the type including common bus means for carrying digital signals representing data incoming from and outgoing to said plurality of phone channels, comprising:

A. a plurality of digital signal processors (DSPs), each of said DSPs being coupled to said common bus means and associated with a different one or more of said plurality of phone channels, and including means for:
  (i) responding to incoming data on each of said associated phone channels by generating one or more status signals, wherein each of said status signals is representative of a status of one of said associated phone channels; and
  (ii) transferring said status signals to each other ones of said DSPs;

B. each of said DSPs further including means for:
  (i) responding to said status signals associated with said plurality of phone channels to generate output data signals, wherein one of said output data signals is generated for each of said associated phone channels and wherein each of said output data signals is a function of at least selected ones of said incoming data signals; and
  (ii) transferring to each of said associated phone channels, one of said output data signals by way of said common bus.

3. An apparatus according to claim 2, wherein each of said DSPs include energy detection means for generating said status signals, wherein each of said status signals is indicative of a selected activity level of incoming data on one of said associated phone channels.

4. An apparatus according to claim 3, wherein said energy detection means includes means for generating each of said status signals as a function of an energy level represented by incoming data on one of said associated phone channels.

5. An apparatus according to claim 4, wherein said energy detection means includes means for generating each of said status signals as indicative of a value representative of a difference between said energy level represented by incoming data on one of said associated phone channels and an average energy level in said output data signal being greater than a threshold energy value.

6. An apparatus according to claim 3, wherein each of said DSPs include talk-list means responsive to said status signals for generating said output data signals as a function of incoming data on a selected number of those of said plurality of phone channels that have said selected activity level of incoming data thereon.

7. An apparatus according to claim 6, wherein said talk-list means includes means for generating and storing a current talk-list signal representing said selected number of said plurality of phone channels that have said selected activity level of incoming data thereon.

8. An apparatus according to claim 7, wherein said talk-list means includes means for generating said current talk-list signal identically and substantially with each other of said talk-list means.

9. An apparatus according to claim 7, wherein said talk-list means includes means for selecting for representation in said talk-list signal ones of said plurality of phone channels that have an energy difference between an energy level represented by incoming data on one of said plurality of phone channels and an average energy level in said output data signal that exceeds a designated value.

10. An apparatus according to claim 7, wherein said talk-list means includes means for selecting for representation in said talk-list signal ones of said plurality of phone channels having an energy level represented by incoming data on one of said plurality of phone channels that exceeds an average energy level of said current talk list signal.

11. An apparatus according to claim 2, wherein
  A. each of said plurality of DSPs include means responsive to a control parameter for at least initializing teleconferencing between said plurality of phone channels,
  B. said apparatus further comprising host processing means, coupled to said plurality of DSPs, for generating and storing for access thereby, said control parameters,
  C. each of said plurality of DSPs further including means for maintaining teleconferencing between at least selected ones of said plurality of phone channels in the event of a selected fault by said host processing means.

12. A method for teleconferencing a plurality of phone channels in a system having a common bus means for carrying digital signals representing data incoming from and outgoing to said plurality of phone channels, comprising the steps of:
  A. coupling a plurality of digital signal processors (DSPs) to said common bus means wherein each of said DSPs is associated with a different one or more of said plurality of phone channels, and wherein each of said DSPs receives said incoming data from said associated phone channels;
  B. responding to incoming data on each of said associated phone channels by generating status signals, wherein each of said status signals is representative of a status of one of said associated phone channels;
  C. each of said DSPs transferring said status signals of each associated phone channels to each other of said DSPs;
  D. responding to said status signals associated with said plurality of phone channels to generate output data signals, wherein one of said output data signals is generated for each of said associated phone channels and wherein each of said output data signals is a function of at least selected ones of said incoming data signals; and
  E. transferring to each of said associated phone channels, one of said output data signals by way of said common bus.

* * * * *